(12) United States Patent
Xu et al.

(10) Patent No.: US 11,251,698 B2
(45) Date of Patent: Feb. 15, 2022

(54) POWER FACTOR CORRECTION CIRCUIT

(71) Applicants: Delta Electronics (Shanghai) Co., Ltd., Shanghai (CN); Zhejiang University, Zhejiang (CN)

(72) Inventors: Dehong Xu, Zhejiang (CN); Kai Dong, Shanghai (CN); Jinfa Zhang, Shanghai (CN)

(73) Assignees: DELTA ELECTRONICS (SHANGHAI) CO., LTD., Shanghai (CN); ZHEJIANG UNIVERSITY, Zhejiang (CN)

( * ) Notice: Subject to any disclaimer, the term of this patent is extended or adjusted under 35 U.S.C. 154(b) by 0 days.

(21) Appl. No.: 17/153,063

(22) Filed: Jan. 20, 2021

(65) Prior Publication Data

US 2022/0021297 A1    Jan. 20, 2022

(30) Foreign Application Priority Data

Jul. 17, 2020 (CN) .......................... 202010692225.3

(51) Int. Cl.
*H02M 1/42* (2007.01)
*H02M 7/219* (2006.01)
*H02M 1/34* (2007.01)
*H02M 1/00* (2006.01)

(52) U.S. Cl.
CPC .......... *H02M 1/4233* (2013.01); *H02M 1/34* (2013.01); *H02M 1/4241* (2013.01); *H02M 7/219* (2013.01); *H02M 1/0003* (2021.05); *H02M 1/0058* (2021.05); *H02M 1/344* (2021.05)

(58) Field of Classification Search
CPC .... H02M 1/0003; H02M 1/0058; H02M 1/34; H02M 1/344; H02M 1/4233; H02M 1/4241; H02M 7/219
See application file for complete search history.

(56) References Cited

U.S. PATENT DOCUMENTS

| 10,186,957 | B2 | 1/2019 | Zhen et al. | |
|---|---|---|---|---|
| 2008/0285314 | A1* | 11/2008 | Kojori | H02M 5/271 363/37 |
| 2012/0275203 | A1* | 11/2012 | Shimada | H02M 1/4225 363/84 |

(Continued)

FOREIGN PATENT DOCUMENTS

| CN | 1564447 A | 1/2005 |
|---|---|---|
| CN | 1564448 A | 1/2005 |

(Continued)

*Primary Examiner* — Jue Zhang
(74) *Attorney, Agent, or Firm* — Kirton McConkie; Evan R. Witt

(57) ABSTRACT

A power factor correction circuit includes an input power source, a first bridge arm, a second bridge arm, an output capacitor and an active clamp unit. The first bridge arm includes a first switch and a second switch in series. The second bridge arm includes a third switch and a fourth switch in series. The active clamp unit includes a second inductor, a clamp capacitor and a fifth switch. The power factor correction circuit may realize the ZVS function of the first switch and the second switch by the collaboration of the active clamp unit and the conduction/non-conducting state of the first switch, the second switch, the third switch and the fourth switch.

24 Claims, 51 Drawing Sheets

(56) References Cited

U.S. PATENT DOCUMENTS

2015/0303789 A1* 10/2015 Feng .................... H02M 7/487
                                                    307/43

FOREIGN PATENT DOCUMENTS

| CN | 1635696 A   | 7/2005  |
|----|-------------|---------|
| CN | 100340055 C | 9/2007  |
| CN | 101485073 B | 7/2012  |
| CN | 102969885 A | 3/2013  |
| CN | 103001484 A | 3/2013  |
| CN | 103368371 A | 10/2013 |
| CN | 102916604 B | 8/2014  |
| CN | 104852567 A | 8/2015  |
| CN | 107070195 A | 8/2017  |
| CN | 106787676 B | 5/2018  |

* cited by examiner

POWER FACTOR CORRECTION CIRCUIT

CROSS-REFERENCE TO RELATED APPLICATION

This application claims priority to China Patent Application No. 202010692225.3, filed on Jul. 17, 2020, the entire contents of which are incorporated herein by reference for all purposes.

FIELD OF THE INVENTION

The present invention relates to a switch power technology field in power electronics, and more particularly to a power factor correction circuit.

BACKGROUND OF THE INVENTION

Nowadays, switching power supply is developed toward high efficiency, high power density, high reliability and low cost. The power factor correction circuit is widely used in AC-DC power supply. Totem pole power factor correction circuit becomes more and more popular as its high efficiency. Wide bandgap devices including gallium nitride (GaN) power devices and silicon carbide (SiC) are quite suitable for totem pole power factor correction circuit as no reverse recovery charge comparing with the metal oxide semiconductor field effect transistor (MOSFET). Furthermore, the wide bandgap devices have the faster switching speed and the lower switching loss, which can increase the working frequency and the power density of the switching power supply, but still maintain good efficiency meantime.

Generally, the working frequency of the hard switching totem pole power factor correction circuit is below 130 kHz. To increase the power density, it is necessary to increase its working frequency up to MHz. Due to the parasitic body capacitance discharging loss during switching operation, the turn-on loss of the gallium nitride power device will increase dramatically and may reach ten times higher than that of turn-off loss. Consequently, the working frequency of the power factor correction circuit is limited.

SUMMARY OF THE INVENTION

In accordance with an aspect of present invention, a power factor correction circuit is provided. The power factor correction circuit includes an input power source, a first bridge arm, a second bridge arm, an output capacitor and an active clamp unit. The first bridge arm includes a first switch and a second switch connected in series. A common node of the first switch and the second switch is electrically connected with a first terminal of the input power source through a first inductor. The second bridge arm is connected with the first bridge arm in parallel. The second bridge arm includes a third switch and a fourth switch connected in series. A common node of the third switch and the fourth switch is electrically connected with a second terminal of the input power source. The active clamp unit includes a second inductor, a clamp capacitor and a fifth switch. A first terminal of the clamp capacitor is electrically connected with a first terminal of the second inductor. A second terminal of the clamp capacitor is electrically connected with a first terminal of the fifth switch. A second terminal of the fifth switch is electrically connected with a second terminal of the second inductor. The active clamp unit is disposed according to the selection from one of the three circuit arrangements below: positioned between a first terminal of the first bridge arm and a first terminal of the output capacitor; positioned between a second terminal of the first bridge arm and a second terminal of the output capacitor; positioned between the first switch and the second switch.

In accordance with another aspect of present invention, a power factor correction circuit is provided. The power factor correction circuit includes an input power source, a first bridge arm, a second bridge arm, an output capacitor, a first active clamp unit, a third bridge arm and a second active clamp unit. The first bridge arm includes a first switch and a second switch connected in series. A common node of the first switch and the second switch is electrically connected with a first terminal of the input power source through a first inductor. The second bridge arm includes a third switch and a fourth switch connected in series. A common node of the third switch and the fourth switch is electrically connected with a second terminal of the input power source. A third bridge arm is connected with the first bridge arm and the second bridge arm in parallel. The third bridge arm includes a sixth switch and a seventh switch connected in series. A common node of the sixth switch and the seventh switch is electrically connected with the first terminal of the input power source through a third inductor. The first active clamp unit includes a second inductor, a first clamp capacitor and a fifth switch. A first terminal of the first clamp capacitor is electrically connected with a first terminal of the second inductor. A second terminal of the first clamp capacitor is electrically connected with a first terminal of the fifth switch. A second terminal of the fifth switch is electrically connected with a second terminal of the second inductor. The second active clamp unit includes a fourth inductor, a second clamp capacitor and an eighth switch. A first terminal of the second clamp capacitor is electrically connected with a first terminal of the fourth inductor. A second terminal of the second clamp capacitor is electrically connected with a first terminal of the eighth switch. A second terminal of the eighth switch is electrically connected with a second terminal of the fourth inductor. The first active clamp unit is arranged in the first bridge arm. The second active clamp unit is arranged in the third bridge arm. A position of the first active clamp unit in the first bridge arm and a position of the second active clamp unit in the third bridge arm are identical.

In accordance with another aspect of present invention, a power factor correction circuit is provided. The power factor correction circuit includes an AC power source, a first bridge arm, a second bridge arm, an output capacitor, an active clamp unit and a third bridge arm. The first bridge arm includes a first switch and a second switch connected in series. A common node of the first switch and the second switch is electrically connected with a first terminal of the AC power source through a first inductor. The second bridge arm includes a third switch and a fourth switch connected in series. A common node of the third switch and the fourth switch is electrically connected with a second terminal of the AC power source. A third bridge arm is connected with the first bridge arm in parallel. The third bridge arm includes a sixth switch and a seventh switch connected in series. A common node of the sixth switch and the seventh switch is electrically connected with the first terminal of the AC power source through a third inductor. The active clamp unit includes a second inductor, a first clamp capacitor and a fifth switch. The second inductor is electrically parallel to a serially-connected structure having the first clamp capacitor and the fifth switch in series. The first bridge arm and the third bridge arm are operated in an interleaving manner. The active clamp unit is connected between the second bridge arm and the third bridge arm. The active clamp unit is shared by the first bridge arm and the third bridge arm.

The above contents of the present invention will become more readily apparent to those ordinarily skilled in the art after reviewing the following detailed description and accompanying drawings, in which:

DETAILED DESCRIPTION OF EMBODIMENTS

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1:
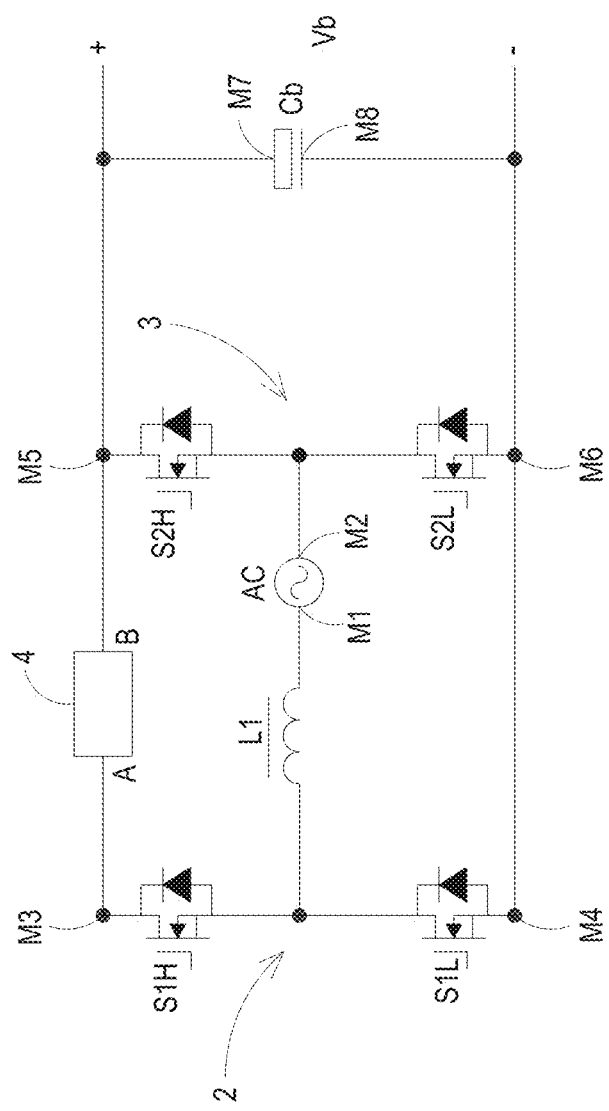
FIG. 1 is a schematic circuit diagram illustrating a power factor correction circuit according to a first embodiment of the present invention.
Figure 2:
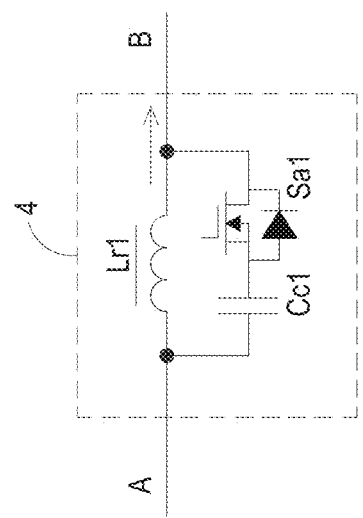
FIG. 2 is a schematic circuit diagram illustrating a first active clamp unit of the power factor correction circuit as shown in FIG. 1.

Please refer to FIGS. 1 and 2. FIG. 1 is a schematic circuit diagram illustrating a power factor correction circuit according to a first embodiment of the present invention. FIG. 2 is a schematic circuit diagram illustrating a first active clamp unit of the power factor correction circuit as shown in FIG. 1. The power factor correction circuit 1 includes an input power source AC, a first bridge arm 2, a first inductor L1, a second bridge arm 3, an output capacitor Cb and a first active clamp unit 4.

The input power source AC outputs an AC input voltage to the power factor correction circuit 1. For example, the AC input voltage has a sinusoidal waveform. The input power source AC has a first terminal M1 and a second terminal M2.

The first bridge arm 2 has a first terminal M3 and a second terminal M4. The first bridge arm 2 includes a first switch S1H and a second switch S1L, which are connected with each other in series. The first switch S1H is electrically connected with the first terminal M3 of the first bridge arm 2. The second switch S1L is electrically connected with the second terminal M4 of the first bridge arm 2. The common node between the first switch S1H and the second switch S1L is electrically connected with the first terminal M1 of the input power source AC through the first inductor L1.

The second bridge arm 3 is connected with the first bridge arm 2 in parallel. The second bridge arm 3 has a first terminal M5 and a second terminal M6. The second bridge arm 3 includes a third switch S2H and a fourth switch S2L, which are connected with each other in series. The third switch S2H is electrically connected with the first terminal M5 of the second bridge arm 3. The fourth switch S2L is electrically connected with the second terminal M6 of the second bridge arm 3. The common node between the third switch S2H and the fourth switch S2L is electrically connected with the second terminal M2 of the input power source AC.

The output capacitor Cb is connected with an output terminal of the power factor correction circuit 1 in parallel. The output capacitor Cb has a first terminal M7 and a second terminal M8. The voltage between the first terminal M7 and the second terminal M8 of the output capacitor Cb is equal to a DC output voltage Vb of the power factor correction circuit 1. In this embodiment, a totem pole power factor correction circuit is defined by the first switch S1H, the second switch S1L, the first inductor L1, the third switch S2H, the fourth switch S2L and the output capacitor Cb collaboratively.

The first active clamp unit 4 has a first terminal A and a second terminal B. The first terminal A of the first active clamp unit 4 is electrically connected with the first terminal M3 of the first bridge arm 2. The second terminal B of the first active clamp unit 4 is electrically connected with the first terminal M7 of the output capacitor Cb. The first active clamp unit 4 is connected between the first terminal M3 of the first bridge arm 2 and the first terminal M7 of the output capacitor Cb. The second terminal B of the first active clamp unit 4 is also electrically connected with the first terminal M5 of the second bridge arm 3. The first active clamp unit 4 is also connected between the first terminal M3 of the first bridge arm 2 and the first terminal M5 of the second bridge arm 3.

As shown in FIG. 2, the first active clamp unit 4 includes a second inductor Lr1, a first clamp capacitor Cc1 and a fifth switch Sa1. In an embodiment, the second inductor Lr1 is a planar magnetic element. A first terminal and a second terminal of the second inductor Lr1 are electrically connected with the first terminal A and the second terminal B of the first active clamp unit 4, respectively. That is, the second inductor Lr1 is connected between the first terminal M3 of the first bridge arm 2 and the first terminal M7 of the output capacitor Cb, and connected between the first terminal M3 of the first bridge arm 2 and the first terminal M5 of the second bridge arm 3.

A first terminal of the first clamp capacitor Cc1 is electrically connected with the first terminal A of the first active clamp unit 4 and the first terminal of the second inductor Lr1. A second terminal of the first clamp capacitor Cc1 is electrically connected with a first terminal of the fifth switch Sa1. A second terminal of the fifth switch Sa1 is electrically connected with the second terminal B of the first active clamp unit 4 and the second terminal of the second inductor Lr1. That is, the second inductor Lr1 and the serially-connected structure of the first clamp capacitor Cc1 and the fifth switch Sa1 are connected with each other in parallel.

In an embodiment, at least one of the third switch S2H and the fourth switch S2L is a wide bandgap semiconductor device or a silicon semiconductor device, and at least one of the first switch S1H, the second switch S1L and the fifth switch Sa1 is a wide bandgap semiconductor device.

As mentioned above, the power factor correction circuit 1 includes the first active clamp unit 4, and the first active clamp unit 4 includes the second inductor Lr1, the first clamp capacitor Cc1 and the fifth switch Sa1. In an embodiment, the timing sequences of switching the on/off states of the first switch S1H, the second switch S1L, the third switch S2H and the fourth switch S2L are specially controlled according to the operations of the first active clamp unit 4. Consequently, the ZVS functions of the first switch S1H and the second switch S1L are achievable, and the switching loss of each switch is reduced. Since the working frequency of the power factor correction circuit 1 is increased, the power supply apparatus with the power factor correction circuit 1 can be operated at higher power density and higher efficiency.

Figure 3:
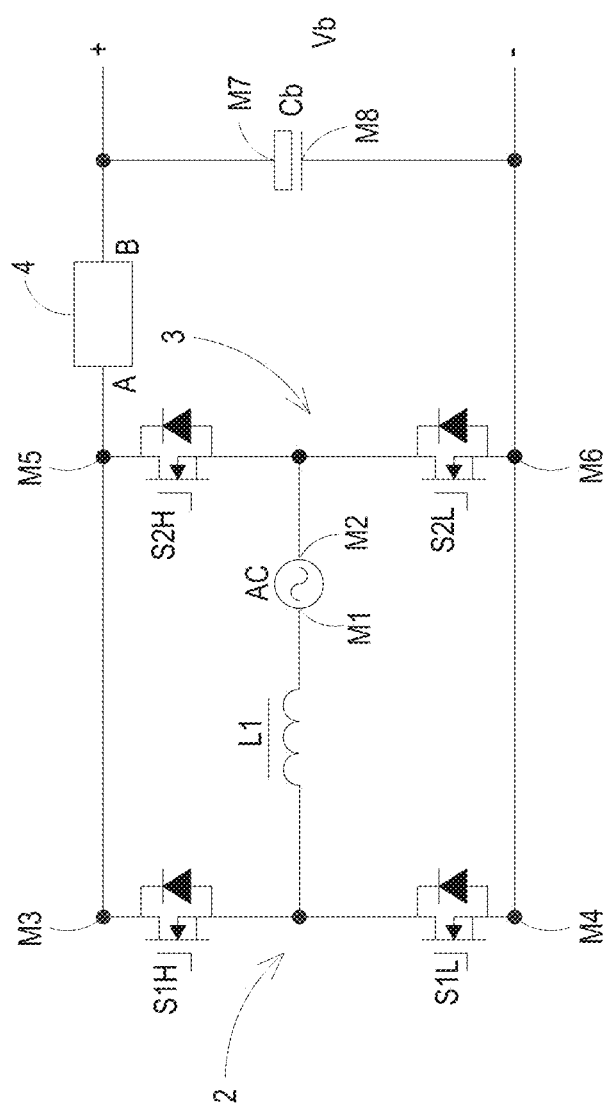
FIG. 3 is a schematic circuit diagram illustrating a power factor correction circuit according to a second embodiment of the present invention.

FIG. 3 is a schematic circuit diagram illustrating a power factor correction circuit according to a second embodiment of the present invention. In comparison with the first embodiment, the first active clamp unit 4 in the power factor correction circuit 1a of this embodiment is arranged to be a different position. Specifically, the first terminal A of the first active clamp unit 4 is electrically connected with the first terminal M3 of the first bridge arm 2 and the first terminal M5 of the second bridge arm 3. The second terminal B of the first active clamp unit 4 is electrically connected with the first terminal M7 of the output capacitor Cb. That is, the first active clamp unit 4 is connected between the first terminal M5 of the second bridge arm 3 and the first terminal M7 of the output capacitor Cb. Correspondingly, the second inductor Lr1 of the first active clamp unit 4 is connected between the first terminal M5 of the second bridge arm 3 and the first terminal M7 of the output capacitor Cb. Moreover, the first terminal M5 of the second bridge arm 3 is electrically connected with the first terminal M3 of the first bridge arm 2.

Similarly, the timing sequences of switching the conduction/non-conducting states of the first switch S1H, the second switch S1L, the third switch S2H and the fourth switch S2L of the power factor correction circuit 1a are specially controlled according to the operations of the first active clamp unit 4. Consequently, the ZVS function of the main switch is achievable, the switching loss is reduced, and working frequency of the power factor correction circuit 1a is increased. When the polarity of the AC input voltage is positive, the second switch S1L works as a main switch and the first switch S1H works as an auxiliary switch. When the polarity of the AC input voltage is negative, the first switch S1H works as the main switch and the second switch S1L works as the auxiliary switch.

Figure 4:
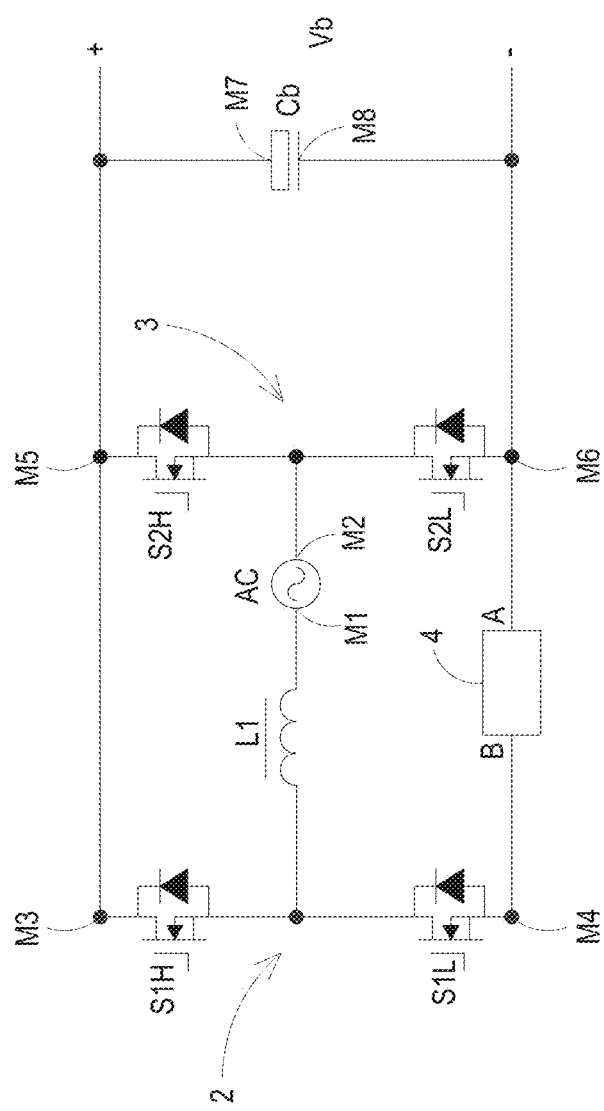
FIG. 4 is a schematic circuit diagram illustrating a power factor correction circuit according to a third embodiment of the present invention.

FIG. 4 is a schematic circuit diagram illustrating a power factor correction circuit according to a third embodiment of the present invention. In comparison with the first embodiment, the first active clamp unit 4 in the power factor correction circuit 1b of this embodiment is arranged to a different position. Specifically, the first terminal M3 of the first bridge arm 2, the first terminal M5 of the second bridge arm 3 and the first terminal M7 of the output capacitor Cb are electrically connected with each other. The first terminal A of the first active clamp unit 4 is electrically connected with the second terminal M8 of the output capacitor Cb and the second terminal M6 of the second bridge arm 3. The second terminal B of the first active clamp unit 4 is electrically connected with the second terminal M4 of the first bridge arm 2. That is, the first active clamp unit 4 is connected between the second terminal M4 of the first bridge arm 2 and the second terminal M8 of the output capacitor Cb, and connected between the second terminal M4 of the first bridge arm 2 and the second terminal M6 of the second bridge arm 3. Correspondingly, the second inductor Lr1 of the first active clamp unit 4 is connected between the second terminal M4 of the first bridge arm 2 and the second terminal M8 of the output capacitor Cb, and connected between the second terminal M4 of the first bridge arm 2 and the second terminal M6 of the second bridge arm 3.

Figure 5:
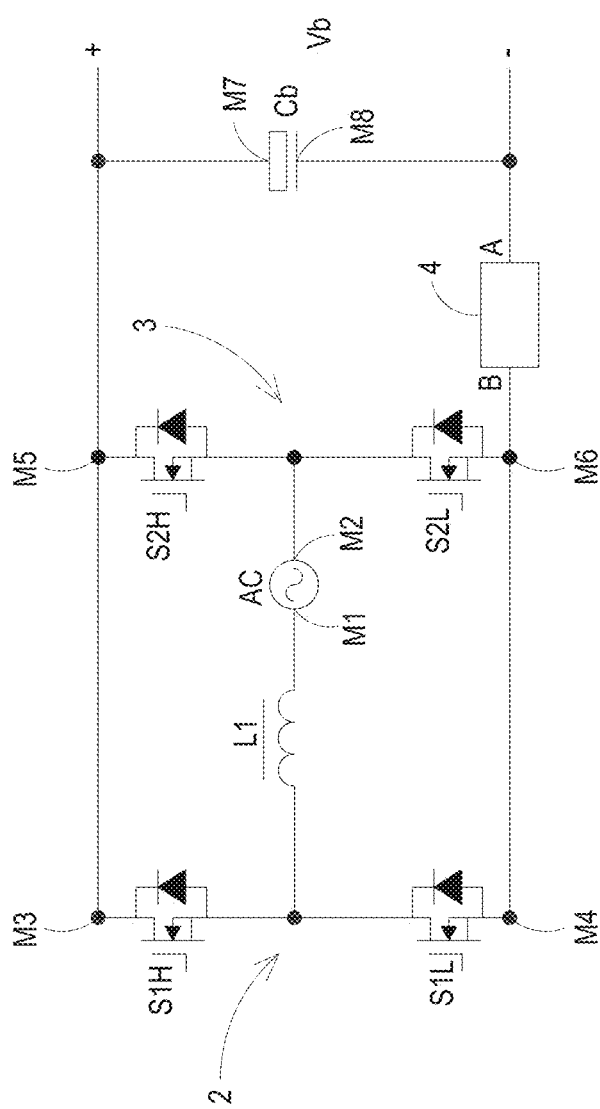
FIG. 5 is a schematic circuit diagram illustrating a power factor correction circuit according to a fourth embodiment of the present invention.

FIG. 5 is a schematic circuit diagram illustrating a power factor correction circuit according to a fourth embodiment of the present invention. In this embodiment, the first terminal M3 of the first bridge arm 2, the first terminal M5 of the second bridge arm 3 and the first terminal M7 of the output capacitor Cb are electrically connected with each other. The first terminal A of the first active clamp unit 4 is electrically connected with the second terminal M8 of the output capacitor Cb. The second terminal B of the first active clamp unit 4 is electrically connected with the second terminal M4 of the first bridge arm 2 and the second terminal M6 of the second bridge arm 3. That is, the first active clamp unit 4 is connected between the second terminal M4 of the first bridge arm 2 and the second terminal M8 of the output capacitor Cb, and connected between the second terminal M6 of the second bridge arm 3 and the second terminal M8 of the output capacitor Cb. Correspondingly, the second inductor Lr1 of the first active clamp unit 4 is connected between the second terminal M4 of the first bridge arm 2 and the second terminal M8 of the output capacitor Cb, and connected between the second terminal M6 of the second bridge arm 3 and the second terminal M8 of the output capacitor Cb.

Figure 6:
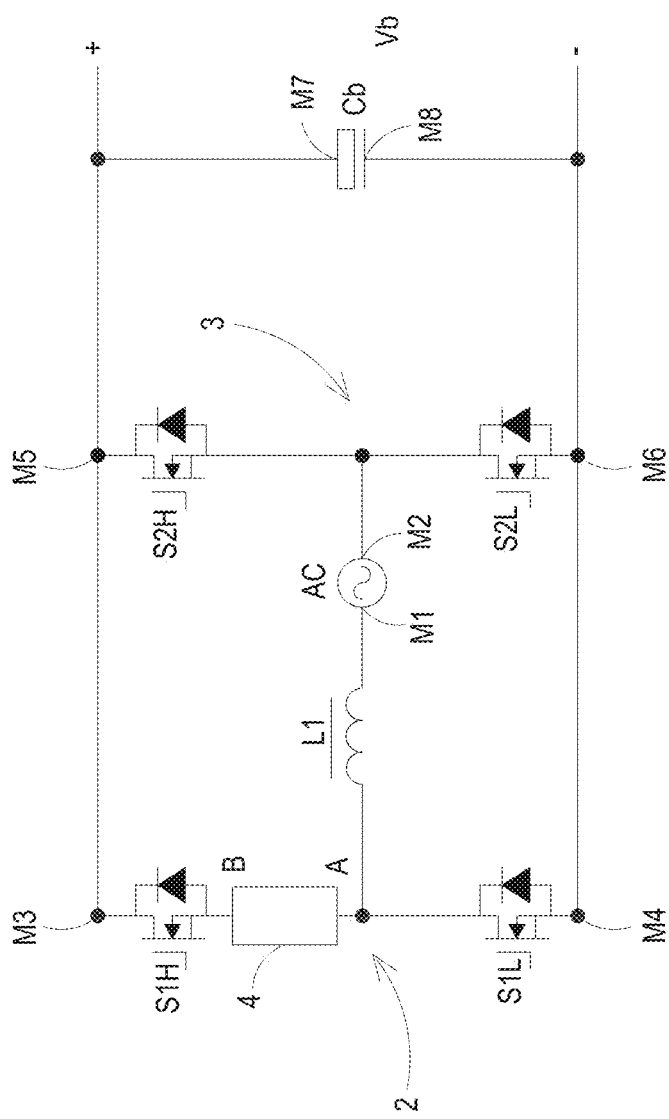
FIG. 6 is a schematic circuit diagram illustrating a power factor correction circuit according to a fifth embodiment of the present invention.

FIG. 6 is a schematic circuit diagram illustrating a power factor correction circuit according to a fifth embodiment of the present invention. In this embodiment, the first terminal M3 of the first bridge arm 2, the first terminal M5 of the second bridge arm 3 and the first terminal M7 of the output capacitor Cb are electrically connected with each other. The first terminal A of the first active clamp unit 4 is electrically connected with the second switch S1L of the first bridge arm 2 and the first terminal of the first inductor L1. The second terminal B of the first active clamp unit 4 is electrically connected with the first switch S1H of the first bridge arm 2. That is, the first active clamp unit 4 is connected between the first switch S1H of the first bridge arm 2 and the second switch S1L of the first bridge arm 2, and connected between the first switch S1H of the first bridge arm 2 and the first terminal of the first inductor L1. Correspondingly, the second inductor Lr1 of the first active clamp unit 4 is connected between the first switch S1H of the first bridge arm 2 and the second switch S1L of the first bridge arm 2, and connected between the first switch S1H of the first bridge arm 2 and the first terminal of the first inductor L1.

Figure 7:
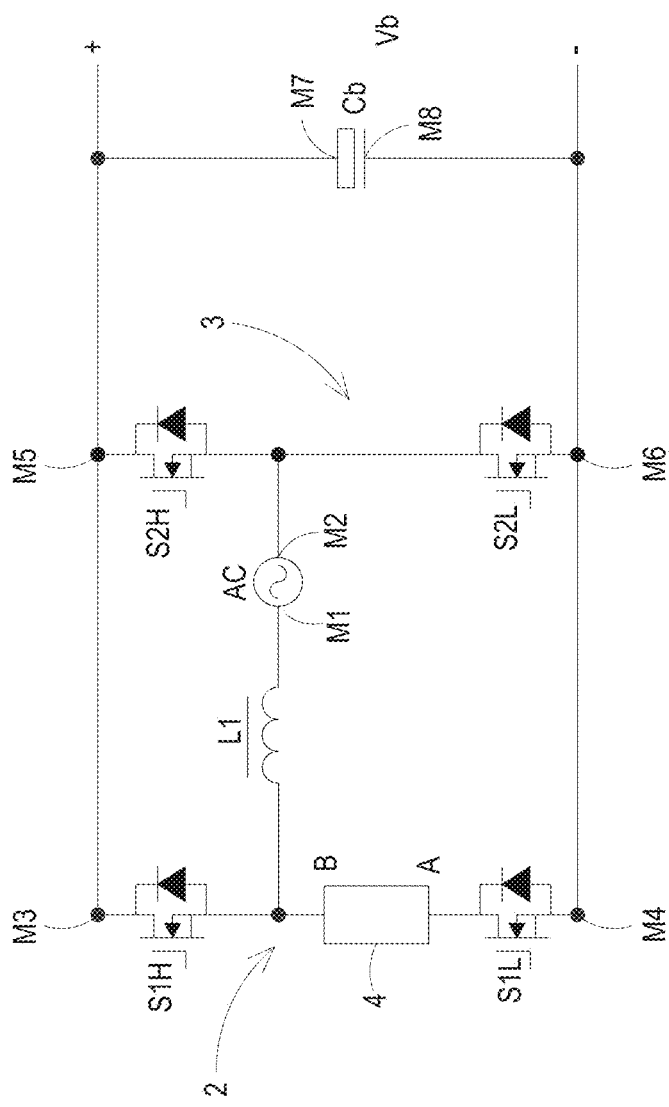
FIG. 7 is a schematic circuit diagram illustrating a power factor correction circuit according to a sixth embodiment of the present invention.

FIG. 7 is a schematic circuit diagram illustrating a power factor correction circuit according to a sixth embodiment of the present invention. In this embodiment, the first terminal M3 of the first bridge arm 2, the first terminal M5 of the second bridge arm 3 and the first terminal M7 of the output capacitor Cb are electrically connected with each other. The first terminal A of the first active clamp unit 4 is electrically connected with the second switch S1L of the first bridge arm 2. The second terminal B of the first active clamp unit 4 is electrically connected with the first switch S1H of the first bridge arm 2 and the first terminal of the first inductor L1. That is, the first active clamp unit 4 is connected between the first switch S1H of the first bridge arm 2 and the second switch S1L of the first bridge arm 2, and connected between the first terminal of the first inductor L1 and the second switch S1L of the first bridge arm 2. Correspondingly, the second inductor Lr1 of the first active clamp unit 4 is connected between the first switch S1H of the first bridge arm 2 and the second switch S1L of the first bridge arm 2, and connected between the first terminal of the first inductor L1 and the second switch S1L of the first bridge arm 2.

Furthermore, if the AC input voltage of the power factor correction circuit is abruptly increased to be higher than the output voltage Vb, the electronic components of the power factor correction circuit will have a potential risk of being damaged. For avoiding the occurrence on the electronic components, the power factor correction circuit is further provided with clamp diodes.

Figure 8:
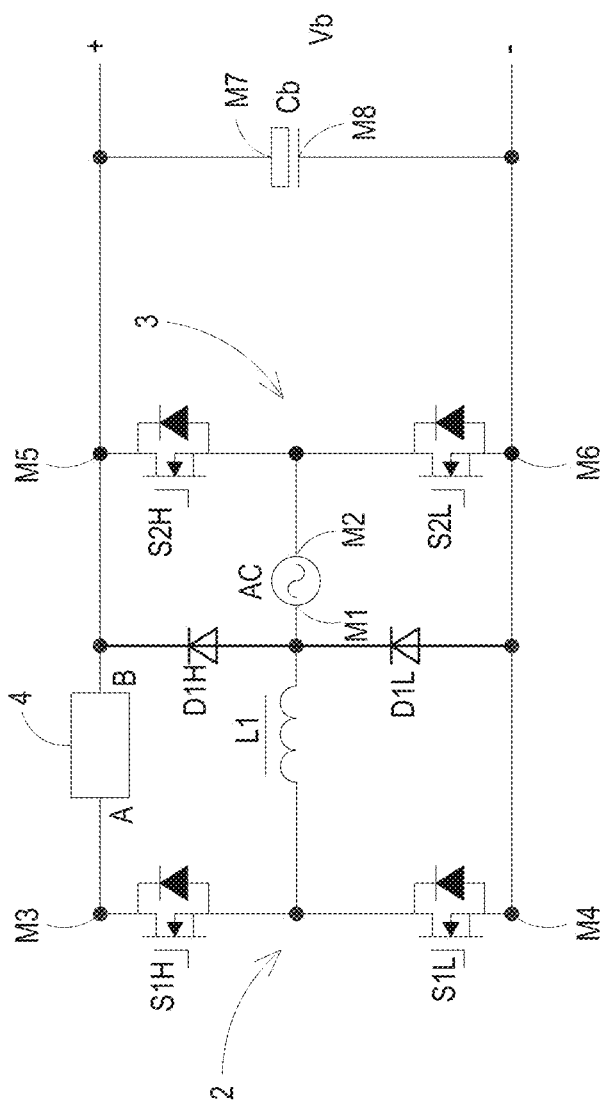
FIG. 8 is a schematic circuit diagram illustrating a power factor correction circuit according to a seventh embodiment of the present invention.

FIG. 8 is a schematic circuit diagram illustrating a power factor correction circuit according to a seventh embodiment of the present invention. In comparison with the power factor correction circuit 1 of the first embodiment as shown in FIG. 1, the power factor correction circuit 1f of this embodiment further includes a first diode D1H and a second diode D1L, which are connected with each other in series. The cathode of the first diode D1H is electrically connected with the first terminal M7 of the output capacitor Cb, the first terminal M5 of the second bride arm 3 and the second terminal B of the first active clamp unit 4. The anode of the first diode D1H is electrically connected to the node between the first terminal M1 of the input power source AC and the first inductor L1. The cathode of the second diode D1L is electrically connected with the anode of the first diode D1H. The anode of the second diode D1L is electrically connected with the second terminal M8 of the output capacitor Cb, the second terminal M6 of the second bridge arm 3 and the second terminal M4 of the first bridge arm 2. In case that the AC input voltage of the power factor correction circuit 1f is abruptly increased to be higher than the output voltage Vb, the arrangement of the first diode D1H and the second diode D1L can limit the magnitude of the AC input voltage to be lower than a predetermined voltage value. Consequently, the electronic components of the power factor correction circuit 1f can be effectively protected.

Figure 9:
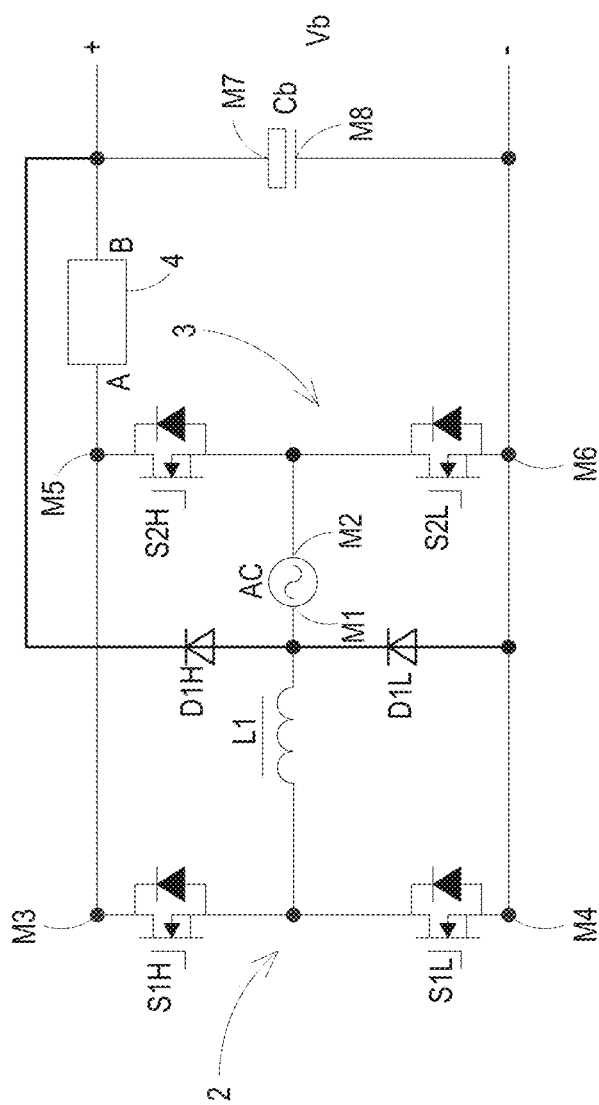
FIG. 9 is a schematic circuit diagram illustrating a power factor correction circuit according to an eighth embodiment of the present invention.

FIG. 9 is a schematic circuit diagram illustrating a power factor correction circuit according to an eighth embodiment of the present invention. In comparison with the power factor correction circuit 1a of the second embodiment as shown in FIG. 3, the power factor correction circuit 1g of this embodiment further includes a first diode D1H and a second diode D1L, which are connected with each other in series. The cathode of the first diode D1H is electrically connected with the first terminal M7 of the output capacitor Cb and the second terminal B of the first active clamp unit 4. The anode of the first diode D1H is electrically connected to the node between the first terminal M1 of the input power source AC and the first inductor L1. The cathode of the second diode D1L is electrically connected with the anode of the first diode D1H. The anode of the second diode D1L is electrically connected with the second terminal M8 of the output capacitor Cb, the second terminal M6 of the second bridge arm 3 and the second terminal M4 of the first bridge arm 2. In case that the AC input voltage of the power factor correction circuit 1g is abruptly increased to be higher than the output voltage Vb, the arrangement of the first diode D1H and the second diode D1L can limit the magnitude of the AC input voltage to be lower than a predetermined voltage value. Consequently, the electronic components of the power factor correction circuit 1g can be effectively protected.

Figure 10:
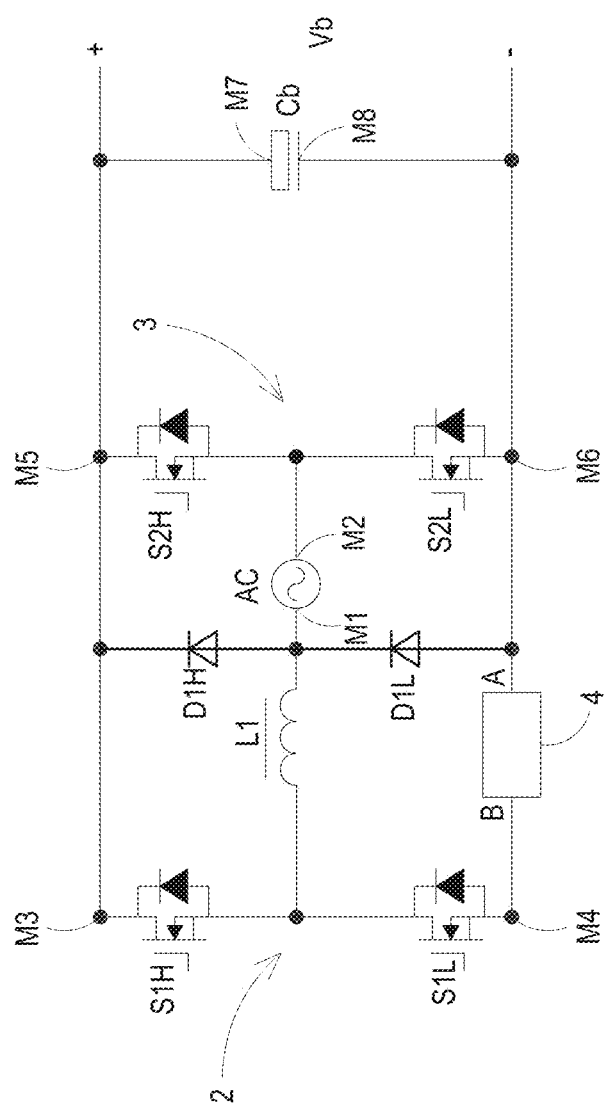
FIG. 10 is a schematic circuit diagram illustrating a power factor correction circuit according to a ninth embodiment of the present invention.

FIG. 10 is a schematic circuit diagram illustrating a power factor correction circuit according to a ninth embodiment of the present invention. In comparison with the power factor correction circuit 1b of the third embodiment as shown in FIG. 4, the power factor correction circuit 1h of this embodiment further includes a first diode D1H and a second diode D1L, which are connected with each other in series. The cathode of the first diode D1H is electrically connected with the first terminal M7 of the output capacitor Cb, the first terminal M5 of the second bride arm 3 and the first terminal M3 of the first bridge arm 2. The anode of the first diode D1H is electrically connected to the node between the first terminal M1 of the input power source AC and the first inductor L1. The cathode of the second diode D1L is electrically connected with the anode of the first diode D1H. The anode of the second diode D1L is electrically connected with the second terminal M8 of the output capacitor Cb, the second terminal M6 of the second bridge arm 3 and the first terminal A of the first active clamp unit 4. In case that the AC input voltage of the power factor correction circuit 1h is abruptly increased to be higher than the output voltage Vb, the arrangement of the first diode D1H and the second diode D1L can limit the magnitude of the AC input voltage to be lower than a predetermined voltage value. Consequently, the electronic components of the power factor correction circuit 1h can be effectively protected.

Figure 11:
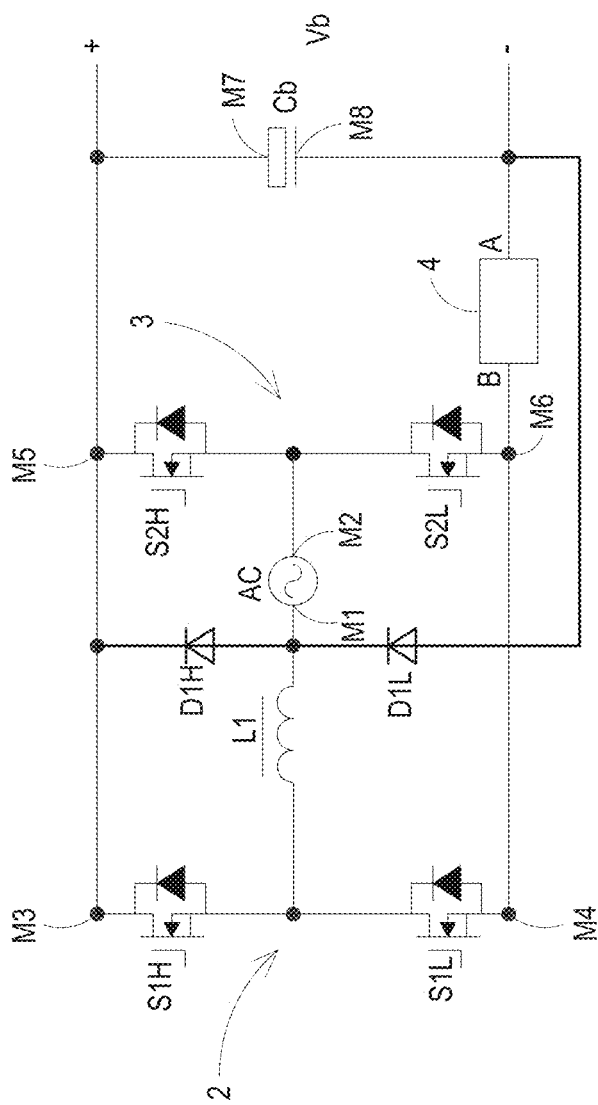
FIG. 11 is a schematic circuit diagram illustrating a power factor correction circuit according to a tenth embodiment of the present invention.

FIG. 11 is a schematic circuit diagram illustrating a power factor correction circuit according to a tenth embodiment of the present invention. In comparison with the power factor correction circuit 1c of the fourth embodiment as shown in FIG. 5, the power factor correction circuit 1i of this embodiment further includes a first diode D1H and a second diode D1L, which are connected with each other in series. The cathode of the first diode D1H is electrically connected with the first terminal M7 of the output capacitor Cb, the first terminal M5 of the second bride arm 3 and the first terminal M3 of the first bridge arm 2. The anode of the first diode D1H is electrically connected to the node between the first terminal M1 of the input power source AC and the first inductor L1. The cathode of the second diode D1L is electrically connected with the anode of the first diode D1H. The anode of the second diode D1L is electrically connected with the second terminal M8 of the output capacitor Cb and the first terminal A of the first active clamp unit 4. In case that the AC input voltage of the power factor correction circuit 1i is abruptly increased to be higher than the output voltage Vb, the arrangement of the first diode D1H and the second diode D1L can limit the magnitude of the AC input voltage to be lower than a predetermined voltage value. Consequently, the electronic components of the power factor correction circuit 1i can be effectively protected.

Figure 12:
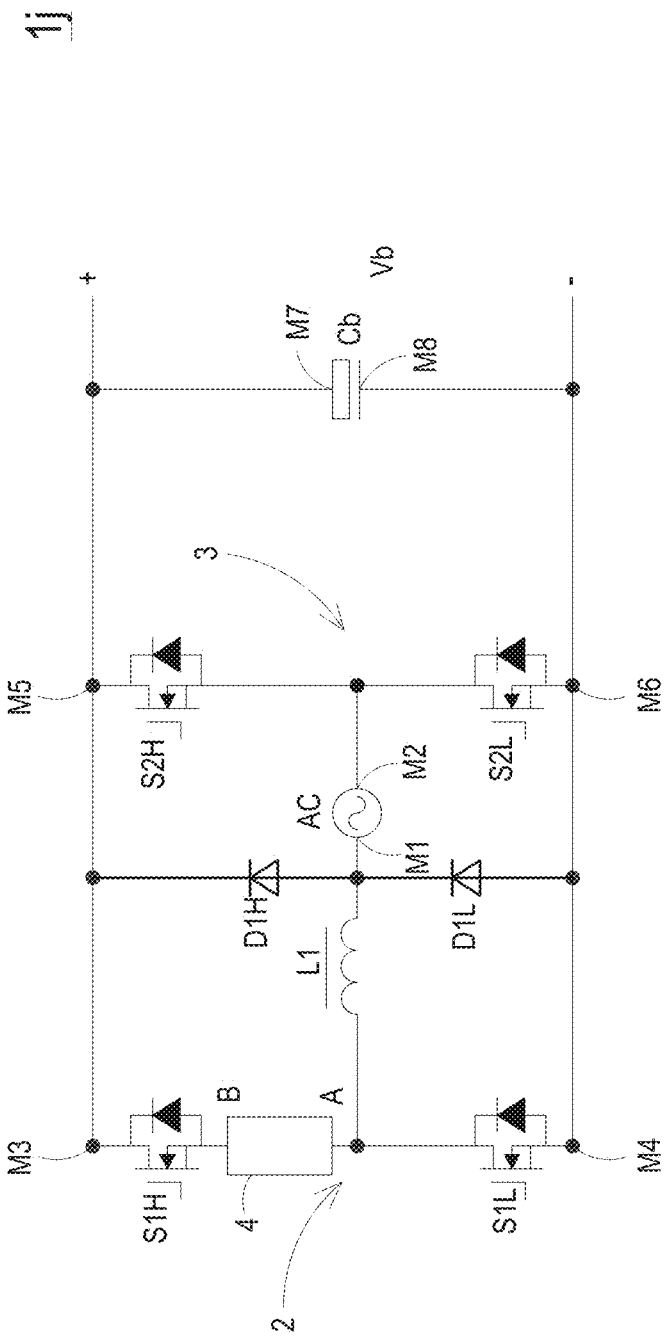
FIG. 12 is a schematic circuit diagram illustrating a power factor correction circuit according to an eleventh embodiment of the present invention.

FIG. 12 is a schematic circuit diagram illustrating a power factor correction circuit according to an eleventh embodiment of the present invention. In comparison with the power factor correction circuit 1d of the fifth embodiment as shown in FIG. 6, the power factor correction circuit 1j of this embodiment further includes a first diode D1H and a second diode D1L, which are connected with each other in series. The cathode of the first diode D1H is electrically connected with the first terminal M7 of the output capacitor Cb, the first terminal M5 of the second bride arm 3 and the first terminal M3 of the first bridge arm 2. The anode of the first diode D1H is electrically connected to the node between the first terminal M1 of the input power source AC and the first inductor L1. The cathode of the second diode D1L is electrically connected with the anode of the first diode D1H. The anode of the second diode D1L is electrically connected with the second terminal M8 of the output capacitor Cb, the second terminal M6 of the second bridge arm 3 and the second terminal M4 of the first bridge arm 2. In case that the AC input voltage of the power factor correction circuit 1j is abruptly increased to be higher than the output voltage Vb, the arrangement of the first diode D1H and the second diode D1L can limit the magnitude of the AC input voltage to be lower than a predetermined voltage value. Consequently, the electronic components of the power factor correction circuit 1j can be effectively protected.

Figure 13:
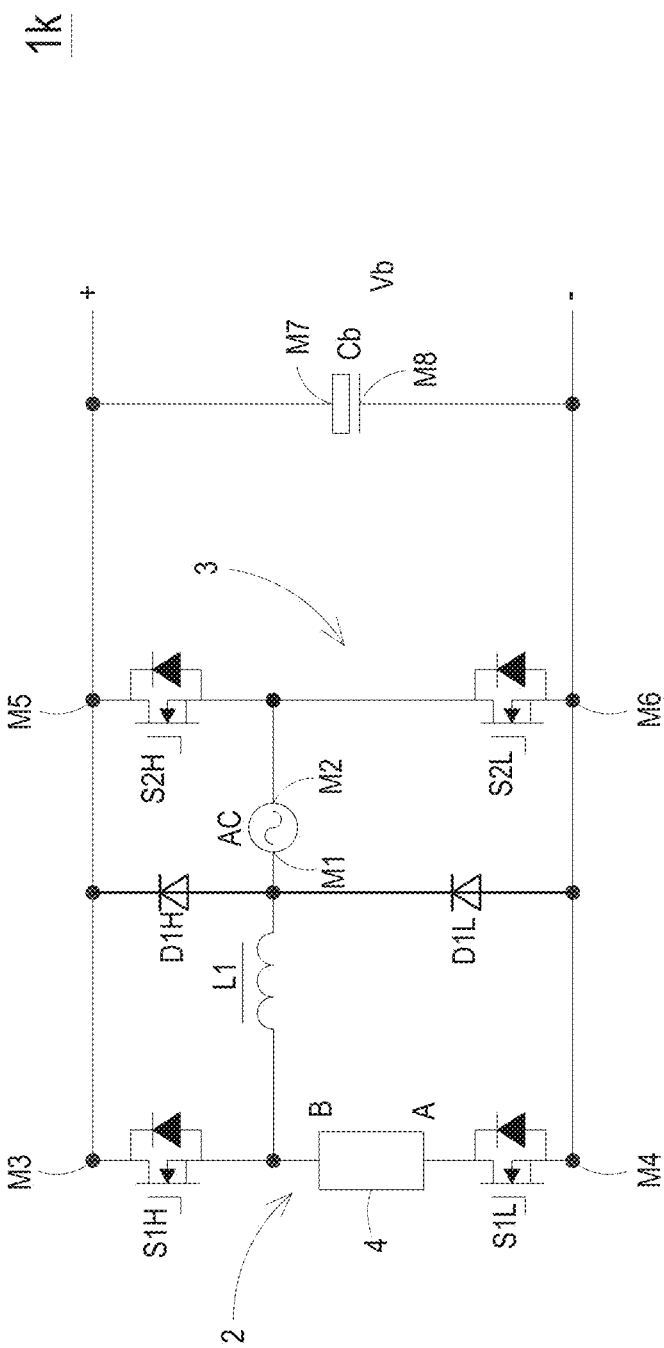
FIG. 13 is a schematic circuit diagram illustrating a power factor correction circuit according to a twelfth embodiment of the present invention.

FIG. 13 is a schematic circuit diagram illustrating a power factor correction circuit according to a twelfth embodiment of the present invention. In comparison with the power factor correction circuit 1e of the sixth embodiment as shown in FIG. 7, the power factor correction circuit 1k of this embodiment further includes a first diode D1H and a second diode D1L, which are connected with each other in series. The cathode of the first diode D1H is electrically connected with the first terminal M7 of the output capacitor Cb, the first terminal M5 of the second bride arm 3 and the first terminal M3 of the first bridge arm 2. The anode of the first diode D1H is electrically connected to the node between the first terminal M1 of the input power source AC and the first inductor L1. The cathode of the second diode D1L is electrically connected with the anode of the first diode D1H. The anode of the second diode D1L is electrically connected with the second terminal M8 of the output capacitor Cb, the second terminal M6 of the second bridge arm 3 and the second terminal M4 of the first bridge arm 2. In case that the AC input voltage of the power factor correction circuit 1k is abruptly increased to be higher than the output voltage Vb, the arrangement of the first diode D1H and the second diode D1L can limit the magnitude of the AC input voltage to be lower than a predetermined voltage value. Consequently, the electronic components of the power factor correction circuit 1k can be effectively protected.

Figure 14:
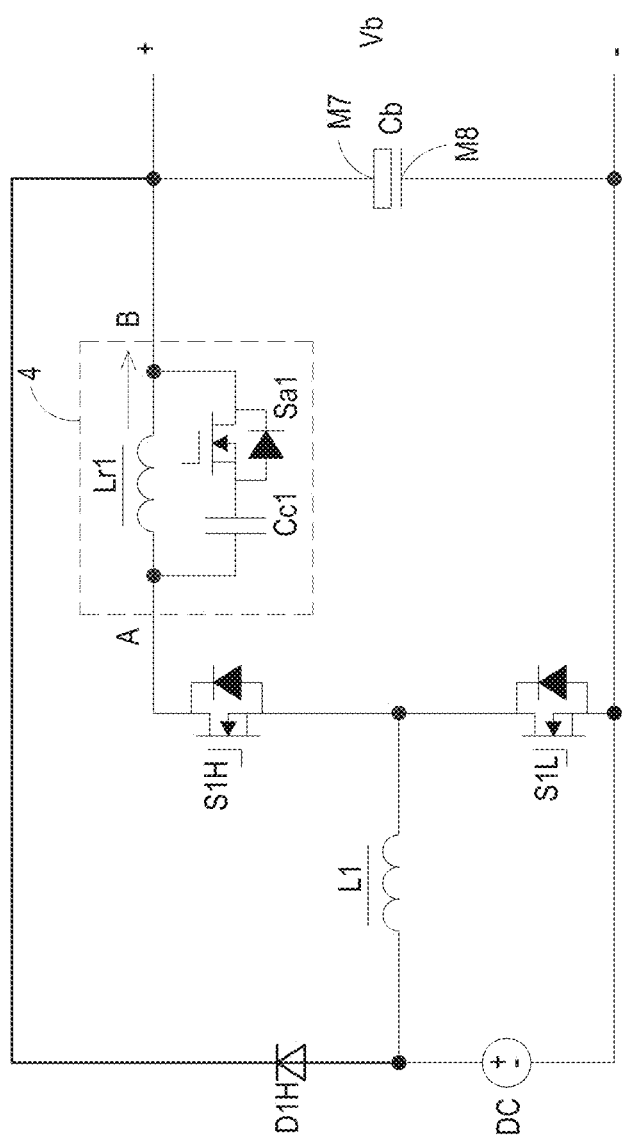
FIG. 14 is a schematic equivalent circuit of the power factor correction circuit as shown in FIG. 8 when the AC input voltage is positive.
Figure 15:
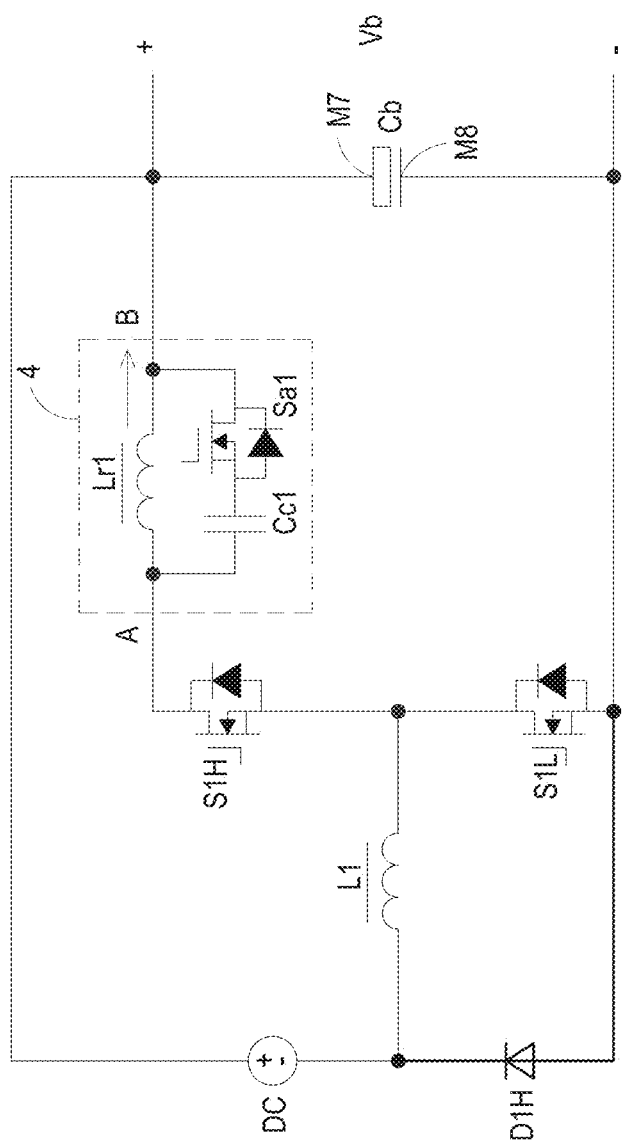
FIG. 15 is a schematic equivalent circuit of the power factor correction circuit as shown in FIG. 8 when the AC input voltage is negative.

A method of achieving the ZVS function of the power factor correction circuit through the use of the first active clamp unit will be described as follows. The power factor correction circuit 1f as shown in FIG. 8 is taken as an example. Please refer to FIGS. 14 and 15. FIG. 14 is a schematic equivalent circuit of the power factor correction circuit as shown in FIG. 8 when the AC input voltage is positive. FIG. 15 is a schematic equivalent circuit of the power factor correction circuit as shown in FIG. 8 when the AC input voltage is negative.

When the AC input voltage has a first polarity (e.g., a positive half sinusoid wave) and the instantaneous voltage of the AC input voltage is lower than the output voltage Vb, the first diode D1H and the second diode S2L are in the non-conducting state, the fourth switch S2L is maintained in the conduction state, and the third switch S2H is maintained in the non-conducting state. Consequently, the circuitry structure as shown in FIG. 14 is the equivalent circuit of the power factor correction circuit 1f as shown in FIG. 8. Under this circumstance, the second switch S1L may be considered as the main switch of the power factor correction circuit 1f. That is, during the operation of the input power source AC, the second switch S1L is mainly responsible for controlling the operation of the power factor correction circuit 1f. The first switch S1H may be considered as an auxiliary switch (also referred as a synchronous rectifier) of the power factor correction circuit 1f. In addition, the first switch S1H is used as a zero voltage switching (ZVS) switch. Consequently, when the second switch S1L is in the non-conducting state, the first switch S1H provides an internal freewheeling loop of the power factor correction circuit 1f. Moreover, since the first active clamp unit 4 is electrically connected with the first bridge arm 2, the first active clamp unit 4 can be provided within the internal freewheeling loop of the power factor correction circuit 1f. Before the first switch S1H is turned off, the first active clamp unit 4 can assist the freewheeling loop in reducing the instantaneous current. Consequently, the reverse recovery loss is reduced, and a certain degree of the ZVS function is achieved. Before the second switch S1L is turned on, the fifth switch Sa1 of the first active clamp unit 4 is in the non-conducting state and the second inductor Lr1 of the first active clamp unit 4 is discharged. Consequently, the parasitic diode in the second switch S1L is turned on, and the second switch S1L is further turned on. In such way, the ZVS function of the second switch S1L is achieved.

When the AC input voltage has a second polarity (e.g., a negative half sinusoid wave) and the instantaneous voltage of the AC input voltage is lower than the output voltage Vb, the fourth switch S2L is maintained in the conduction state, and the third switch S2H is maintained in the non-conducting state. Consequently, the circuitry structure as shown in FIG. 15 is the equivalent circuit of the power factor correction circuit 1f as shown in FIG. 8. Under this circumstance, the first switch S1H may be considered as the main switch of the power factor correction circuit 1f. That is, during the operation of the input power source AC, the first switch S1H is mainly responsible for controlling the operation of the power factor correction circuit 1f. The second switch S1L may be considered as an auxiliary switch (also referred as a synchronous rectifier) of the power factor correction circuit 1f. In addition, the second switch S1L is used as a zero voltage switching (ZVS) switch. Consequently, when the first switch S1H is in the non-conducting state, the second switch S1L provides an internal freewheeling loop of the power factor correction circuit 1f. Moreover, since the first active clamp unit 4 is electrically connected with the first bridge arm 2, the first active clamp unit 4 can be provided within the circuit loop of the power factor correction circuit 1f. Before the second switch S1L is turned off, the first active clamp unit 4 can assist the circuit loop in reducing the instantaneous current. Consequently, the reverse recovery loss is reduced, and a certain degree of the ZVS function is achieved. Before the first switch S1H is turned on, the fifth switch Sa1 of the first active clamp unit 4 is in the non-conducting state and the second inductor Lr1 of the first active clamp unit 4 is discharged. Consequently, the parasitic diode in the first switch S1H is turned on, and the first switch S1H is further turned on. In such way, the ZVS function of the first switch S1H is achieved.

Figure 16:
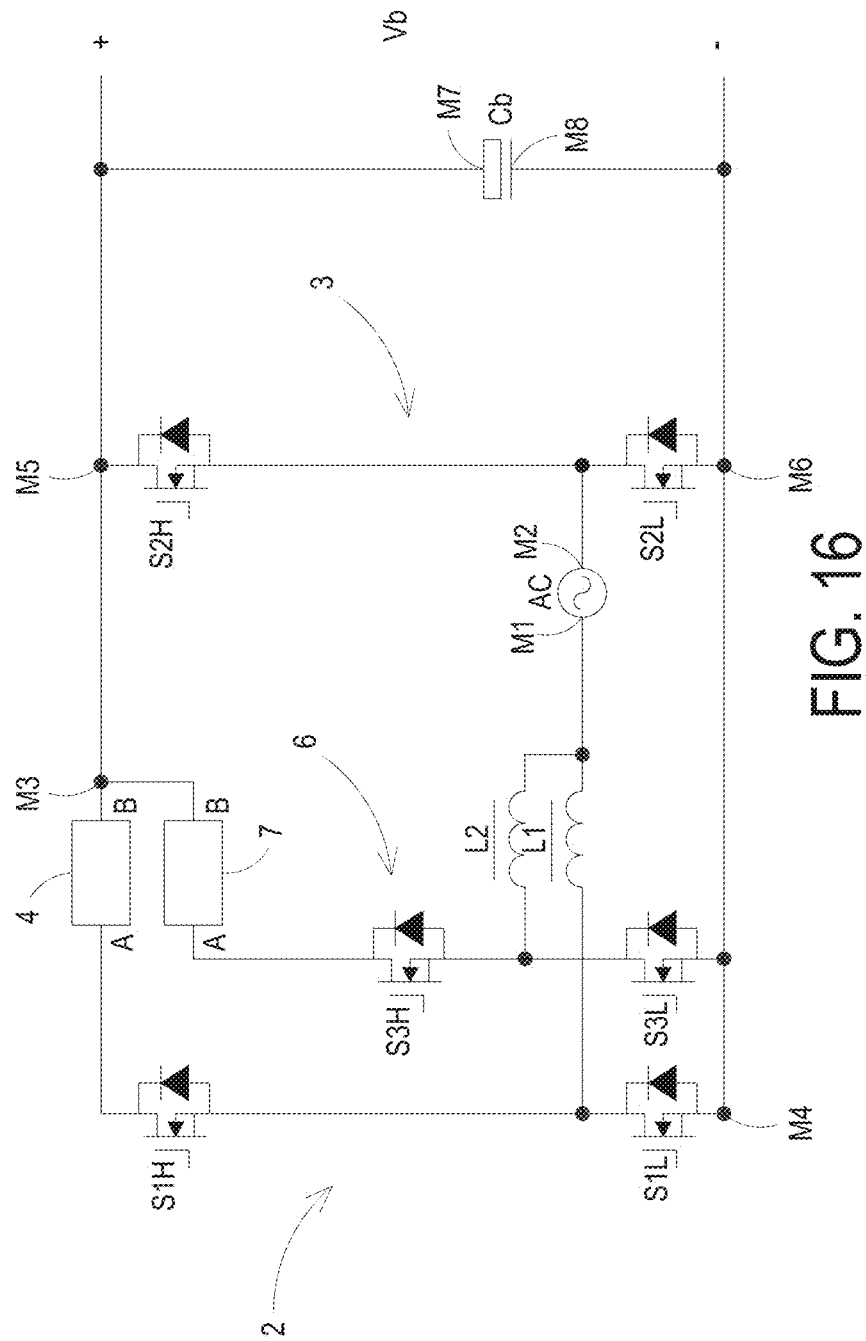
FIG. 16 is a schematic circuit diagram illustrating a power factor correction circuit according to a thirteenth embodiment of the present invention.
Figure 17:
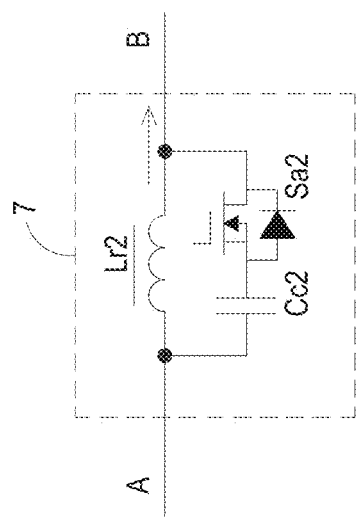
FIG. 17 is a schematic circuit diagram illustrating a second active clamp unit of the power factor correction circuit as shown in FIG. 16.

Please refer to FIGS. 16 and 17. FIG. 16 is a schematic circuit diagram illustrating a power factor correction circuit according to a thirteenth embodiment of the present invention. FIG. 17 is a schematic circuit diagram illustrating a second active clamp unit of the power factor correction circuit as shown in FIG. 16. In comparison with the power factor correction circuit 1 of the first embodiment as shown in FIG. 1, the power factor correction circuit 1l of this embodiment further includes a third bridge arm 6 and a third inductor L2. The first bridge arm 2 has a first terminal M3 and a second terminal M4. The first active clamp unit 4 is positioned in the first bridge arm 2. That is, the first bridge arm 2 includes the first switch S1H, the second switch S1L and the first active clamp unit 4. The first terminal A of the first active clamp unit 4 is electrically connected with the first switch S1H. The second terminal B of the first active clamp unit 4 is electrically connected with the first terminal M3 of the first bridge arm 2. The first bridge arm 2, the second bridge arm 3 and the third bridge arm 6 are connected with each other in parallel. The third bridge arm 6 and the first bridge arm 2 are operated in an interleaving manner. A first terminal of the third bridge arm 6 is electrically connected with the first terminal M5 of the second bridge arm 3. A second terminal of the third bridge arm 6 is electrically connected with the second terminal M6 of the second bridge arm 3. The third bridge arm 6 includes a sixth switch S3H, a seventh switch S3L and a second active clamp unit 7, which are connected with each other in series. The common node between the sixth switch S3H and the seventh switch S3L is electrically connected with the first terminal M1 of the input power source AC through the third inductor L2. In some embodiments, the third inductor L2 and the first inductor L1 are magnetically coupled to each other.

The second active clamp unit 7 has a first terminal A and a second terminal B. The first terminal A of the second active clamp unit 7 is electrically connected with a first terminal of the sixth switch S3H. The second terminal B of the second active clamp unit 7 is electrically connected with the first terminal M3 of the first bridge arm 2, the first terminal M5 of the second bridge arm 3 and the first terminal M7 of the output capacitor Cb. The position of the second active clamp unit 7 in the third bridge arm 6 is similar to the position of the first active clamp unit 4 in the first bridge arm 2. That is, each of the first active clamp unit 4 and the second active clamp unit 7 is connected between the first terminal of the corresponding bridge arm and the corresponding switch. The seventh switch S3L is electrically connected with the second terminal M4 of the first bridge arm 2, the second terminal M6 of the second bridge arm 3 and the second terminal M8 of the output capacitor Cb. Similarly, the power factor correction circuit 1l of this embodiment uses the interleaving technology. In addition to the first bridge arm 2, the second bridge arm 3 and the first inductor L1, the power factor correction circuit 1l further includes the third bridge arm 6 (with the second active clamp unit 7) and the third inductor L2. Consequently, the power factor correction circuit 1l has the high power conversion capability.

The circuitry structure of the first active clamp unit 4 is similar to that of FIG. 2, and not redundantly described herein. As shown in FIG. 17, the second active clamp unit 7 includes a fourth inductor Lr2, a second clamp capacitor Cc2 and an eighth switch Sa2. A first terminal and a second terminal of the fourth inductor Lr2 are electrically connected with the first terminal A and the second terminal B of the second active clamp unit 7. A first terminal of the second clamp capacitor Cc2 is electrically connected with the first terminal A of the second active clamp unit 7 and the first terminal of the fourth inductor Lr2. A second terminal of the second clamp capacitor Cc2 is electrically connected with a first terminal of the eighth switch Sa2. A second terminal of the eighth switch Sa2 is electrically connected with the second terminal B of the second active clamp unit 7 and the second terminal of the fourth inductor Lr2.

In an embodiment, at least one of the second inductor Lr1 and the fourth inductor Lr2 is a planar magnetic element. In an embodiment, at least one of the first switch S1H, the second switch S1L, the sixth switch S3H, the seventh switch S3L, the fifth switch Sa1 and the eighth switch Sa2 is a wide bandgap semiconductor device. Alternatively, in another embodiment, at least one of the third switch S2H and the fourth switch S2L is a wide bandgap semiconductor device or a silicon semiconductor device.

Figure 18:
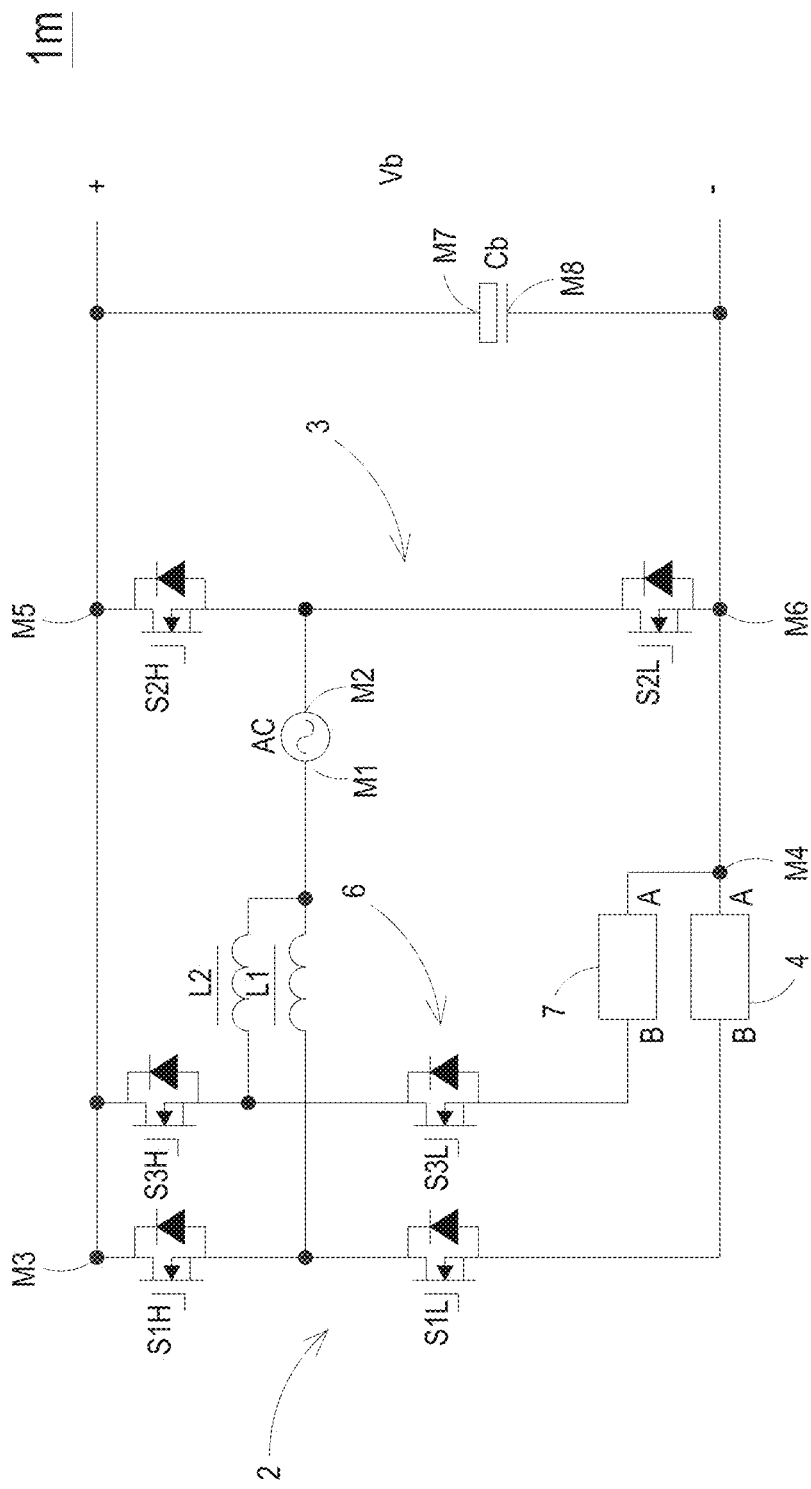
FIG. 18 is a schematic circuit diagram illustrating a power factor correction circuit according to a fourteenth embodiment of the present invention.

FIG. 18 is a schematic circuit diagram illustrating a power factor correction circuit according to a fourteenth embodiment of the present invention. In comparison with the power factor correction circuit 1b of the third embodiment as shown in FIG. 4, the power factor correction circuit 1m of this embodiment further includes a third bridge arm 6 and a third inductor L2. The first bridge arm 2 has a first terminal M3 and a second terminal M4. The first active clamp unit 4 is positioned in the first bridge arm 2. That is, the first bridge arm 2 includes the first switch S1H, the second switch S1L and the first active clamp unit 4. The first terminal A of the first active clamp unit 4 is electrically connected with the second terminal M6 of the second bridge arm 3 and the second terminal M8 of the output capacitor Cb. The second terminal B of the first active clamp unit 4 is electrically connected with the second switch S1L. The first bridge arm 2, the second bridge arm 3 and the third bridge arm 6 are connected with each other in parallel. The third bridge arm 6 and the first bridge arm 2 are operated in an interleaving manner. A first terminal of the third bridge arm 6 is electrically connected with the first terminal M5 of the second bridge arm 3. A second terminal of the third bridge arm 6 is electrically connected with the second terminal M6 of the second bridge arm 3. The third bridge arm 6 includes a sixth switch S3H, a seventh switch S3L and a second active clamp unit 7, which are connected with each other in series. The common node between the sixth switch S3H and the seventh switch S3L is electrically connected with the first terminal M1 of the input power source AC through the third inductor L2. In some embodiments, the third inductor L2 and the first inductor L1 are magnetically coupled to each other.

The second active clamp unit 7 has a first terminal A and a second terminal B. The first terminal A of the second active clamp unit 7 is electrically connected with the second terminal of the third bridge arm 6, the first terminal A of the first active clamp unit 4, the second terminal M6 of the second bridge arm 3 and the second terminal M8 of the output capacitor Cb. The second terminal B of the second active clamp unit 7 is electrically connected with the seventh switch S3L. The position of the second active clamp unit 7 in the third bridge arm 6 is similar to the position of the first active clamp unit 4 in the first bridge arm 2. That is, each of the first active clamp unit 4 and the second active clamp unit 7 is connected between the second terminal of the corresponding bridge arm and the corresponding switch. The seventh switch S3L is electrically connected with the sixth switch S3H and the third inductor L2. The sixth switch S3H is electrically connected with the first terminal of the third bridge arm 6. Similarly, the power factor correction circuit 1m of this embodiment uses the interleaving technology. In addition to the first bridge arm 2, the second bridge arm 3 and the first inductor L1, the power factor correction circuit 1m further includes the third bridge arm 6 (with the second active clamp unit 7) and the third inductor L2. Consequently, the power factor correction circuit 1m has the high power conversion capability.

Figure 19:
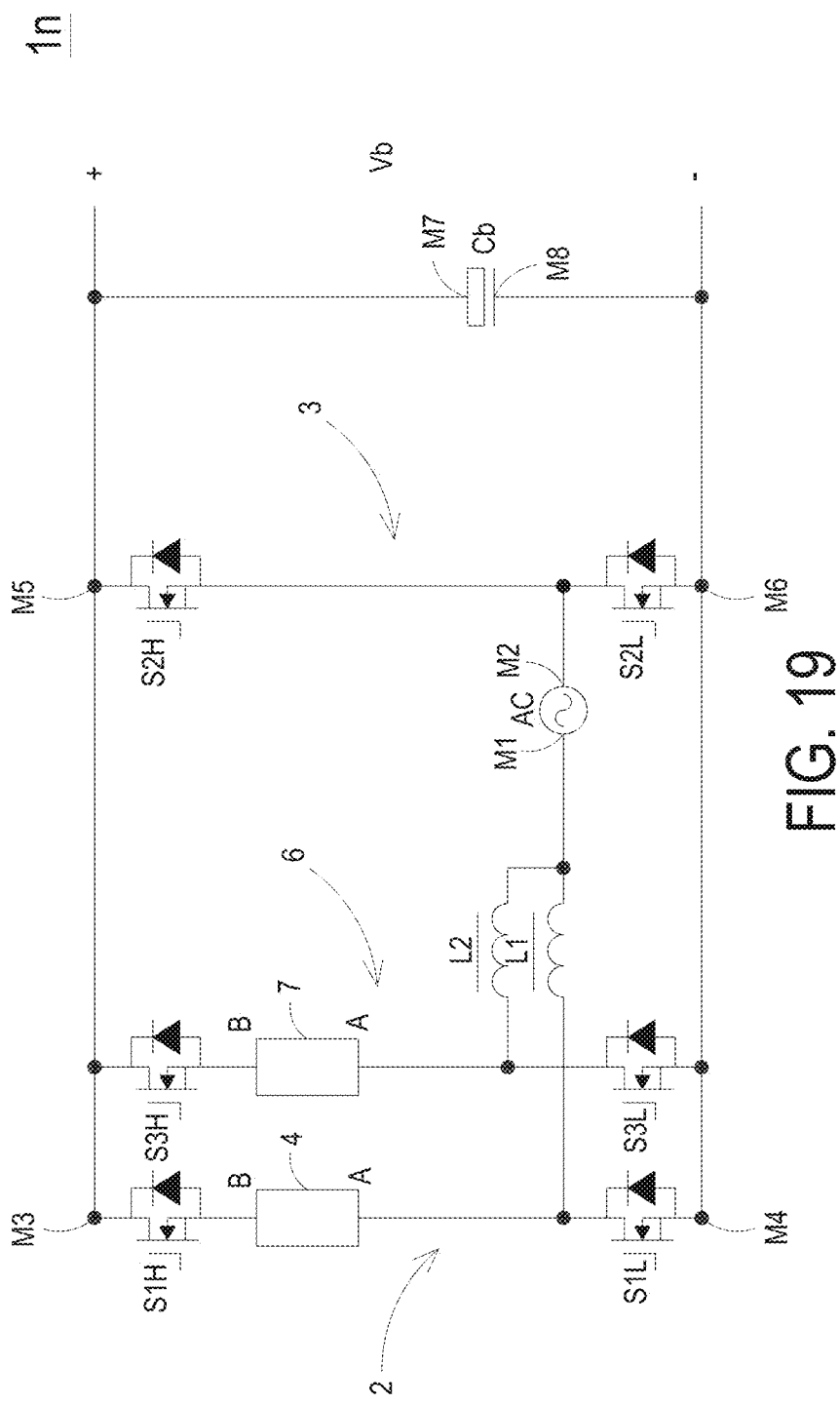
FIG. 19 is a schematic circuit diagram illustrating a power factor correction circuit according to a fifteenth embodiment of the present invention.

FIG. 19 is a schematic circuit diagram illustrating a power factor correction circuit according to a fifteenth embodiment of the present invention. In comparison with the power factor correction circuit 1d of the fifth embodiment as shown in FIG. 6, the power factor correction circuit 1n of this embodiment further includes a third bridge arm 6 and a third inductor L2. The first bridge arm 2, the second bridge arm 3 and the third bridge arm 6 are connected with each other in parallel. The third bridge arm 6 and the first bridge arm 2 are operated in an interleaving manner. A first terminal of the third bridge arm 6 is electrically connected with the first terminal M5 of the second bridge arm 3. A second terminal of the third bridge arm 6 is electrically connected with the second terminal M6 of the second bridge arm 3. The third bridge arm 6 includes a sixth switch S3H, a seventh switch S3L and a second active clamp unit 7, which are connected with each other in series. The sixth switch S3H is electrically connected with the first terminal of the third bridge arm 6. The seventh switch S3L is electrically connected with the second terminal of the third bridge arm 6. In some embodiments, the third inductor L2 and the first inductor L1 are magnetically coupled to each other.

The second active clamp unit 7 has a first terminal A and a second terminal B. The common node between the first terminal A of the second active clamp unit 7 and the seventh switch S3L is electrically connected with the first terminal M1 of the input power source AC through the third inductor L2. The second terminal B of the second active clamp unit 7 is electrically connected with the second terminal of the sixth switch S3H. The position of the second active clamp unit 7 in the third bridge arm 6 is similar to the position of the first active clamp unit 4 in the first bridge arm 2. That is, each of the first active clamp unit 4 and the second active clamp unit 7 is connected between the two switches of the corresponding bride arm. Similarly, the power factor correction circuit 1n of this embodiment uses the interleaving technology. In addition to the first bridge arm 2, the second bridge arm 3 and the first inductor L1, the power factor correction circuit 1n further includes the third bridge arm 6 (with the second active clamp unit 7) and the third inductor L2. Consequently, the power factor correction circuit 1n has the high power conversion capability.

Figure 20:
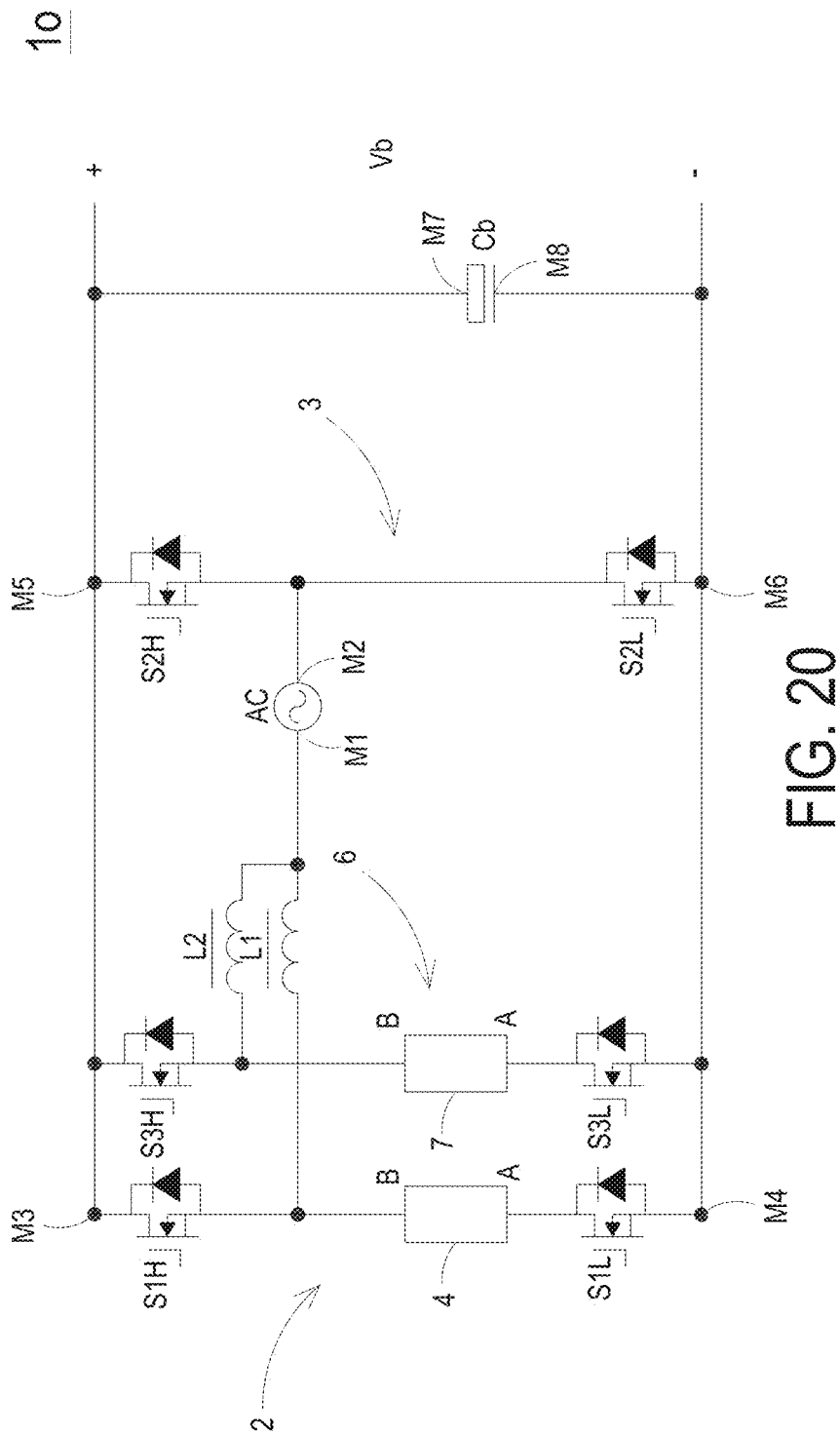
FIG. 20 is a schematic circuit diagram illustrating a power factor correction circuit according to a sixteenth embodiment of the present invention.

FIG. 20 is a schematic circuit diagram illustrating a power factor correction circuit according to a sixteenth embodiment of the present invention. In comparison with the power factor correction circuit 1e of the sixth embodiment as shown in FIG. 6, the power factor correction circuit 1o of this embodiment further includes a third bridge arm 6 and a third inductor L2. The first bridge arm 2, the second bridge arm 3 and the third bridge arm 6 are connected with each other in parallel. The third bridge arm 6 and the first bridge arm 2 are operated in an interleaving manner. A first terminal of the third bridge arm 6 is electrically connected with the first terminal M5 of the second bridge arm 3. A second terminal of the third bridge arm 6 is electrically connected with the second terminal M6 of the second bridge arm 3. The third bridge arm 6 includes a sixth switch S3H, a seventh switch S3L and a second active clamp unit 7, which are connected with each other in series. The sixth switch S3H is electrically connected with the first terminal of the third bridge arm 6. The seventh switch S3L is electrically connected with the second terminal of the third bridge arm 6. In some embodiments, the third inductor L2 and the first inductor L1 are magnetically coupled to each other.

The second active clamp unit 7 has a first terminal A and a second terminal B. The first terminal A of the second active clamp unit 7 is electrically connected with the seventh switch S3L. The common node between the second terminal B of the second active clamp unit 7 and the sixth switch S3H is electrically connected with the first terminal M1 of the input power source AC through the third inductor L2. The position of the second active clamp unit 7 in the third bridge arm 6 is similar to the position of the first active clamp unit 4 in the first bridge arm 2. That is, each of the first active clamp unit 4 and the second active clamp unit 7 is connected between the two switches of the corresponding bride arm. Similarly, the power factor correction circuit 1o of this embodiment uses the interleaving technology. In addition to the first bridge arm 2, the second bridge arm 3 and the first inductor L1, the power factor correction circuit 1o further includes the third bridge arm 6 (with the second active clamp unit 7) and the third inductor L2. Consequently, the power factor correction circuit 1o has the high power conversion capability.

Figure 21:
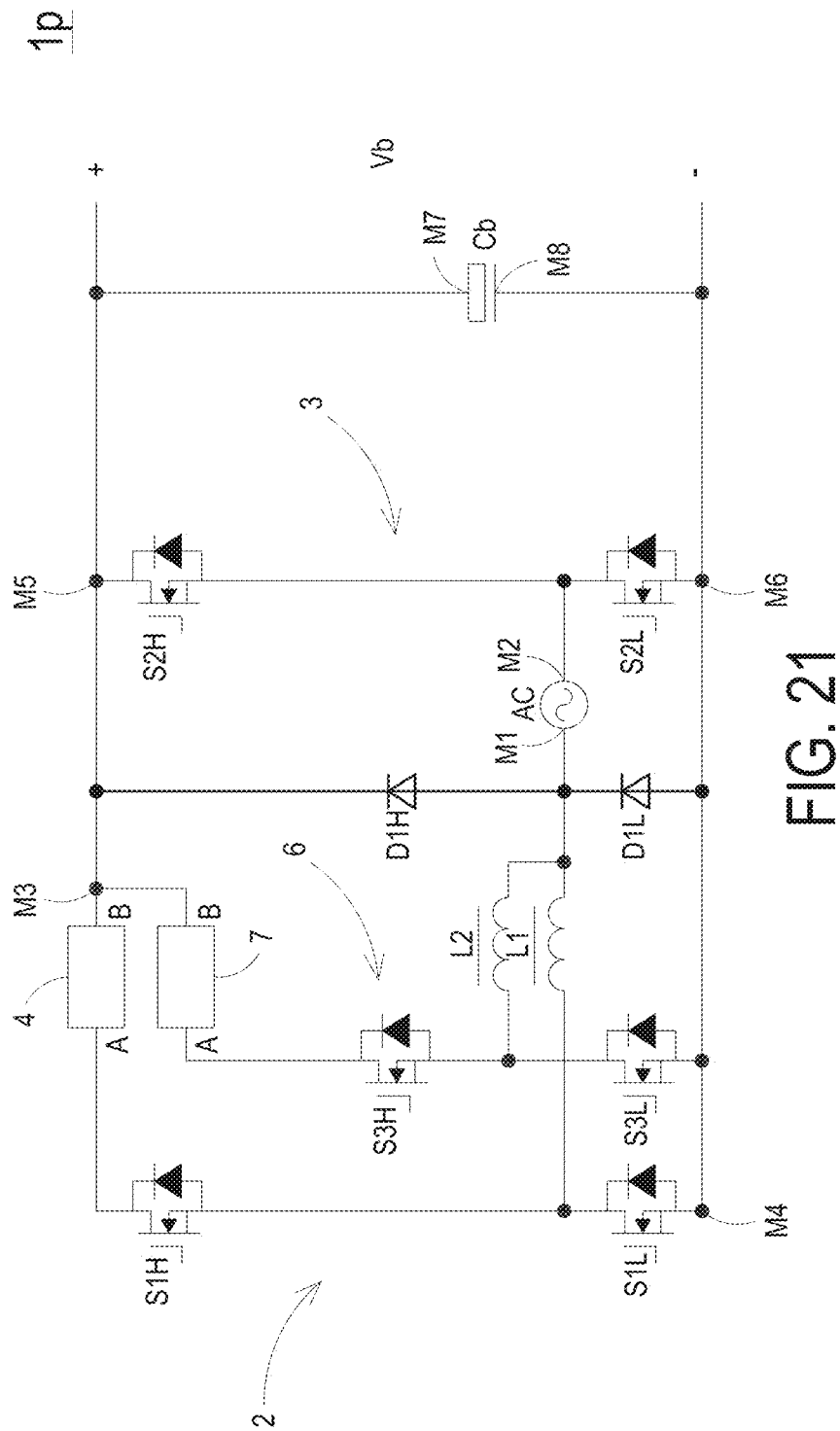
FIG. 21 is a schematic circuit diagram illustrating a power factor correction circuit according to a seventeenth embodiment of the present invention.

FIG. 21 is a schematic circuit diagram illustrating a power factor correction circuit according to a seventeenth embodiment of the present invention. In comparison with the power factor correction circuit 1l of the thirteenth embodiment as shown in FIG. 16, the power factor correction circuit 1p of this embodiment further includes a first diode D1H and a second diode D1L, which are connected with each other in series. The cathode of the first diode D1H is electrically connected with the first terminal M7 of the output capacitor Cb, the first terminal M3 of the first bridge arm 2, the first terminal M5 of the second bride arm 3 and the first terminal of the third bridge arm 6. The anode of the first diode D1H is electrically connected to the node between the first terminal M1 of the input power source AC, the first inductor L1 and the third inductor L2. The cathode of the second diode D1L is electrically connected with the anode of the first diode D1H. The anode of the second diode D1L is electrically connected with the second terminal M8 of the output capacitor Cb, the second terminal M4 of the first bridge arm 2 and the second terminal M6 of the second bridge arm 3. In case that the AC input voltage of the power factor correction circuit 1p is abruptly increased to be higher than the output voltage Vb, the arrangement of the first diode D1H and the second diode D1L can limit the magnitude of the AC input voltage to be lower than a predetermined voltage value. Consequently, the electronic components of the power factor correction circuit 1p can be effectively protected.

Figure 22:
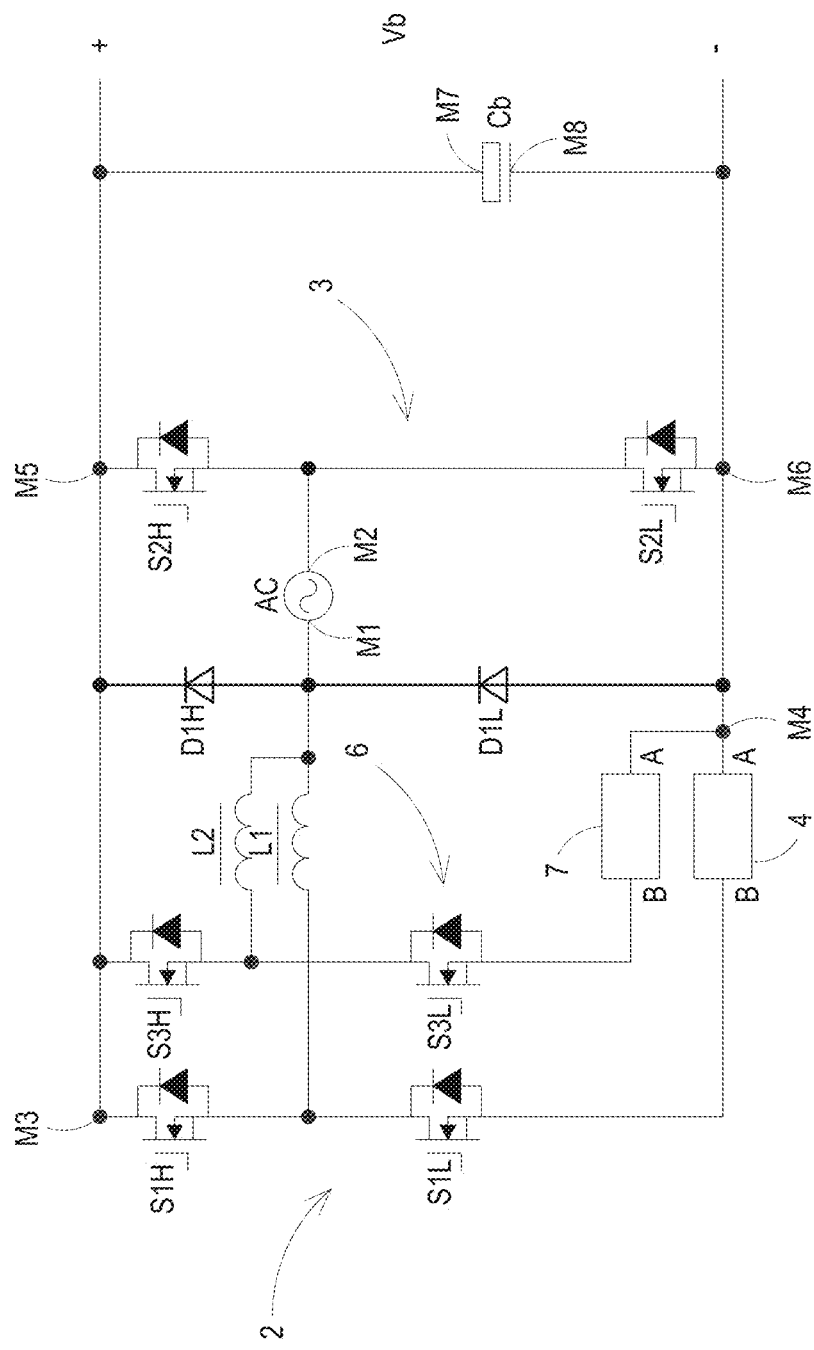
FIG. 22 is a schematic circuit diagram illustrating a power factor correction circuit according to an eighteenth embodiment of the present invention.

FIG. 22 is a schematic circuit diagram illustrating a power factor correction circuit according to an eighteenth embodiment of the present invention. In comparison with the power factor correction circuit 1m of the fourteenth embodiment as shown in FIG. 18, the power factor correction circuit 1q of this embodiment further includes a first diode D1H and a second diode D1L, which are connected with each other in series. The cathode of the first diode D1H is electrically connected with the first terminal M7 of the output capacitor Cb, the first terminal M3 of the first bridge arm 2, the first terminal M5 of the second bride arm 3 and the first terminal of the third bridge arm 6. The anode of the first diode D1H is electrically connected to the node between the first terminal M1 of the input power source AC, the first inductor L1 and the third inductor L2. The cathode of the second diode D1L is electrically connected with the anode of the first diode D1H. The anode of the second diode D1L is electrically connected with the second terminal M8 of the output capacitor Cb, the second terminal M6 of the second bridge arm 3 and the second terminal M4 of the first bridge arm 2. In case that the AC input voltage of the power factor correction circuit 1q is abruptly increased to be higher than the output voltage Vb, the arrangement of the first diode D1H and the second diode D1L can limit the magnitude of the AC input voltage to be lower than a predetermined voltage value. Consequently, the electronic components of the power factor correction circuit 1q can be effectively protected.

Figure 23:
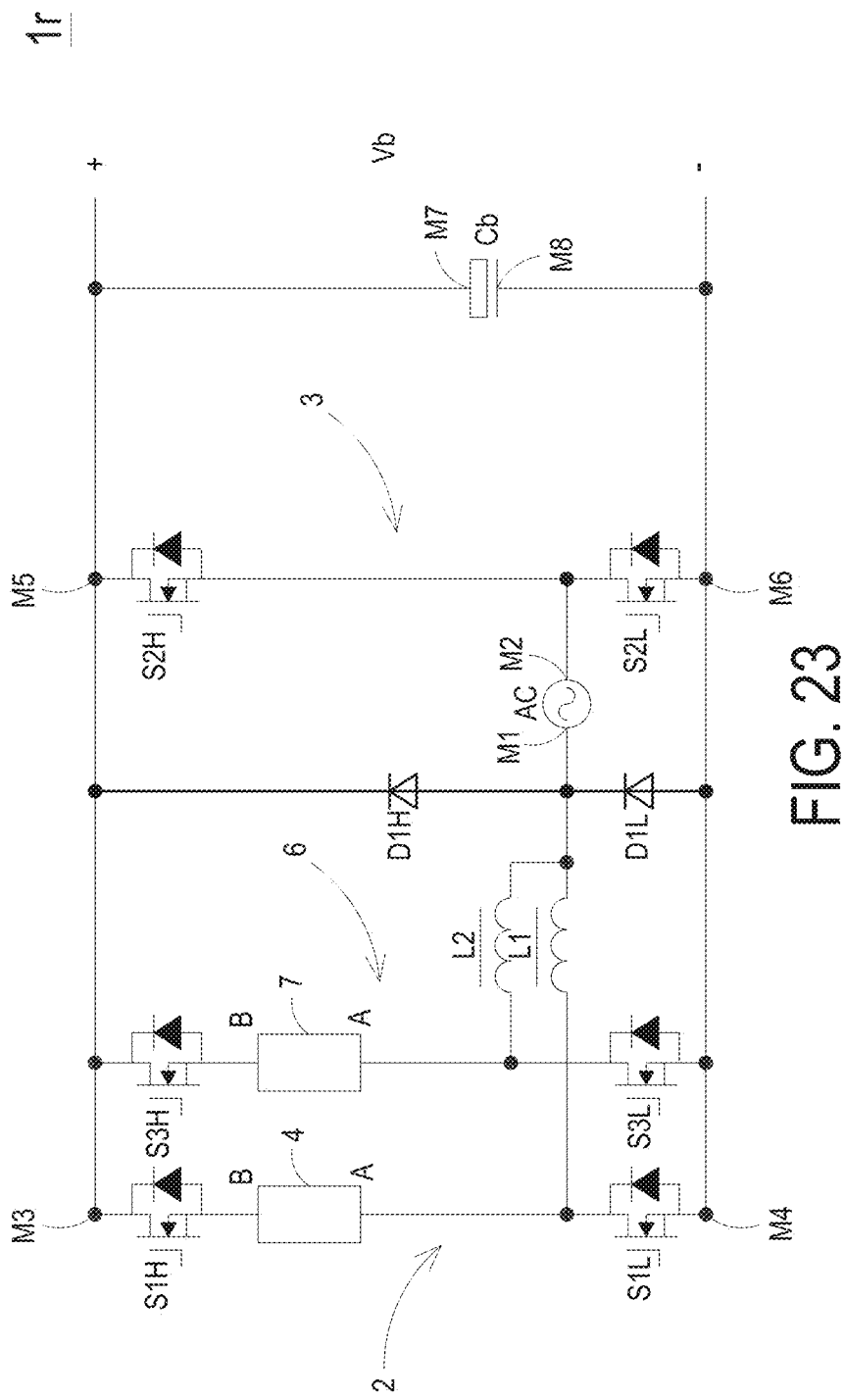
FIG. 23 is a schematic circuit diagram illustrating a power factor correction circuit according to a nineteenth embodiment of the present invention.

FIG. 23 is a schematic circuit diagram illustrating a power factor correction circuit according to a nineteenth embodiment of the present invention. In comparison with the power factor correction circuit 1n of the fifteenth embodiment as shown in FIG. 19, the power factor correction circuit 1r of this embodiment further includes a first diode D1H and a second diode D1L, which are connected with each other in series. The cathode of the first diode D1H is electrically connected with the first terminal M7 of the output capacitor Cb, the first terminal M3 of the first bridge arm 2, the first terminal M5 of the second bride arm 3 and the first terminal of the third bridge arm 6. The anode of the first diode D1H is electrically connected to the first terminal M1 of the input power source AC, the first inductor L1 and the third inductor L2. The cathode of the second diode D1L is electrically connected with the anode of the first diode D1H. The anode of the second diode D1L is electrically connected with the second terminal M8 of the output capacitor Cb, the second terminal M6 of the second bridge arm 3 and the second terminal M4 of the first bridge arm 2. In case that the AC input voltage of the power factor correction circuit 1r is abruptly increased to be higher than the output voltage Vb, the arrangement of the first diode D1H and the second diode D1L can limit the magnitude of the AC input voltage to be lower than a predetermined voltage value. Consequently, the electronic components of the power factor correction circuit 1r can be effectively protected.

Figure 24:
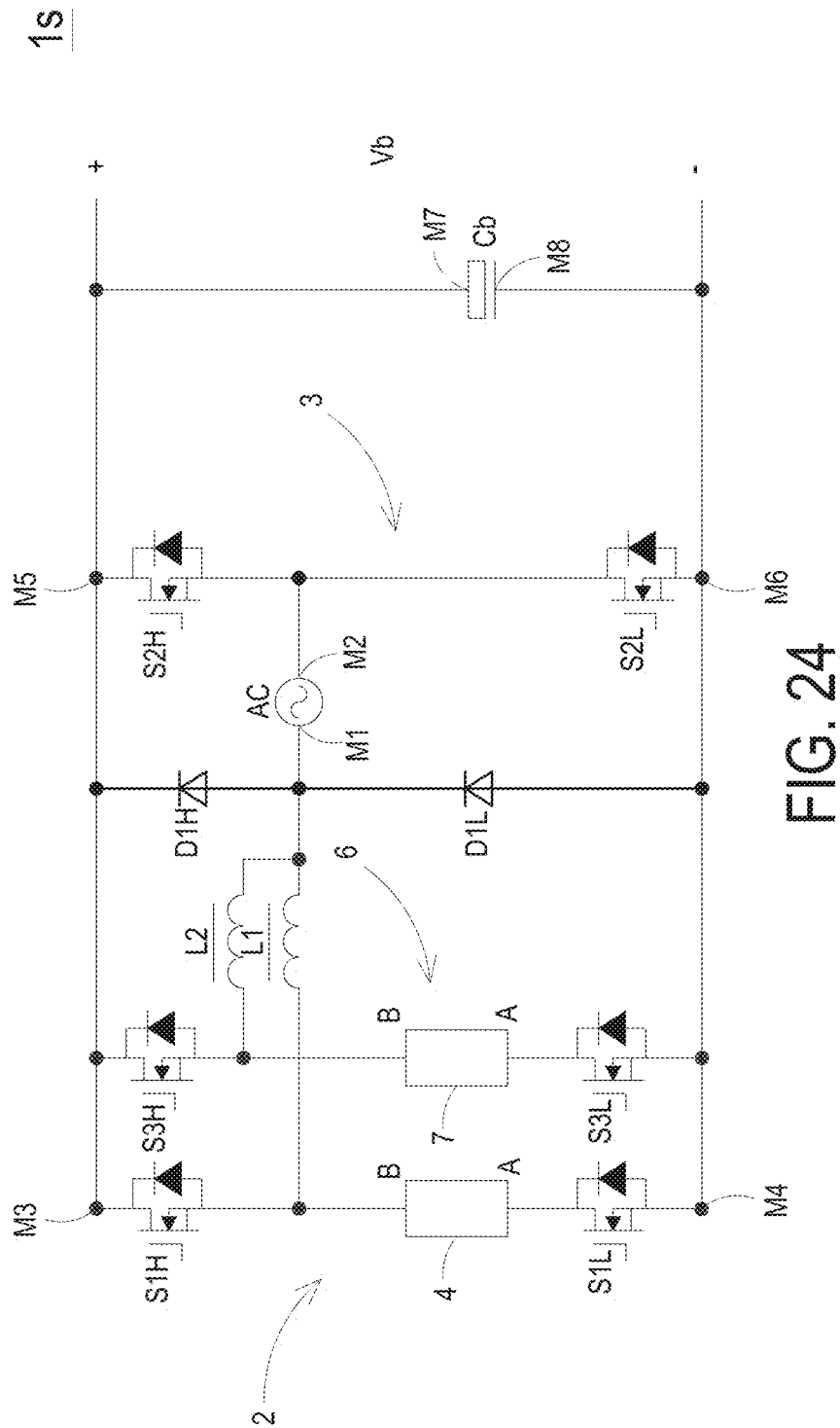
FIG. 24 is a schematic circuit diagram illustrating a power factor correction circuit according to a twentieth embodiment of the present invention.

FIG. 24 is a schematic circuit diagram illustrating a power factor correction circuit according to a twentieth embodiment of the present invention. In comparison with the power factor correction circuit 1o of the sixteenth embodiment as shown in FIG. 20, the power factor correction circuit 1s of this embodiment further includes a first diode D1H and a second diode D1L, which are connected with each other in series. The cathode of the first diode D1H is electrically connected with the first terminal M7 of the output capacitor Cb, the first terminal M3 of the first bridge arm 2, the first terminal M5 of the second bride arm 3 and the first terminal of the third bridge arm 6. The anode of the first diode D1H is electrically connected to the first terminal M1 of the input power source AC, the first inductor L1 and the third inductor L2. The cathode of the second diode D1L is electrically connected with the anode of the first diode D1H. The anode of the second diode D1L is electrically connected with the second terminal M8 of the output capacitor Cb, the second terminal M6 of the second bridge arm 3 and the second terminal M4 of the first bridge arm 2. In case that the AC input voltage of the power factor correction circuit 1s is abruptly increased to be higher than the output voltage Vb, the arrangement of the first diode D1H and the second diode D1L can limit the magnitude of the AC input voltage to be lower than a predetermined voltage value. Consequently, the electronic components of the power factor correction circuit is can be effectively protected.

The present disclosure further provides a control method for the power factor correction circuit. Hereinafter, the control method for the power factor correction circuit 1 of FIG. 1 will be described as an example. Generally, the power factor correction circuit works through a control unit (not shown) of the power factor correction circuit. According to a plurality of driving signals, the control unit controls the operations of all switches of the power factor correction circuit. It is noted that the power factor correction circuit of any other embodiment also includes the control unit. For succinctness, the control unit is not shown in the drawings.

Figure 25:
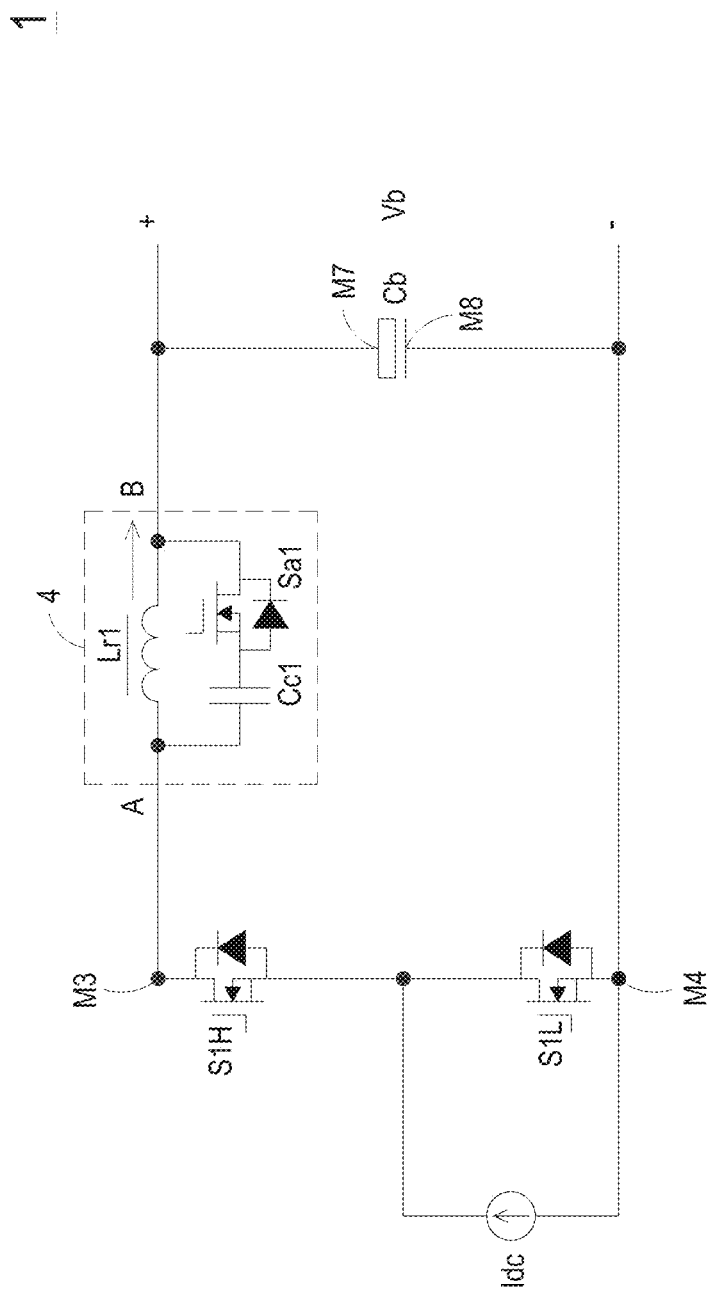
FIG. 25 is a schematic equivalent circuit of the power factor correction circuit as shown in FIG. 1 when the AC input voltage is positive.
Figure 26A:
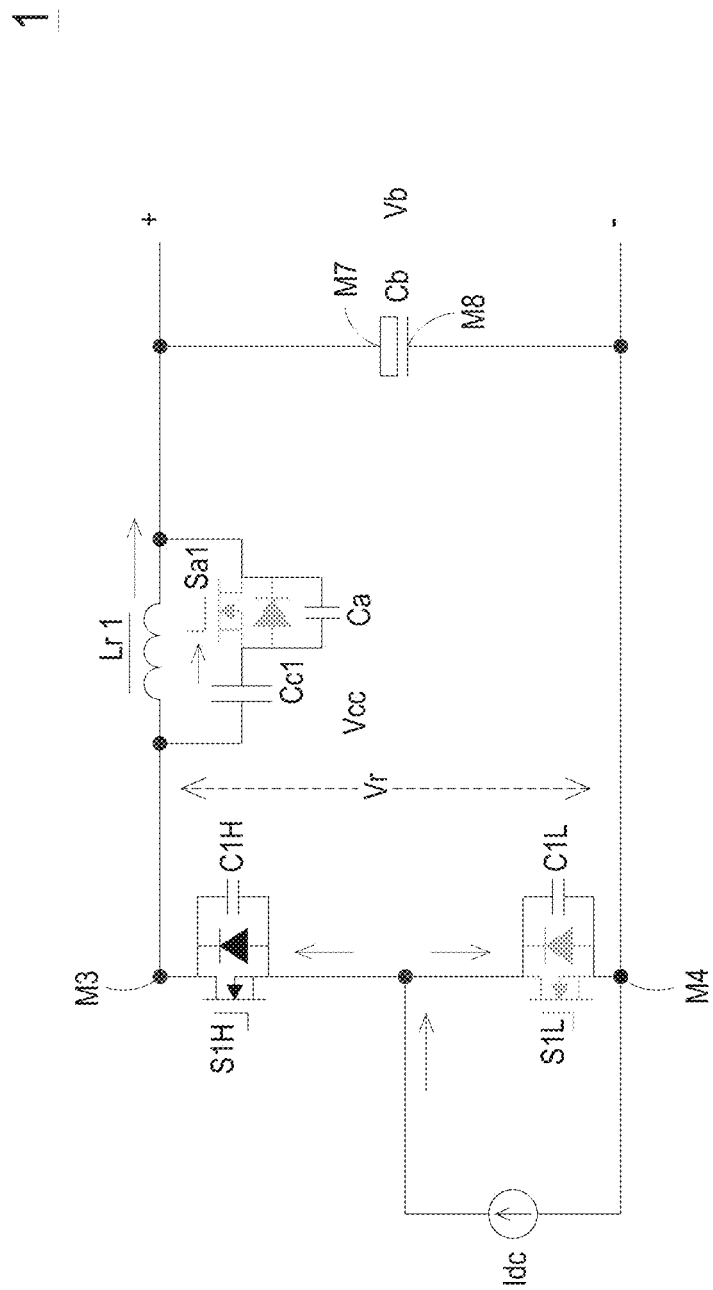
FIGS. 26A to 26I are schematic circuit diagrams illustrating the operations of the power factor correction circuit as shown in FIG. 25 in different time intervals.
Figure 26B:
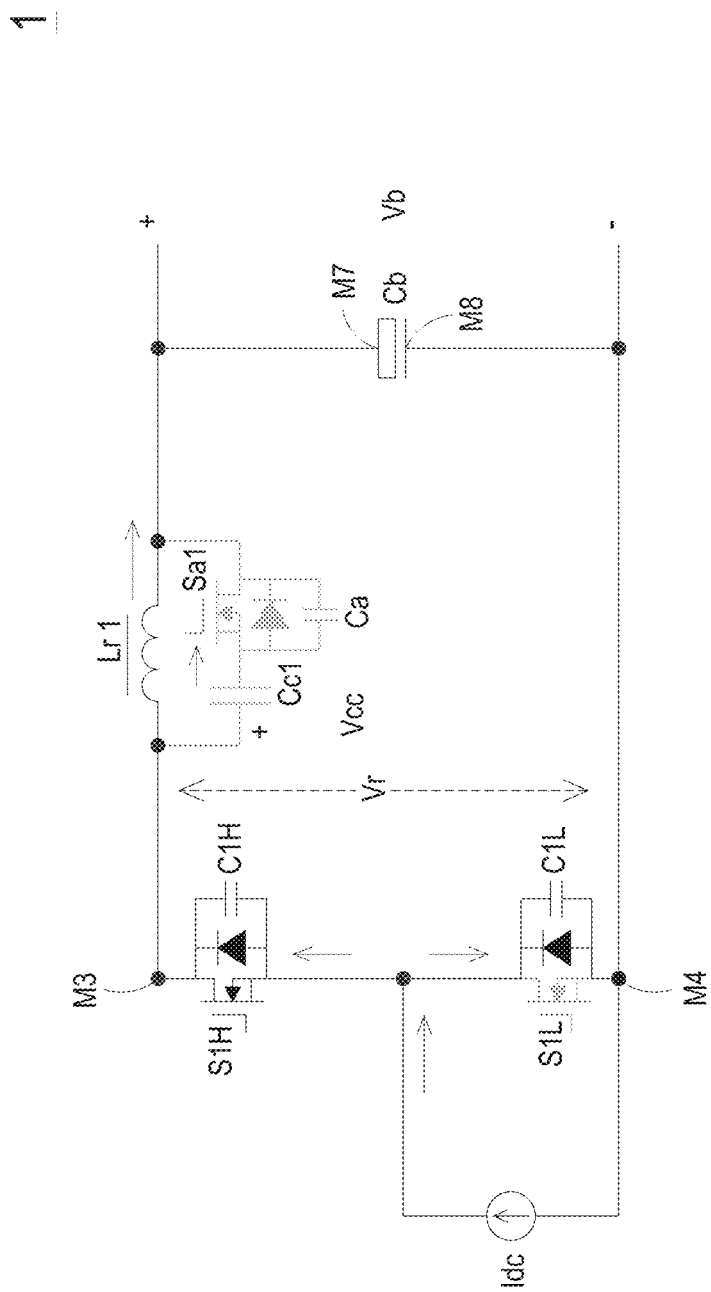
Figure 26C:
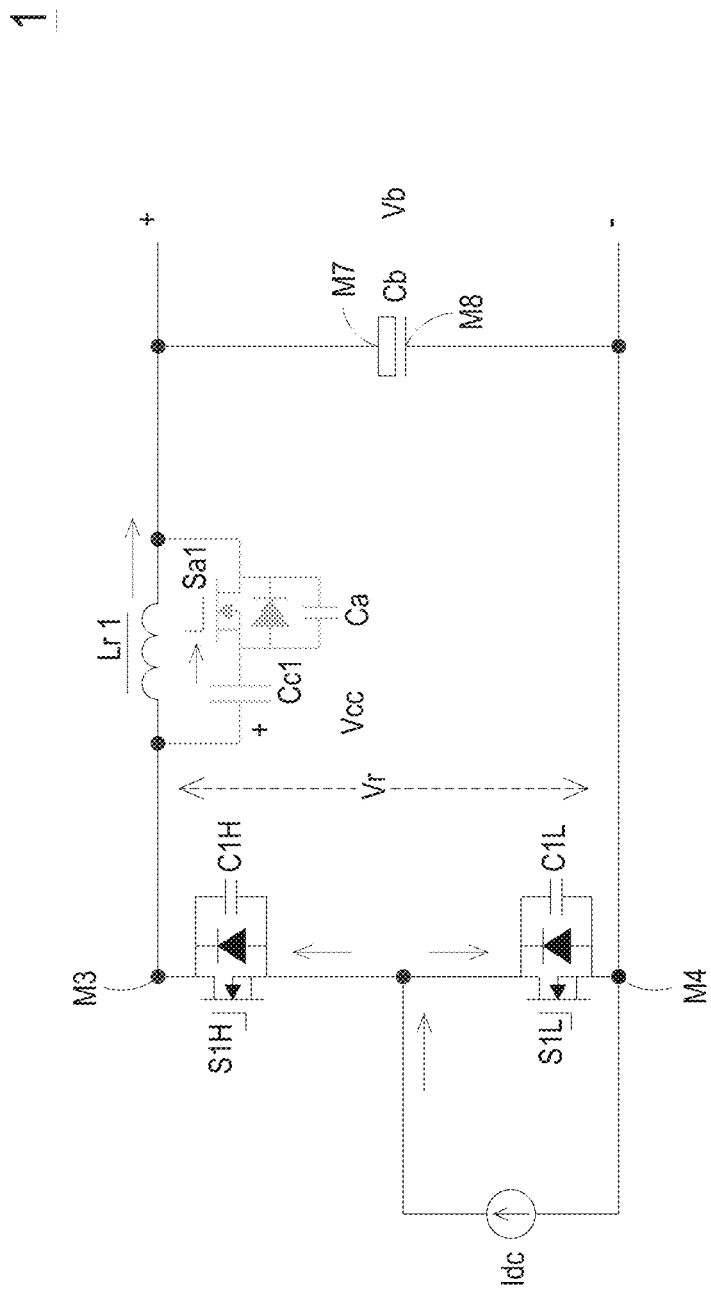
Figure 26D:
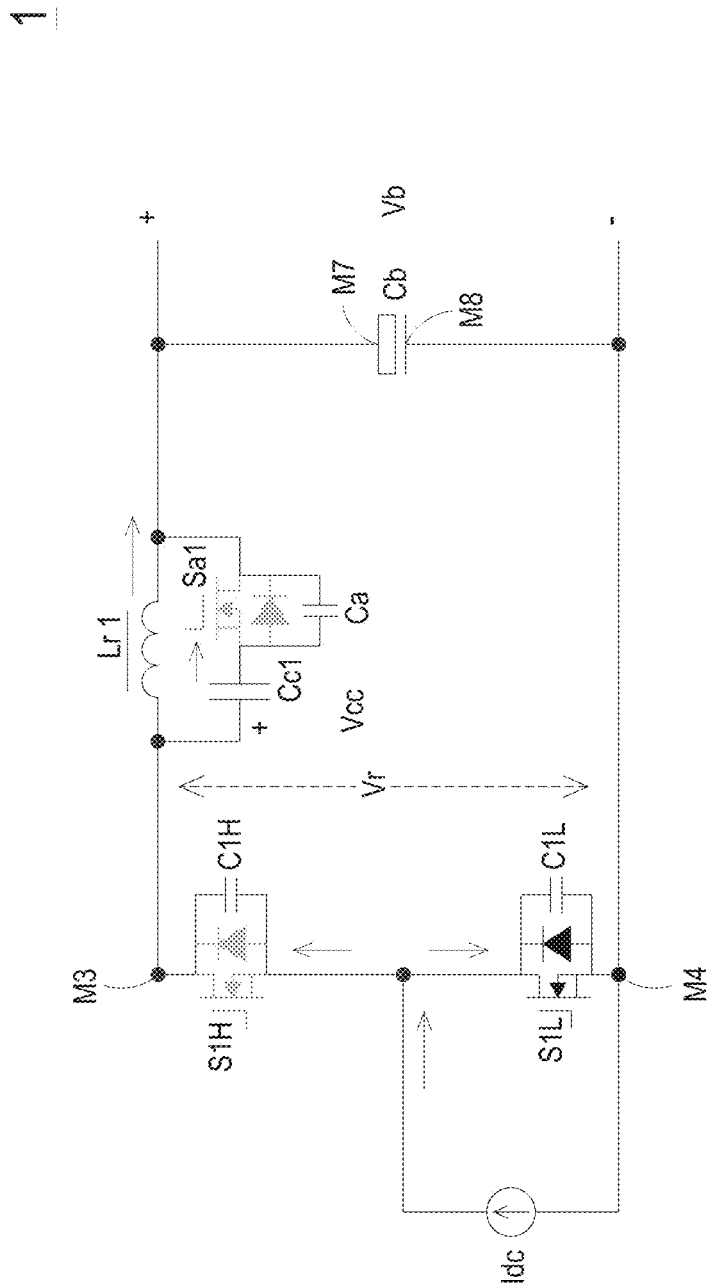
Figure 26E:
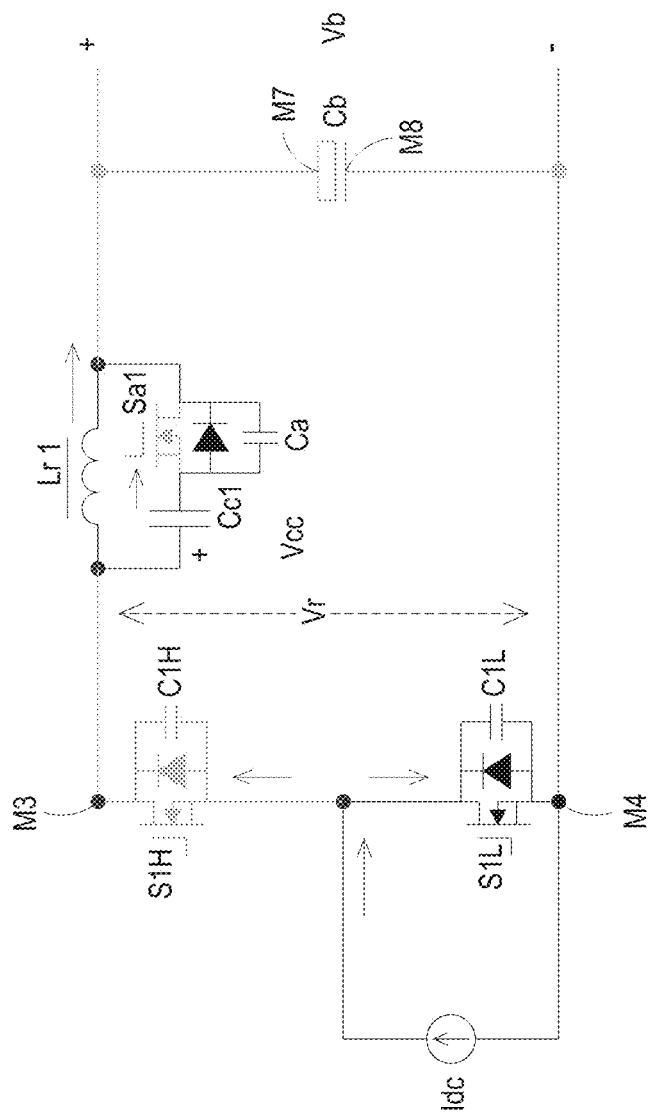
Figure 26F:
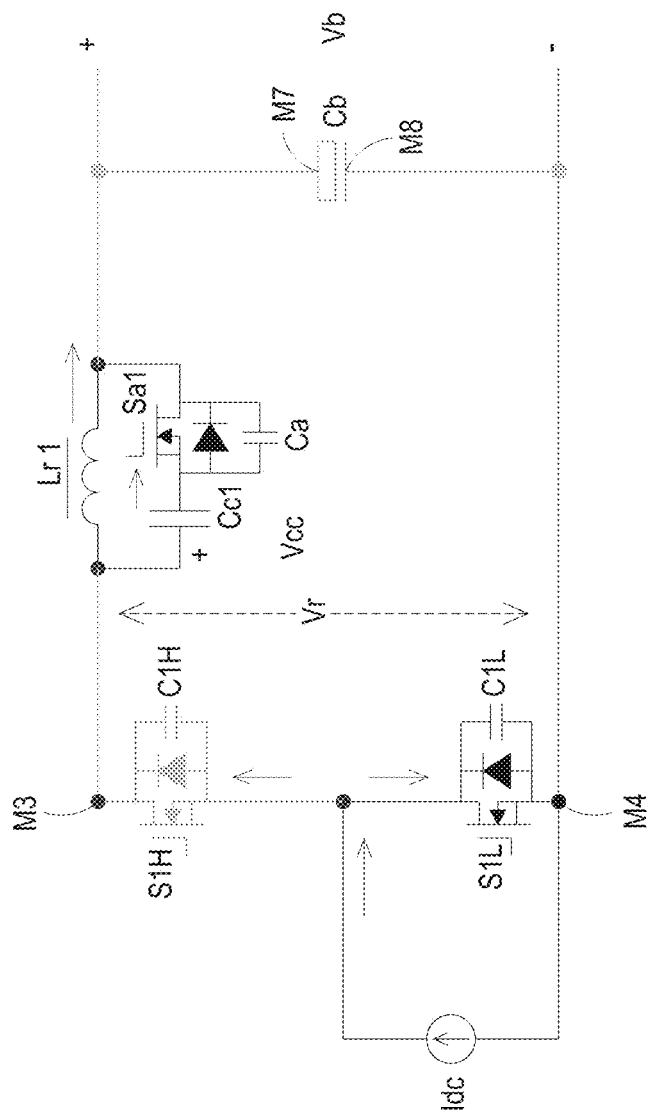
Figure 26G:
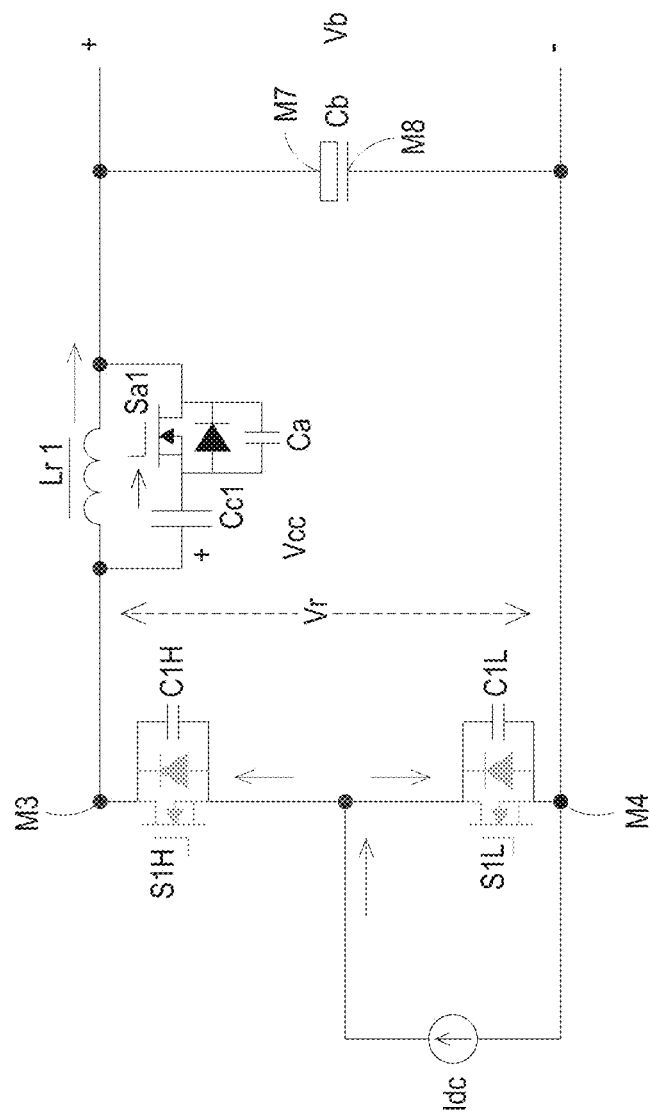
Figure 26H:
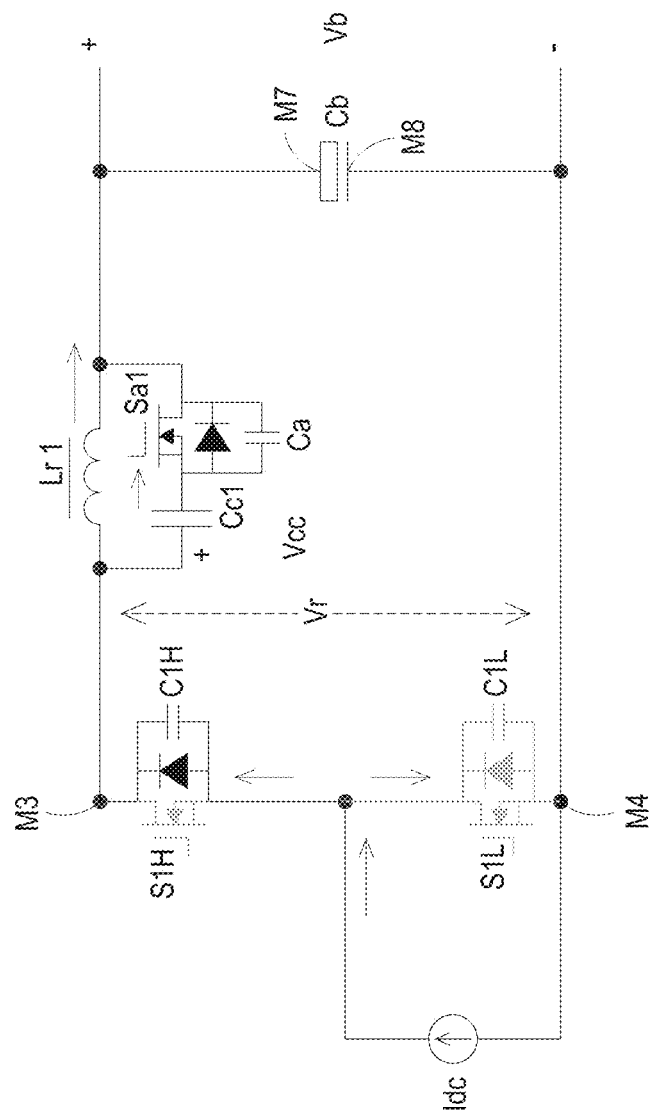
Figure 26I:
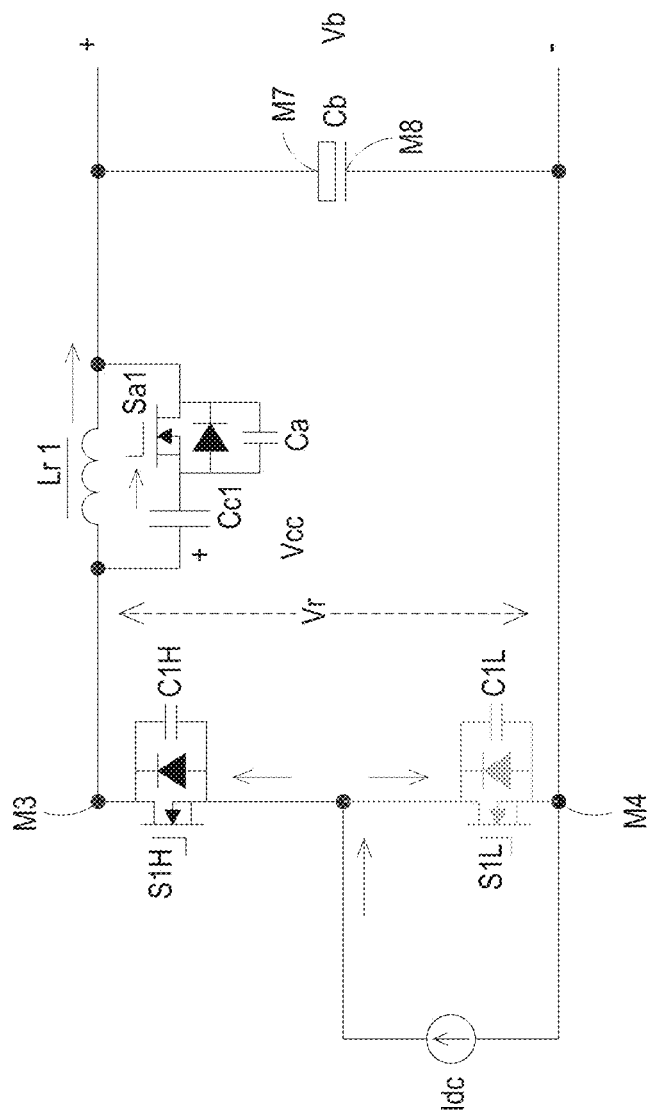
Figure 27:
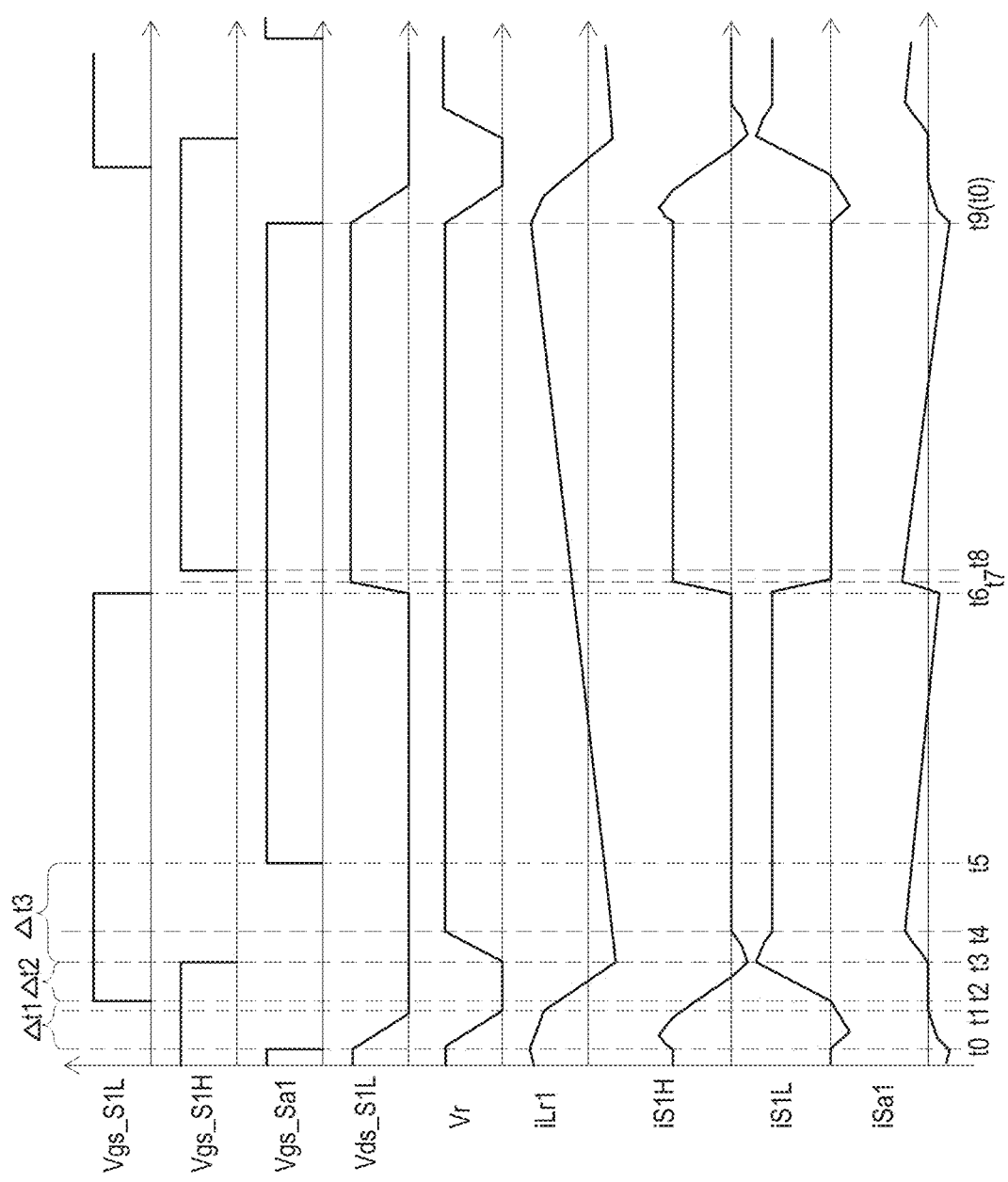
FIG. 27 is a schematic timing waveform diagram illustrating associated voltage signals and current signals processed by the power factor correction circuit as shown in FIG. 25.
Figure 28:
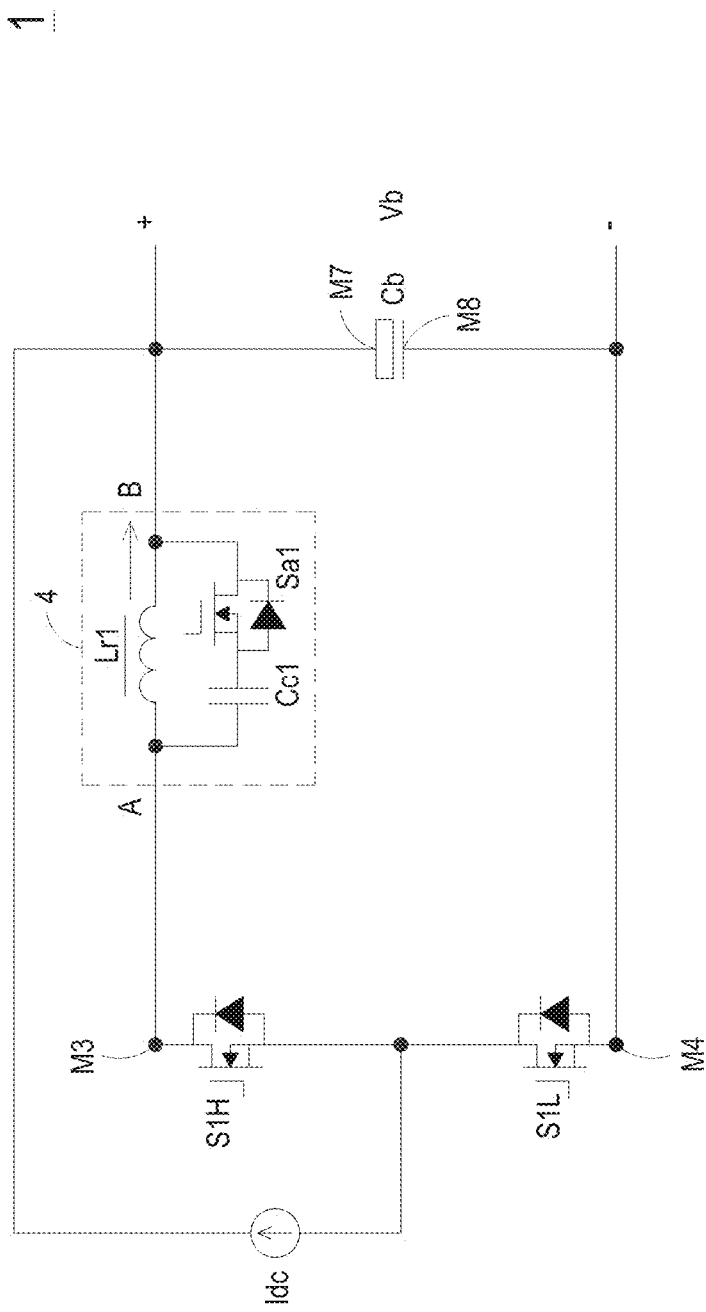
FIG. 28 is a schematic equivalent circuit of the power factor correction circuit as shown in FIG. 1 when the AC input voltage is negative.
Figure 29A:
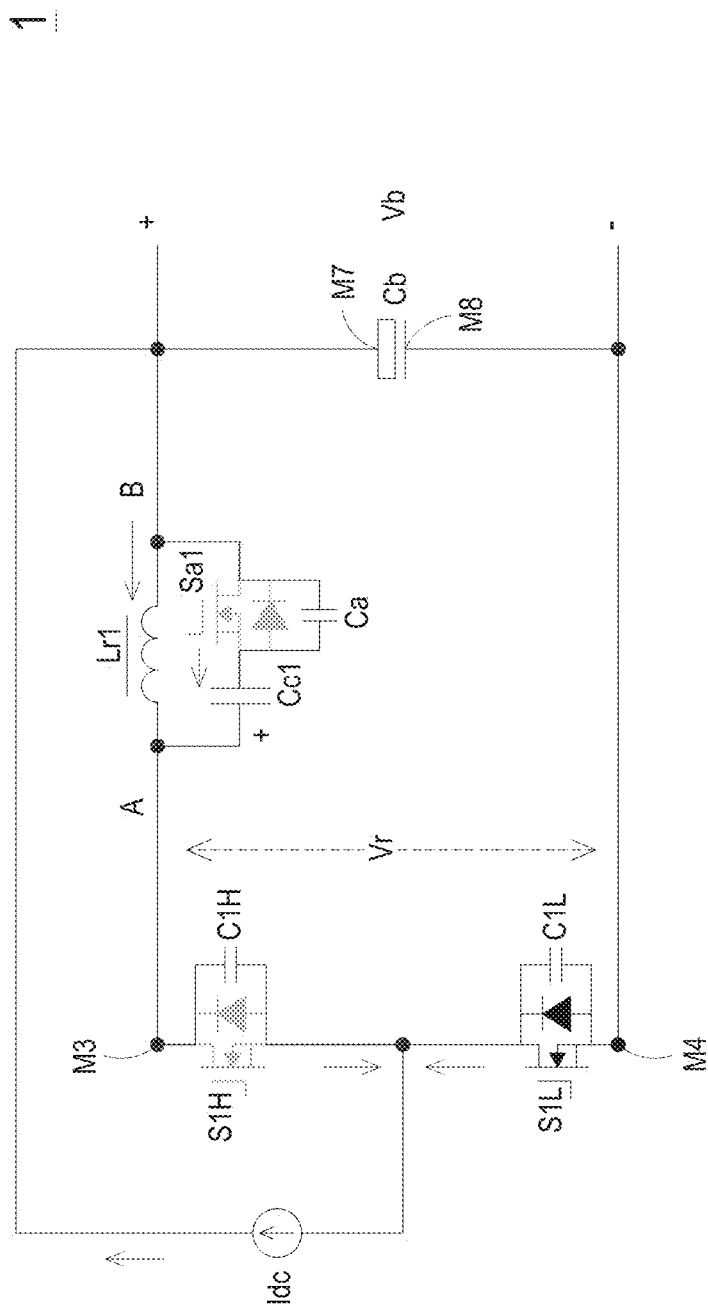
FIGS. 29A to 29I are schematic circuit diagrams illustrating the operations of the power factor correction circuit as shown in FIG. 28 in different time intervals.
Figure 29B:
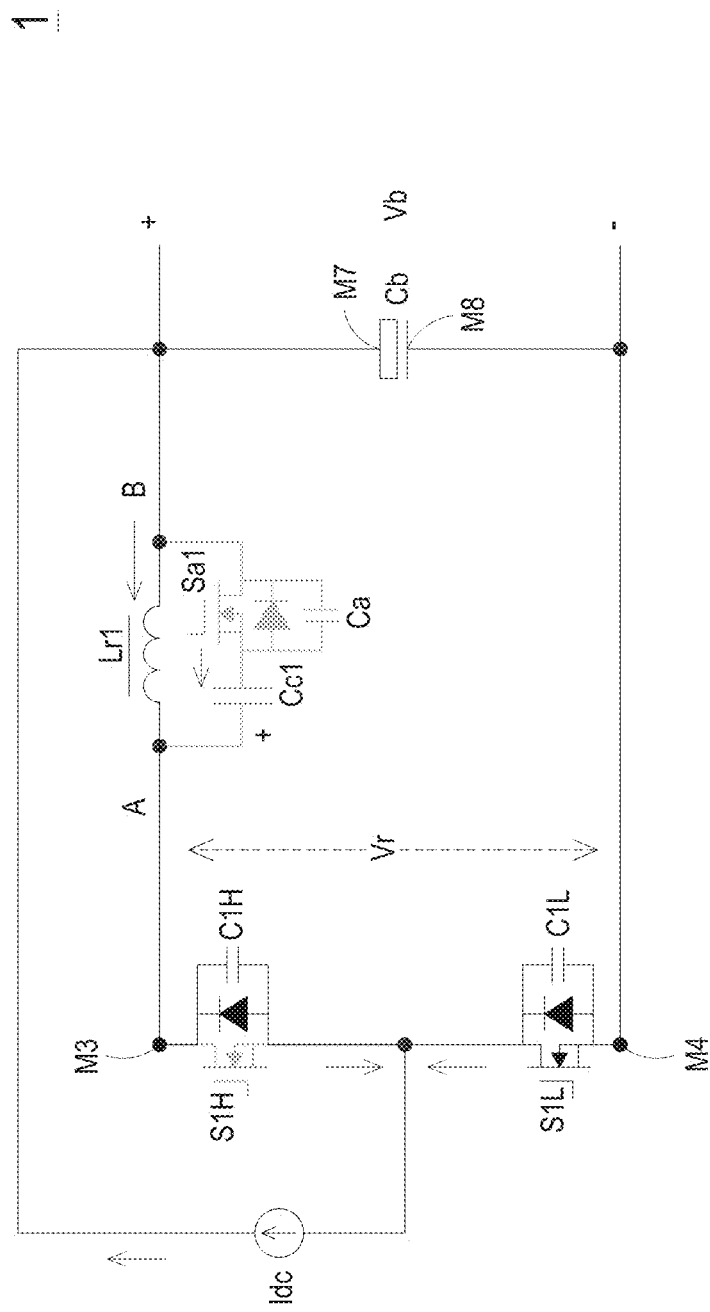
Figure 29C:
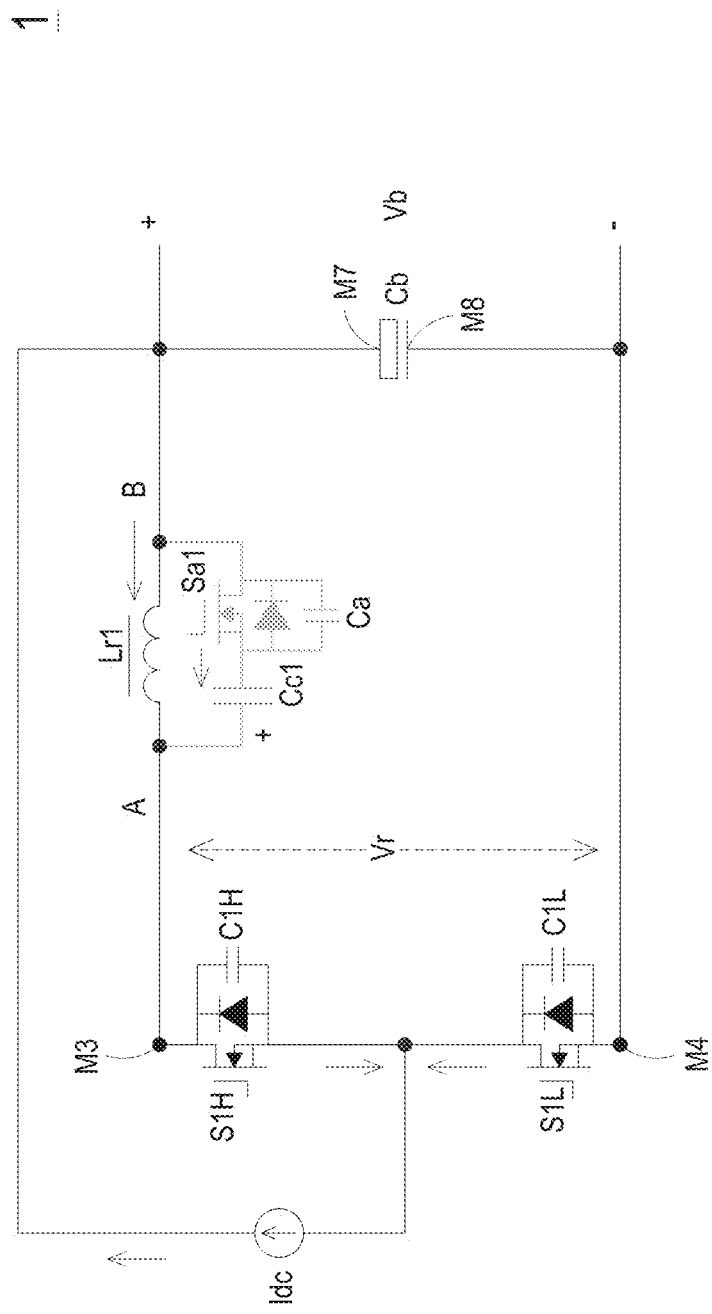
Figure 29D:
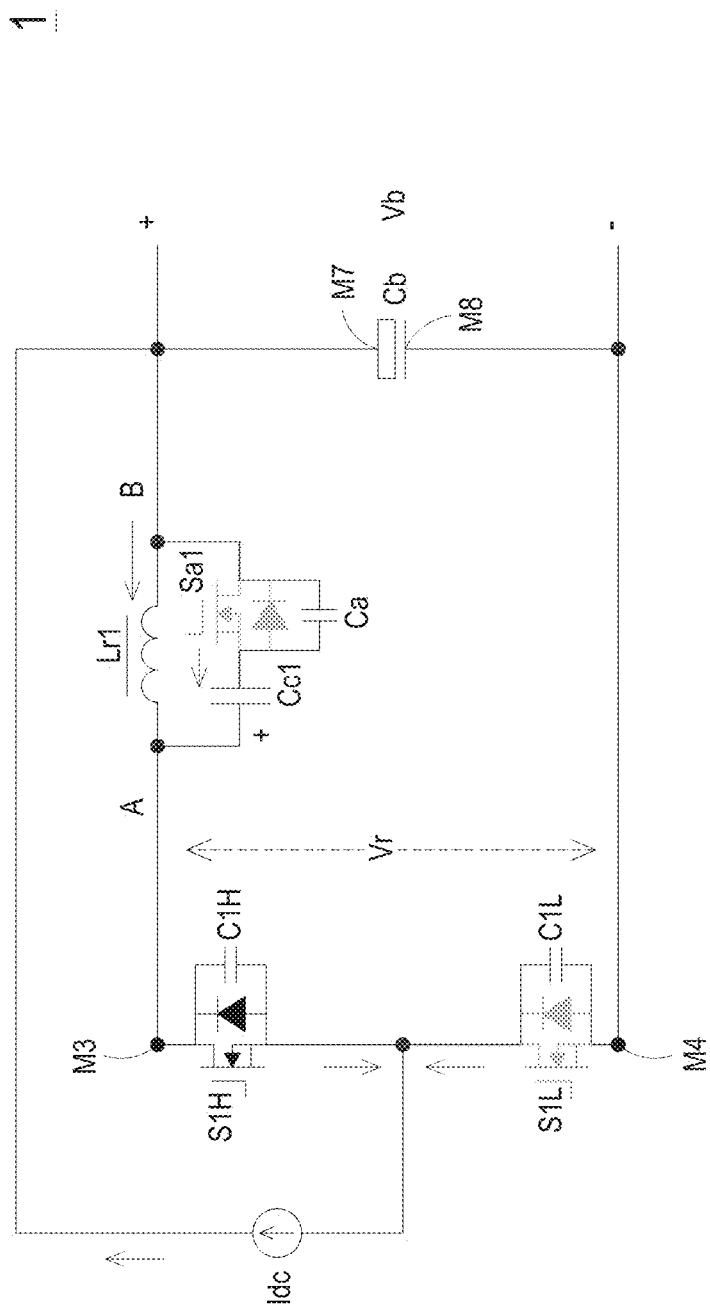
Figure 29E:
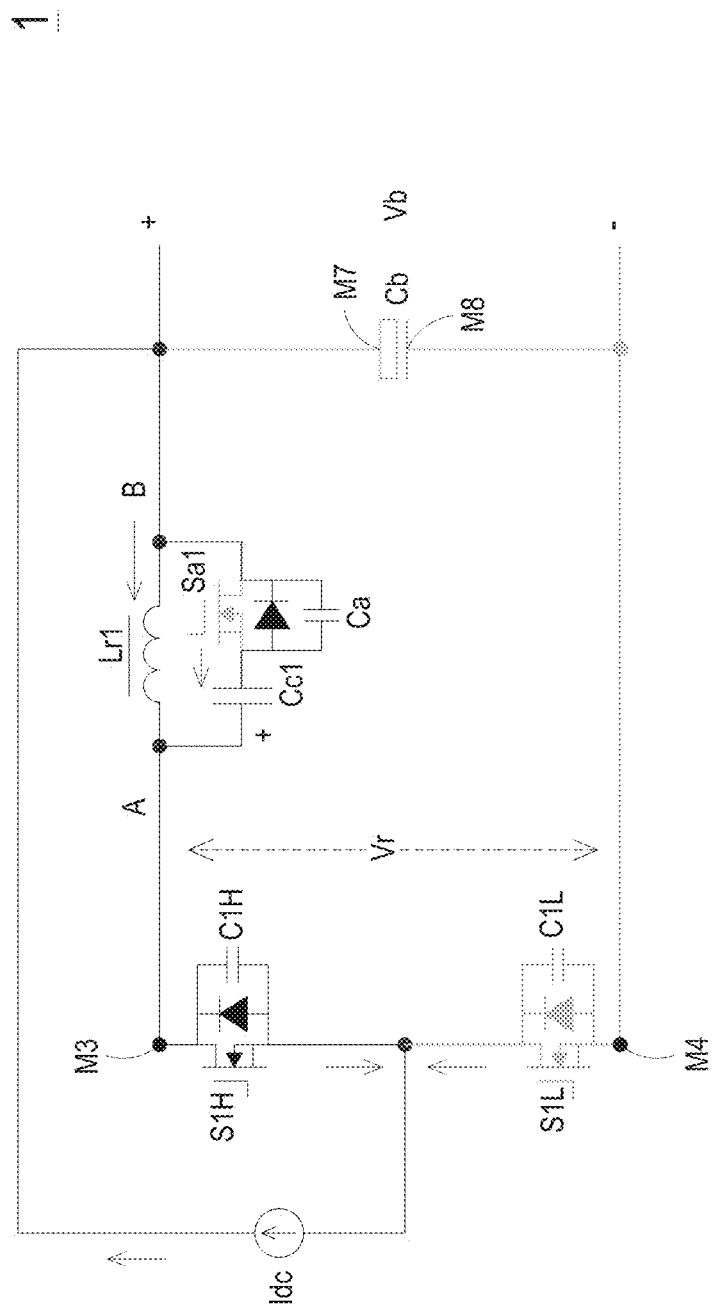
Figure 29F:
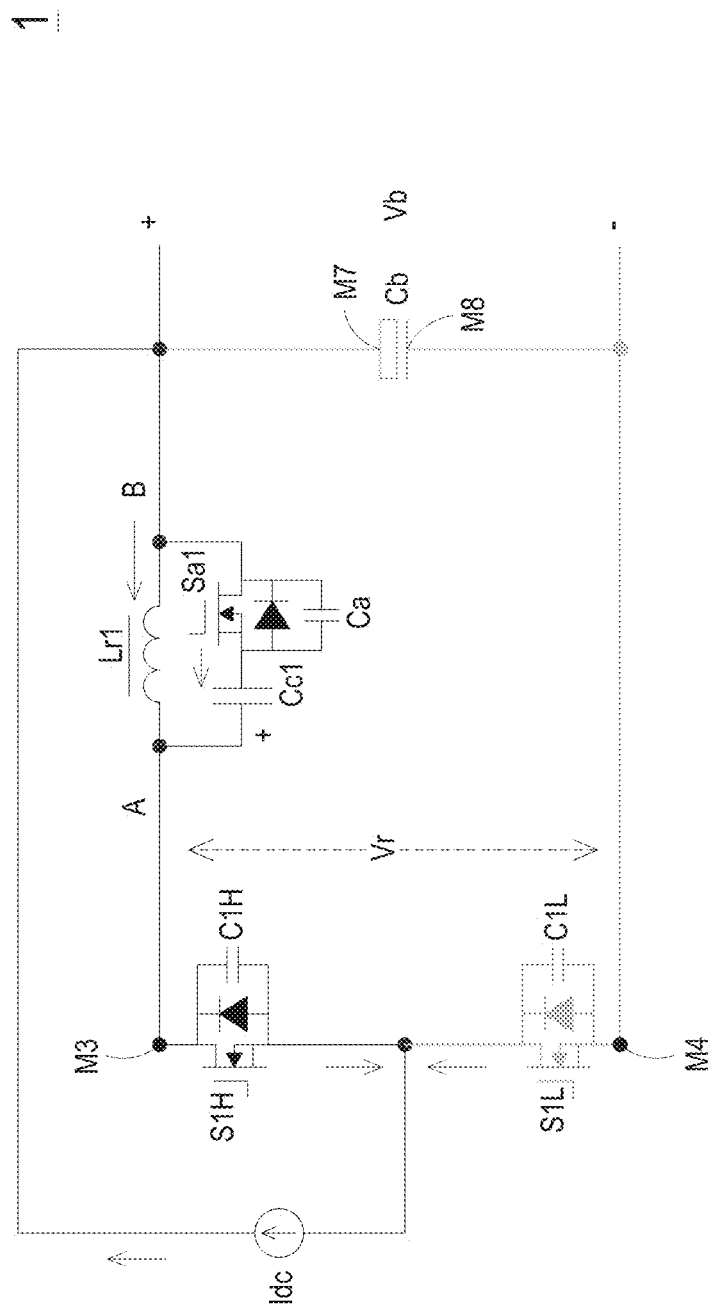
Figure 29G:
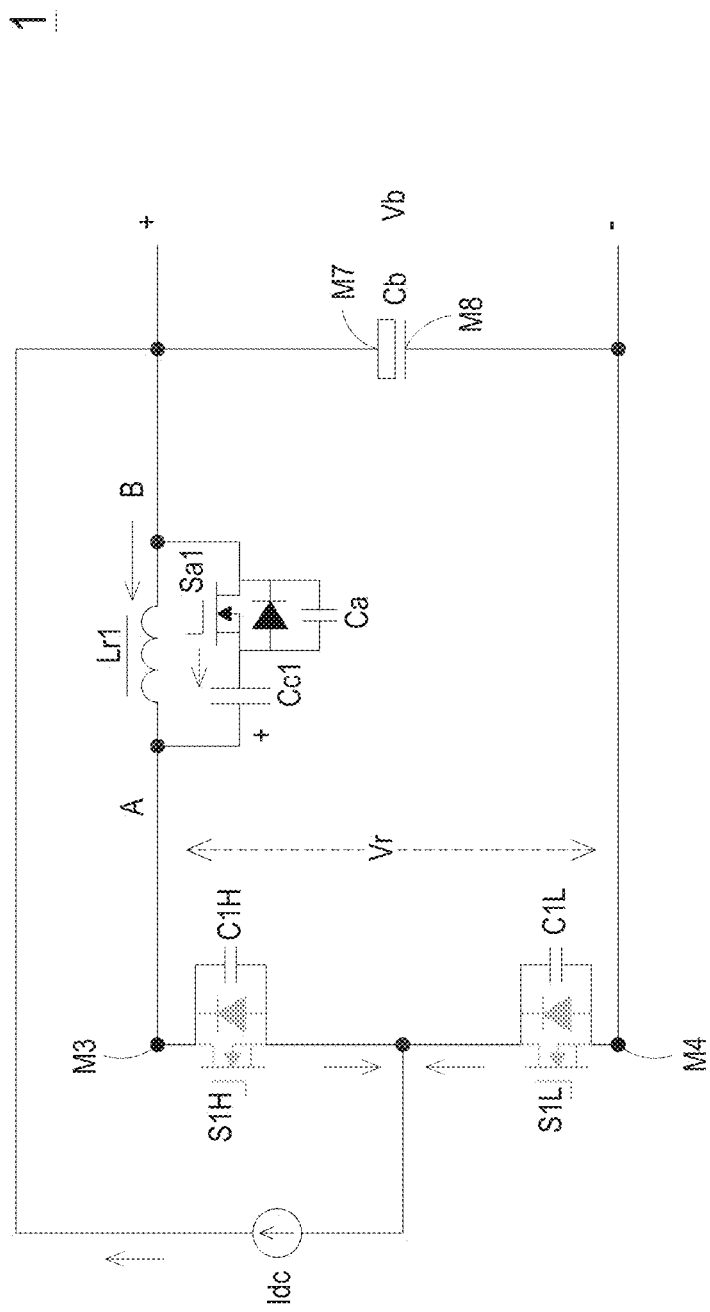
Figure 29H:
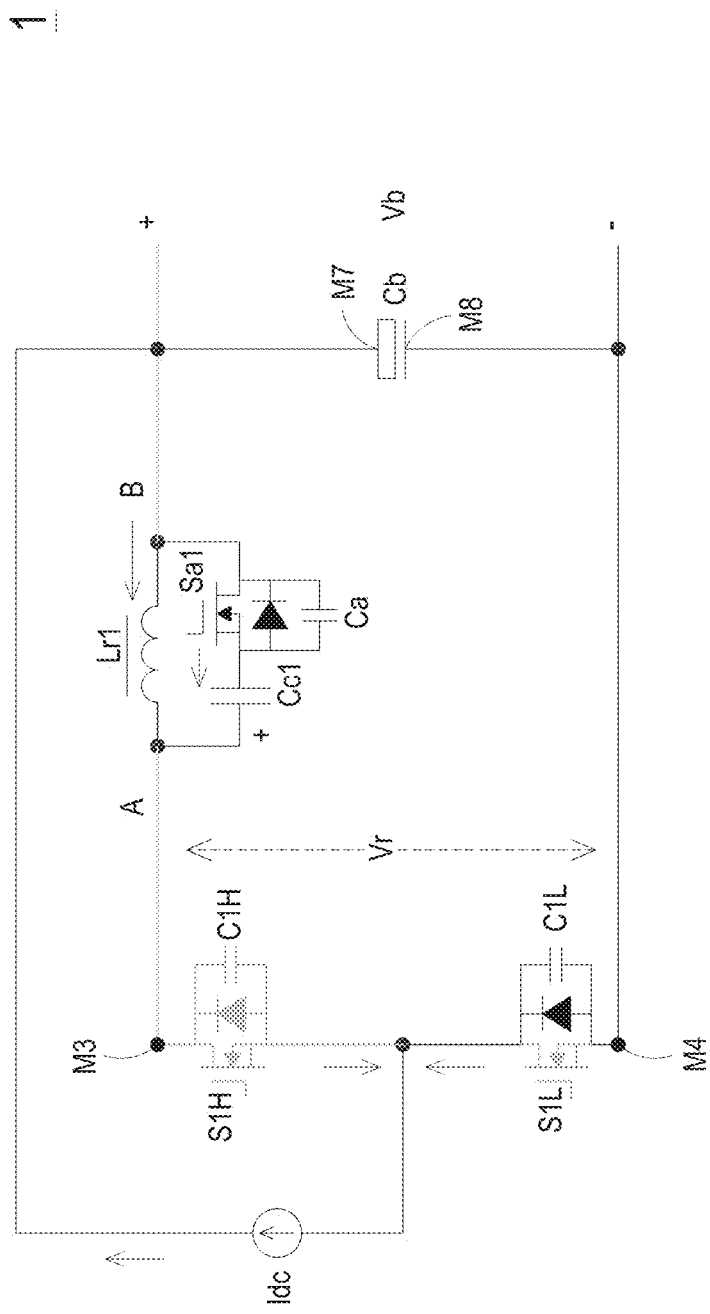
Figure 29I:
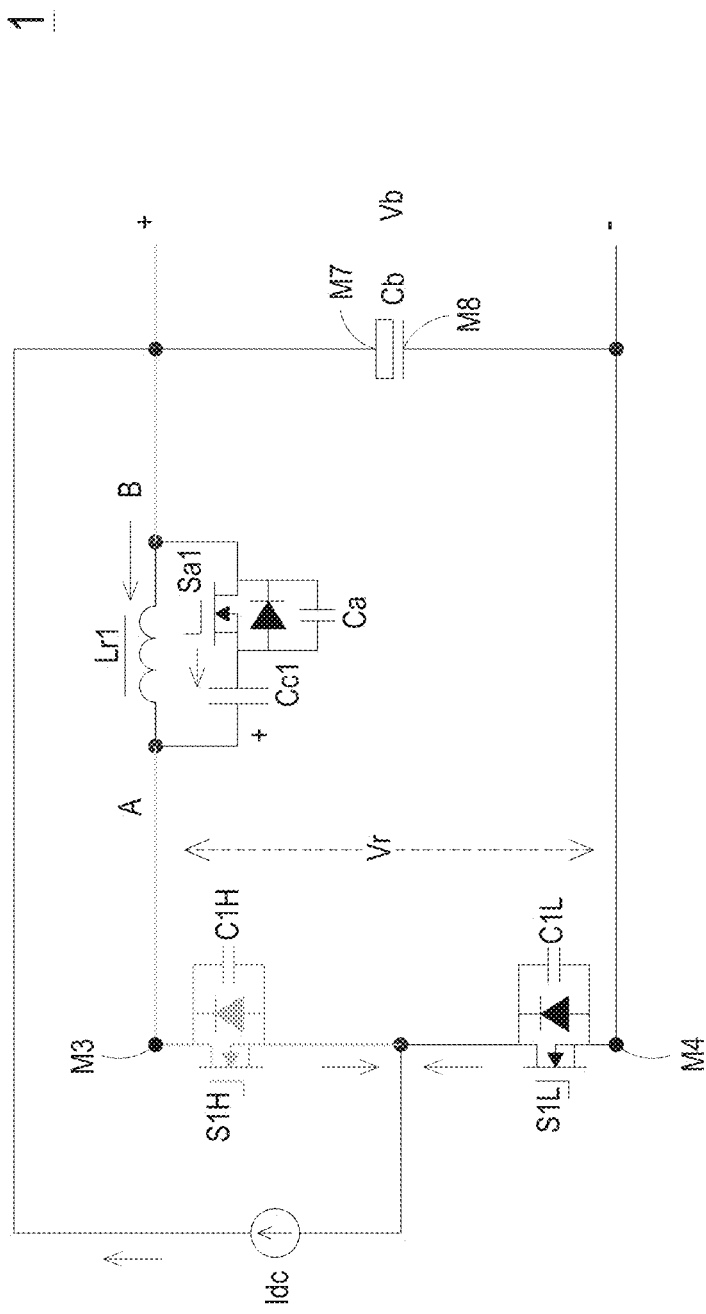
Figure 30:
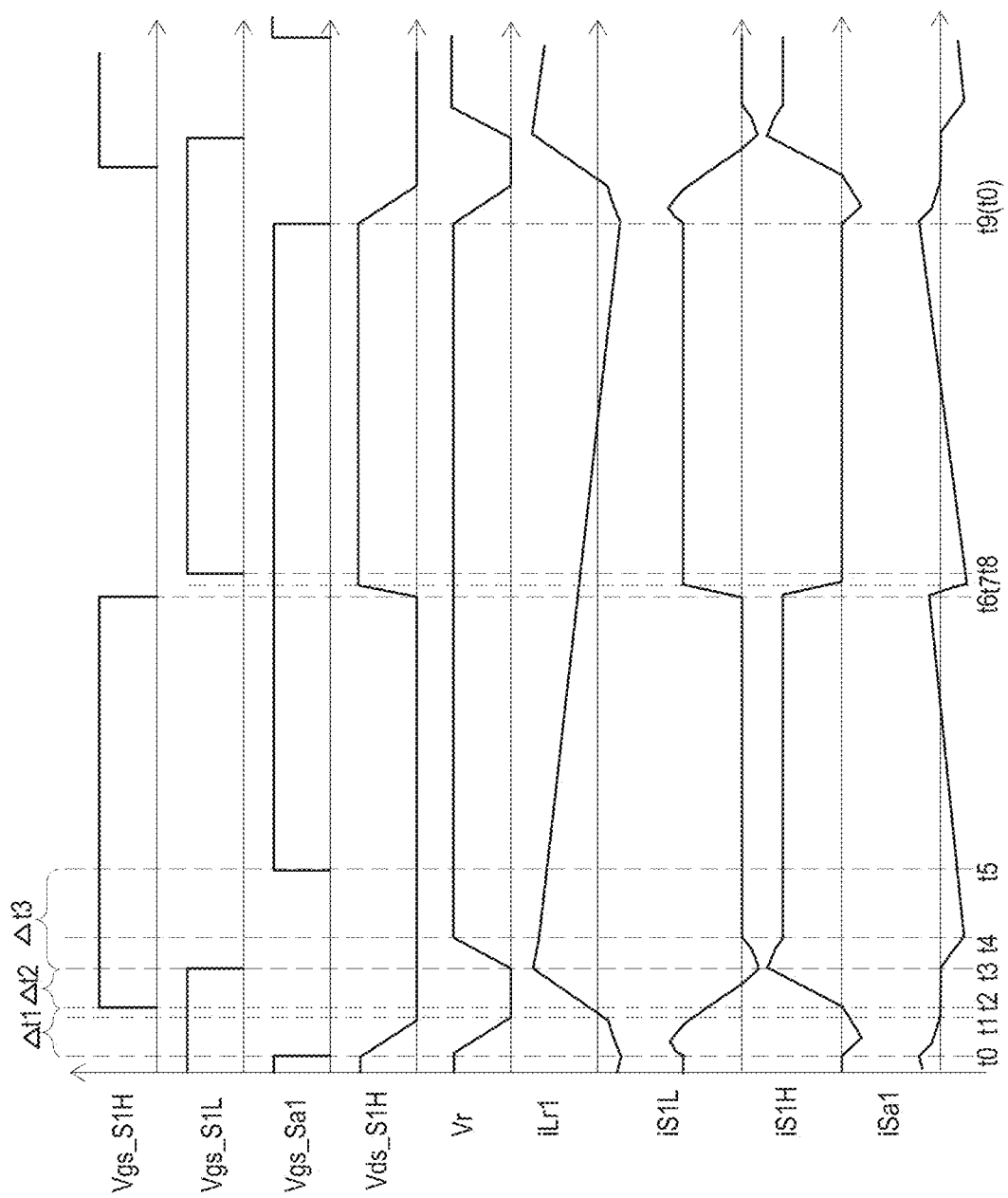
FIG. 30 is a schematic timing waveform diagram illustrating associated voltage signals and current signals processed by the power factor correction circuit as shown in FIG. 28.

Please refer to FIGS. 25, 26A to 26I, 27, 28, 29A to 29I and 30. FIG. 25 is a schematic equivalent circuit of the power factor correction circuit as shown in FIG. 1 when the AC input voltage is positive. FIGS. 26A to 26I are schematic circuit diagrams illustrating the operations of the power factor correction circuit as shown in FIG. 25 in different time intervals. FIG. 27 is a schematic timing waveform diagram illustrating associated voltage signals and current signals processed by the power factor correction circuit as shown in FIG. 25. FIG. 28 is a schematic equivalent circuit of the power factor correction circuit as shown in FIG. 1 when the AC input voltage is negative. FIGS. 29A to 29I are schematic circuit diagrams illustrating the operations of the power factor correction circuit as shown in FIG. 28 in different time intervals. FIG. 30 is a schematic timing waveform diagram illustrating associated voltage signals and current signals processed by the power factor correction circuit as shown in FIG. 28.

It is assumed that the AC input voltage and the output voltage Vb are fixed during one switching cycle and the inductance of the first inductor L1 is infinite. When the AC input voltage is positive, the power factor correction circuit 1 as shown in FIG. 1 is equivalent to the circuit as shown in FIG. 25. When the AC input voltage is negative, the power factor correction circuit 1 as shown in FIG. 1 is equivalent to the circuit as shown in FIG. 28. When the power factor correction circuit 1 as shown in FIG. 25 works continuously, the operations of the power factor correction circuit 1 are described with reference to FIGS. 26A to 26I. In these drawings, Ca is the parasitic capacitor of the fifth switch Sa1, C1H is the parasitic capacitor of the first switch S1H, and C1L is the parasitic capacitor of the second switch S1L. Moreover, it is assumed that the terminal voltage of the first clamp capacitor Cc1 is fixed at Vcc.

When the AC input voltage is positive, the second switch S1L works as the main switch, and the first switch S1H works as the auxiliary switch. When the AC input voltage is negative, the first switch S1H works as the main switch, and the second switch S1L works as the auxiliary switch. The control unit provides a first driving waveform to control the main switch, provides a second driving waveform to control the auxiliary switch, and provides a third driving signal to control the fifth switch S1$a$ of the first active clamp unit 4. That is, when the AC input voltage is positive, the first driving waveform is configured to be the driving signal Vgs_S1L of the second switch S1L, and the second driving waveform is configured to be the driving signal Vgs_S1H of the first switch S1H. When the AC input voltage is negative, the first driving waveform is configured to be the driving signal Vgs_S1H of the first switch S1H, and the second driving waveform is configured to be the driving signal Vgs_S1L of the second switch S1L.

As shown in FIGS. 27 and 30, the first driving waveform, the second driving waveform and the third driving signal include a turning-on time point and a turning-off time point during one switching cycle, respectively. A first delay time $\Delta t1$ is defined by the period between the turning-off time point of the third driving signal Vgs_Sa1 and the turning-on time point of the first driving waveform. A second delay time $\Delta t2$ is defined by the period between the turning-on time point of the first driving waveform and the turning-off time point of the second driving waveform. And a third delay time $\Delta t3$ is defined by the period between the turning-off time point of the second driving waveform and the turning-on time point of the third driving signal Vgs_Sa1.

When the AC input voltage is positive, the power factor correction circuit 1 in one switching cycle is operated in nine stages. The operations of the power factor correction circuit 1 corresponding to the nine stages are shown in FIGS. 26A to 26I. The time interval between the time point t0 and the time point t9 is defined as one switching cycle. Before the time point t0, the second switch S1L is turned off, the first switch S1H and the fifth switch Sa1 are turned on, and the second inductor Lr1 is discharged. The current flowing through the first switch S1H also flows through the first active clamp unit 4.

During t0~t1, the power factor correction circuit 1 is operated in the first stage. The circuitry structure is shown in FIG. 26A. Meanwhile, the driving voltage of the fifth switch Sa1 is decreased. In addition, the second inductor Lr1, the parasitic capacitor Ca of the fifth switch Sa1 and the first clamp capacitor Cc1 form a resonant loop to charge the parasitic capacitor Ca. The second inductor Lr1, the output capacitor Cb, the parasitic capacitor C1L of the second switch S1L and the first switch S1H form another resonant loop. Consequently, the parasitic capacitor C1L is discharged.

During t1~t2, the power factor correction circuit 1 is operated in the second stage. The circuitry structure is shown in FIG. 26B. At the time point t1, the terminal voltage of the parasitic capacitor Ca is equal to the sum of the terminal voltage Vcc of the first clamp capacitor Cc1 and the output voltage Vb. Consequently, no current flows through the fifth switch Sa1. At the same time, the terminal voltage of the second switch S1L is decreased to 0V. The body diode of the second switch S1L starts to be turned on. The terminal voltage Vr of the first bridge arm 2 is decreased to 0V. The output voltage Vb is added to the second inductor Lr1. Moreover, the second inductor Lr1 is demagnetized continuously.

During t2~t3, the power factor correction circuit 1 is operated in the third stage. The circuitry structure is shown in FIG. 26C. Meanwhile, the current flowing through the second switch S1L is changed from negative to positive, and the driving voltage of the second switch S1L is increased. Since the driving voltages of the second switch S1L and the first switch S1H are in the high level state, both of the second switch S1L and the first switch S1H are turned on. Meanwhile, the terminal voltage Vr of the first bridge arm 2 is 0V. The output voltage Vb is added to the second inductor Lr1. Moreover, the second inductor Lr1 is demagnetized continuously.

During t3~t4, the power factor correction circuit 1 is operated in the fourth stage. The circuitry structure is shown in FIG. 26D. Meanwhile, the driving voltage of the first switch S1H is decreased. In addition, the second inductor Lr1, the output capacitor Cb, the second switch S1L and the parasitic capacitor C1H of the first switch S1H form a resonant loop. Consequently, the second inductor Lr1 starts to charge the parasitic capacitor C1H. In addition, the second inductor Lr1, the parasitic capacitor Ca of the fifth switch Sa1 and the first clamp capacitor Cc1 form another resonant loop. Consequently, the parasitic capacitor Ca is discharged, and the current flowing through the second inductor Lr1 is increased along the positive direction. Moreover, the change rate of the current flowing through the first switch S1H is slowed down by the resonant loop, and reverse recovery loss is reduced. As the terminal voltage of the parasitic capacitor C1H is gradually increased, the voltage of the parasitic capacitor Ca is gradually decreased and the terminal voltage Vr of the first bridge arm 2 is increased.

During t4~t5, the power factor correction circuit 1 is operated in the fifth stage. The circuitry structure is shown in FIG. 26E. Under this circumstance, the terminal voltage of the parasitic capacitor C1H is equivalent to the terminal voltage Vr of the first bridge arm 2, which is equal to the sum of the terminal voltage Vcc of the first clamp capacitor Cc1 and the output voltage Vb. Consequently, no current flows through the first switch S1H. At the same time, the terminal voltage of the fifth switch Sa1 is decreased to 0V. The body diode of the fifth switch Sa1 starts to be turned on. In addition, the second inductor Lr1, the first clamp capacitor Cc1 and the fifth switch Sa1 form a resonant loop. Consequently, the voltage of the first clamp capacitor Cc1 is discharged to the second inductor Lr1, and the current flowing through the second inductor Lr1 is continuously increased along the positive direction.

During t5~t6, the power factor correction circuit 1 is operated in the sixth stage. The circuitry structure is shown in FIG. 26F. Meanwhile, the driving voltage of the fifth switch Sa1 is increased. Consequently, the zero voltage switching (ZVS) function is achieved. In addition, the second inductor Lr1, the first clamp capacitor Cc1 and the fifth switch Sa1 form a resonant loop. Consequently, the voltage of the first clamp capacitor Cc1 is discharged to the second inductor Lr1, and the current flowing through the second inductor Lr1 is continuously increased along the positive direction.

During t6~t7, the power factor correction circuit 1 is operated in the seventh stage. The circuitry structure is shown in FIG. 26G Meanwhile, the driving voltage of the second switch S1L is decreased. The parasitic capacitor C1L of the second switch S1L is charged. Consequently, the terminal voltage of the parasitic capacitor C1L is gradually increased. The parasitic capacitor C1H of the first switch S1H is discharged. Consequently, the terminal voltage of the parasitic capacitor C1H is gradually decreased. The sum of the terminal voltage of the parasitic capacitor C1H and the terminal voltage of the parasitic capacitor C1L is continuously equal to the sum of the terminal voltage Vcc of the first clamp capacitor Cc1 and the output voltage Vb. In addition, the second inductor Lr1, the first clamp capacitor Cc1 and the fifth switch Sa1 form a resonant loop. The current flowing through the second inductor Lr1 is continuously increased along the positive direction.

During t7~t8, the power factor correction circuit 1 is operated in the eighth stage. The circuitry structure is shown in FIG. 26H. Meanwhile, the terminal voltage of the parasitic capacitor C1H of the first switch S1H is decreased to 0V. The body diode of the first switch S1H is turned on. Moreover, the first switch S1H, an input current source Idc, the output capacitor Cb and the first active clamp unit 4 form a main power freewheeling loop. In addition, the second inductor Lr1, the first clamp capacitor Cc1 and the fifth switch Sa1 form a resonant loop. The current flowing through the second inductor Lr1 is continuously increased along the positive direction.

During t8~t9, the power factor correction circuit 1 is operated in the ninth stage. The circuitry structure is shown in FIG. 26I. Meanwhile, the driving voltage of the first switch S1H is increased. Consequently, the zero voltage switching (ZVS) function is achieved. In addition, the second inductor Lr1, the first clamp capacitor Cc1 and the fifth switch Sa1 form a resonant loop. The current flowing through the second inductor Lr1 is continuously increased along the positive direction. Moreover, the first switch S1H, an input current source Idc, the output capacitor Cb and the first active clamp unit 4 form a main power freewheeling loop. At the time point t9, the fifth switch Sa1 is turned off. In the next switching cycle, above procedures are repeatedly done.

As mentioned above, there is the first delay time Δt1 between the turning-off time point of the third driving signal Vgs_Sa1 and the turning-on time point of the first driving waveform (i.e., the driving signal Vgs_S1L of the main switch), there is the second delay time Δt2 between the turning-on time point of the first driving waveform and the turning-off time point of the second driving waveform (i.e., the driving signal Vgs_S1H of the auxiliary switch), and there is the third delay time Δt3 between the turning-off time point of the second driving waveform and the turning-on time point of the third driving signal Vgs_Sa1. Consequently, when the AC input voltage is positive, the ZVS function of the second switch S1L is achievable.

When the AC input voltage is negative, similar to the positive AC input voltage, the power factor correction circuit 1 in one switching cycle is also operated in nine stages. The operations of the power factor correction circuit 1 corresponding to the nine stages are shown in FIGS. 29A to 29I. The time interval between the time point t0 and the time point t9 is equal to one switching cycle. Before the time point t0, the first switch S1H is turned off, the second switch S1L and the fifth switch Sa1 are turned on, and the second inductor Lr1 is discharged. Moreover, the AC input voltage is in the freewheeling state through the second switch S1L and the output capacitor Cb.

During t0~t1, the power factor correction circuit 1 is operated in the first stage. The circuitry structure is shown in FIG. 29A. Meanwhile, the driving voltage of the fifth switch Sa1 is decreased. In addition, the second inductor Lr1, the parasitic capacitor Ca of the fifth switch Sa1 and the first clamp capacitor Cc1 form a resonant loop to charge the parasitic capacitor Ca. The second inductor Lr1, the output capacitor Cb, the second switch S1L and the parasitic capacitor C1H of the first switch S1H form another resonant loop. Consequently, the parasitic capacitor C1H is discharged. At the time point t1, the terminal voltage of the parasitic capacitor Ca is equal to the sum of the terminal voltage Vcc of the first clamp capacitor Cc1 and the output voltage Vb. Consequently, no current flows through the fifth switch Sa1. At the same time, the terminal voltage of the first switch S1H is decreased to 0V. The body diode of the first switch S1H starts to be turned on.

During t1~t2, the power factor correction circuit 1 is operated in the second stage. The circuitry structure is shown in FIG. 29B. The body diode of the first switch S1H starts to be turned on. The terminal voltage Vr of the first bridge arm 2 is decreased to 0V. The output voltage Vb is added to the second inductor Lr1. Moreover, the second inductor Lr1 is demagnetized continuously.

During t2~t3, the power factor correction circuit 1 is operated in the third stage. The circuitry structure is shown in FIG. 29C. Meanwhile, the current flowing through the first switch S1H is changed from negative to positive, and the driving voltage of the first switch S1H is increased. Since the driving voltages of the second switch S1L and the first switch S1H are in the high level state, both of the second switch S1L and the first switch S1H are turned on. Meanwhile, the terminal voltage Vr of the first bridge arm 2 is 0V. The output voltage Vb is added to the second inductor Lr1. Moreover, the second inductor Lr1 is demagnetized continuously, and the current flowing through the second inductor Lr1 is decreased along the negative direction.

During t3~t4, the power factor correction circuit 1 is operated in the fourth stage. The circuitry structure is shown in FIG. 29D. Meanwhile, the driving voltage of the second switch S1L is decreased. In addition, the second inductor Lr1, the first switch S1H, the parasitic capacitor C1L of the second switch S1L and the output capacitor Cb form a resonant loop. Consequently, the second inductor Lr1 starts to charge the parasitic capacitor C1L. In addition, the second inductor Lr1, the parasitic capacitor Ca of the fifth switch Sa1 and the first clamp capacitor Cc1 form another resonant loop. Consequently, the parasitic capacitor Ca is discharged. Moreover, the change rate of the current flowing through the second switch S1L is slowed down by the resonant loop, and reverse recovery loss is reduced. As the terminal voltage of the parasitic capacitor C1L is gradually increased, the voltage of the parasitic capacitor Ca is gradually decreased and the terminal voltage Vr of the first bridge arm 2 is increased.

During t4~t5, the power factor correction circuit 1 is operated in the fifth stage. The circuitry structure is shown in FIG. 29E. Under this circumstance, the terminal voltage of the parasitic capacitor C1L is equivalent to the terminal voltage Vr of the first bridge arm 2, which is equal to the sum of the terminal voltage Vcc of the first clamp capacitor Cc1 and the output voltage Vb. Consequently, no current flows through the second switch S1L. At the same time, the terminal voltage of the fifth switch Sa1 is decreased to 0V. The body diode of the fifth switch Sa1 starts to be turned on. In addition, the second inductor Lr1, the first clamp capacitor Cc1 and the fifth switch Sa1 form a resonant loop. Consequently, the current flowing through the second inductor Lr1 is continuously decreased along the negative direction.

During t5~t6, the power factor correction circuit 1 is operated in the sixth stage. The circuitry structure is shown in FIG. 29F. Meanwhile, the driving voltage of the fifth switch Sa1 is increased. Consequently, the zero voltage switching function is achieved. In addition, the second inductor Lr1, the first clamp capacitor Cc1 and the fifth switch Sa1 form a resonant loop. Consequently, the voltage of the first clamp capacitor Cc1 is discharged to the second inductor Lr1, and the current flowing through the second inductor Lr1 is continuously decreased along the negative direction.

During t6~t7, the power factor correction circuit 1 is operated in the seventh stage. The circuitry structure is shown in FIG. 29G Meanwhile, the driving voltage of the first switch S1H is decreased. The parasitic capacitor C1H of the first switch S1H is charged. Consequently, the terminal voltage of the parasitic capacitor C1H is gradually increased. The parasitic capacitor C1L of the second switch S1L is discharged. Consequently, the terminal voltage of the parasitic capacitor C1L is gradually decreased. The sum of the terminal voltage of the parasitic capacitor C1H and the terminal voltage of the parasitic capacitor C1L is continuously equal to the sum of the terminal voltage Vcc of the first clamp capacitor Cc1 and the output voltage Vb. In addition, the second inductor Lr1, the first clamp capacitor Cc1 and the fifth switch Sa1 form a resonant loop. The current flowing through the second inductor Lr1 is continuously increased along the negative direction.

During t7~t8, the power factor correction circuit 1 is operated in the eighth stage. The circuitry structure is shown in FIG. 29H. Meanwhile, the terminal voltage of the parasitic capacitor C1L of the second switch S1L is decreased to 0V. The body diode of the second switch S1L is turned on. Moreover, the second switch S1L, the input current source Idc and the output capacitor Cb form a main power freewheeling loop. In addition, the second inductor Lr1, the first clamp capacitor Cc1 and the fifth switch Sa1 form a resonant loop. The current flowing through the second inductor Lr1 is continuously decreased along the negative direction.

During t8~t9, the power factor correction circuit 1 is operated in the ninth stage. The circuitry structure is shown in FIG. 29I. Meanwhile, the driving voltage of the second switch S1L is increased. Consequently, the zero voltage switching function is achieved. In addition, the second inductor Lr1, the first clamp capacitor Cc1 and the fifth switch Sa1 form a resonant loop. The current flowing through the second inductor Lr1 is continuously decreased along the negative direction. At the time point t9, the fifth switch Sa1 is turned off. In the next switching cycle, above procedures are repeatedly done.

As mentioned above, there is the first delay time $\Delta t1$ between the turning-off time point of the third driving signal Vgs_Sa1 and the turning-on time point of the first driving waveform (i.e., the driving signal Vgs_S1H of the main switch), there is the second delay time $\Delta t2$ between the turning-on time point of the first driving waveform and the turning-off time point of the second driving waveform (i.e., the driving signal Vgs_S1L of the auxiliary switch), and there is the third delay time $\Delta t3$ between the turning-off time point of the second driving waveform and the turning-on time point of the third driving signal Vgs_Sa1. Consequently, when the AC input voltage is negative, the ZVS function of the first switch S1H is achievable.

By using the control method of the present disclosure, the zero voltage switching (ZVS) function of at least one of the first switch S1H, the second switch S1L and the fifth switch Sa can be achieved. According to the difference between the situation of the positive AC input voltage and the situation of the negative AC input voltage, the active clamp unit withstands the input current in the on state of the main switch or in the freewheeling state of the main switch. Moreover, the above operations of the power factor correction circuit 1 are in a continuous conduction mode (CCM).

Figure 31:
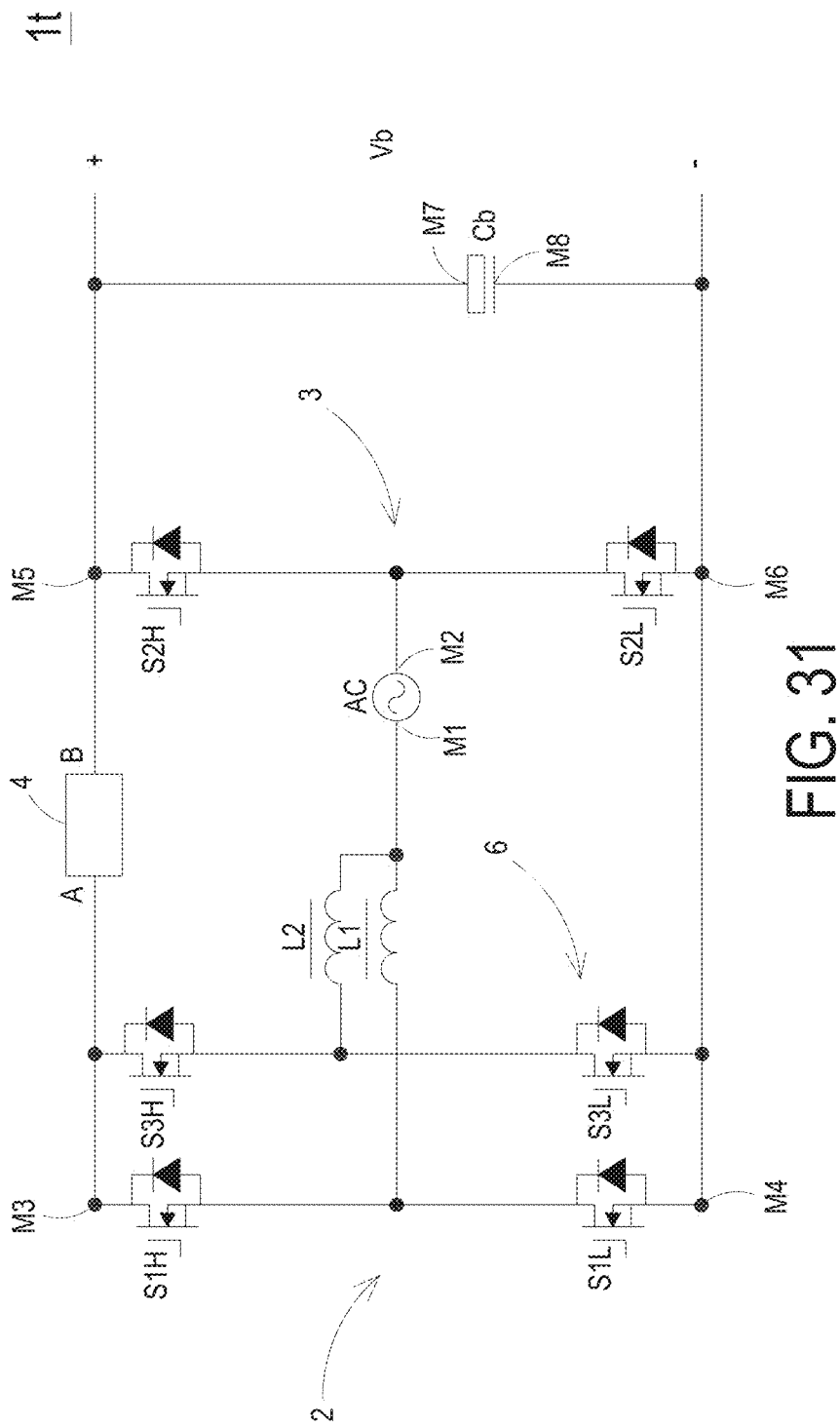
FIG. 31 is a schematic circuit diagram illustrating a power factor correction circuit according to a twenty-first embodiment of the present invention.

FIG. 31 is a schematic circuit diagram illustrating a power factor correction circuit according to a twenty-first embodiment of the present invention. The power factor correction circuit 1t includes an input power source AC, a first bridge arm 2, a first inductor L1, a second bridge arm 3, a third bridge arm 6, a third inductor L2, an output capacitor Cb and an active clamp unit 4. The circuitry structure of this embodiment is similar to that of FIG. 20. The first bridge arm 2 includes a first switch S1H and a second switch S1L, which are connected with each other in series. The common node between the first switch S1H and the second switch S1L is electrically connected with the first terminal M1 of the input power source AC through the first inductor L1. The second bridge arm 3 includes a third switch S2H and a fourth switch S2L, which are connected with each other in series. The common node between the third switch S2H and the fourth switch S2L is electrically connected with the second terminal M2 of the input power source AC. The third bridge arm 6 is connected with the first bridge arm 2 in parallel. The third bridge arm 6 includes a sixth switch S3H and a seventh switch S3L, which are connected with each other in series. The common node between the sixth switch S3H and the seventh switch S3L is electrically connected with the first terminal M1 of the input power source AC through the third inductor L2.

Similarly, the active clamp unit 4 includes a second inductor, a first clamp capacitor and a fifth switch. The second inductor and the serially-connected structure of the first clamp capacitor and the fifth switch are connected with each other in parallel. The third bridge arm 6 and the first bridge arm 2 are operated in an interleaving manner. The active clamp unit 4 is connected between the second bridge arm 3 and the third bridge arm 6. Since the active clamp unit 4 is shared by the first bridge arm 2 and the third bridge arm 6, the ZVS functions of the switches of the corresponding bridge arms can be achieved. Please refer to FIG. 31 again. The first terminal A of the active clamp unit 4 is electrically connected with a first switch S1H of the first bridge arm 2 and a sixth switch S3H of the third bridge arm 6. The second terminal B of the active clamp unit 4 is electrically connected with a third switch S2H of the second bridge arm 3. When the first bridge arm 2 is enabled but the third bridge arm 6 is disabled, the active clamp unit 4 and the first bridge arm 2 cooperate with each other. Consequently, the ZVS functions of the first switch S1H and the second switch S1L of the first bridge arm 2 can be achieved. When the third bridge arm 6 is enabled but the first bridge arm 2 is disabled, the active clamp unit 4 and the third bridge arm 6 cooperate with each other. Consequently, the ZVS functions of the sixth switch S3H and the seventh switch S3L of the third bridge arm 6 can be achieved.

Figure 32:
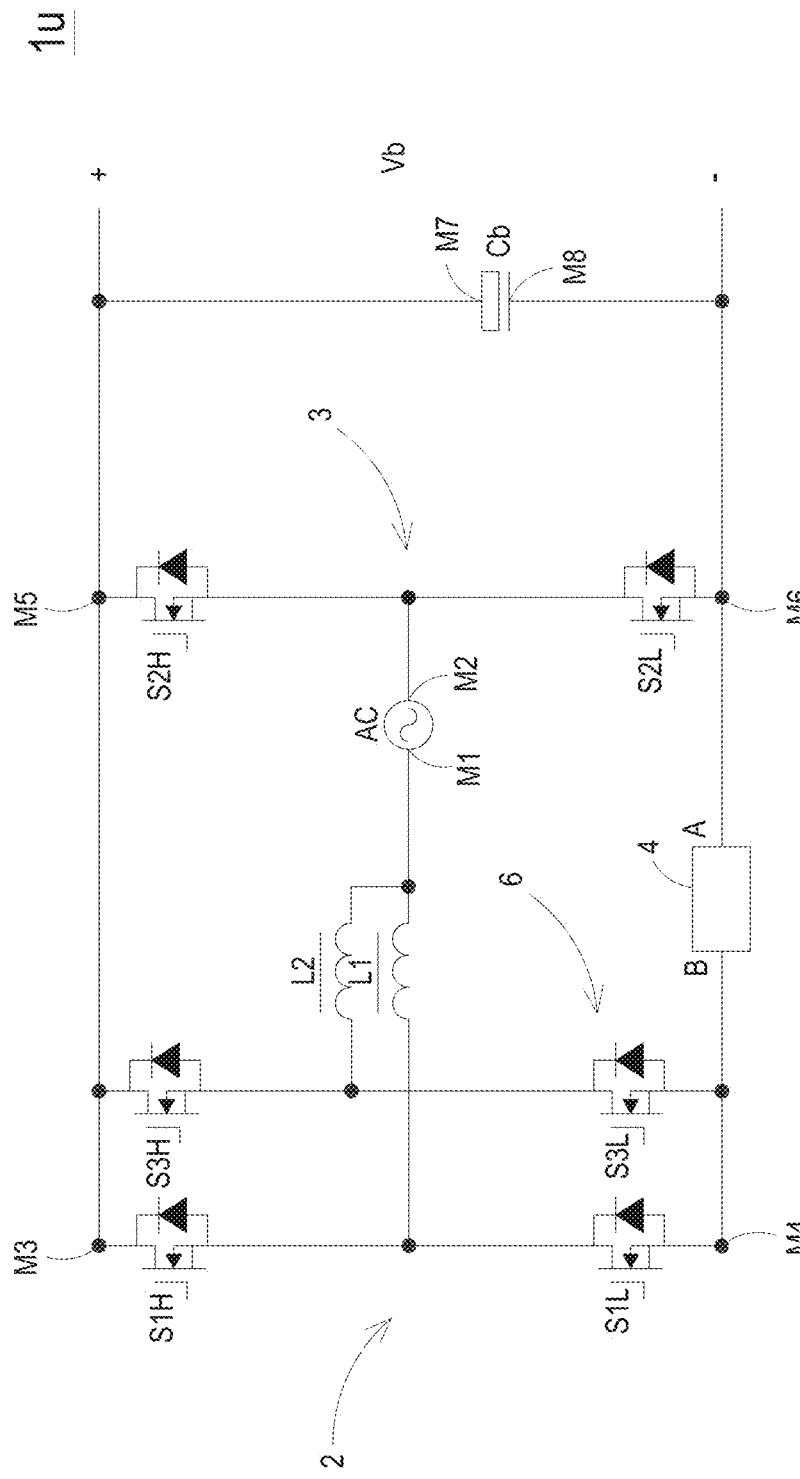
FIG. 32 is a schematic circuit diagram illustrating a power factor correction circuit according to a twenty-second embodiment of the present invention.

FIG. 32 is a schematic circuit diagram illustrating a power factor correction circuit according to a twenty-second embodiment of the present invention. In comparison with the embodiment of FIG. 31, the active clamp unit 4 in the power factor correction circuit 1u of this embodiment is arranged to a different position. The first terminal A of the active clamp unit 4 is electrically connected with the fourth switch S2L of the second bridge arm 3. The second terminal B of the active clamp unit 4 is electrically connected with the second switch S1L of the first bridge arm 2 and the seventh switch S3L of the third bridge arm 6. The third bridge arm 6 and the first bridge arm 2 are operated in an interleaving manner. When the first bridge arm 2 is enabled but the third bridge arm 6 is disabled, the active clamp unit 4 and the first bridge arm 2 cooperate with each other. Consequently, the ZVS functions of the first switch S1H and the second switch S1L of the first bridge arm 2 can be achieved. When the third bridge arm 6 is enabled but the first bridge arm 2 is disabled, the active clamp unit 4 and the third bridge arm 6 cooperate with each other. Consequently, the ZVS functions of the sixth switch S3H and the seventh switch S3L of the third bridge arm 6 can be achieved. Therefore, the active clamp unit 4 is shared by the first bridge arm 2 and the third bridge arm 6.

Figure 33:
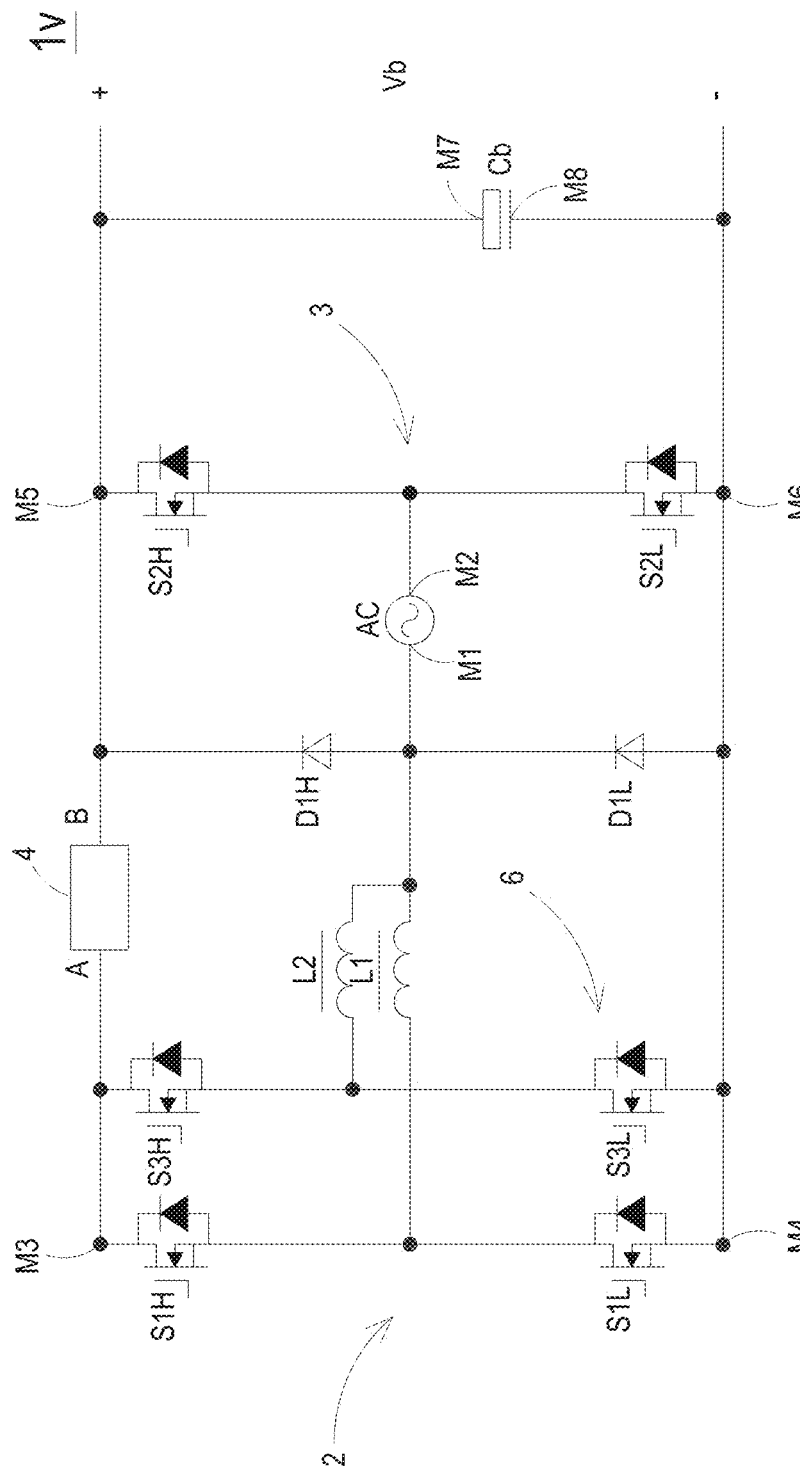
FIG. 33 is a schematic circuit diagram illustrating a power factor correction circuit according to a twenty-third embodiment of the present invention.

FIG. 33 is a schematic circuit diagram illustrating a power factor correction circuit according to a twenty-third embodiment of the present invention. In comparison with the embodiment of FIG. 31, the power factor correction circuit 1v of this embodiment further includes a first diode D1H and a second diode D1L, which are connected with each other in series. The cathode of the first diode D1H is electrically connected with the first terminal M7 of the output capacitor Cb, the first terminal M5 of the second bride arm 3 and the second terminal B of the active clamp unit 4. The anode of the first diode D1H is electrically connected to the node between the first terminal M1 of the input power source AC, the first inductor L1 and the third inductor L2. The cathode of the second diode D1L is electrically connected with the anode of the first diode D1H. The anode of the second diode D1L is electrically connected with the second terminal M8 of the output capacitor Cb, the second switch S1L of the first bridge arm 2, the seventh switch S3L of the third bridge arm 6 and the fourth switch S2L of the second bridge arm 3. In case that the AC input voltage of the power factor correction circuit 1v is abruptly increased to be higher than the output voltage Vb, the arrangement of the first diode D1H and the second diode D1L can limit the magnitude of the AC input voltage to be lower than a predetermined voltage value. Consequently, the electronic components of the power factor correction circuit 1v can be effectively protected.

Figure 34:
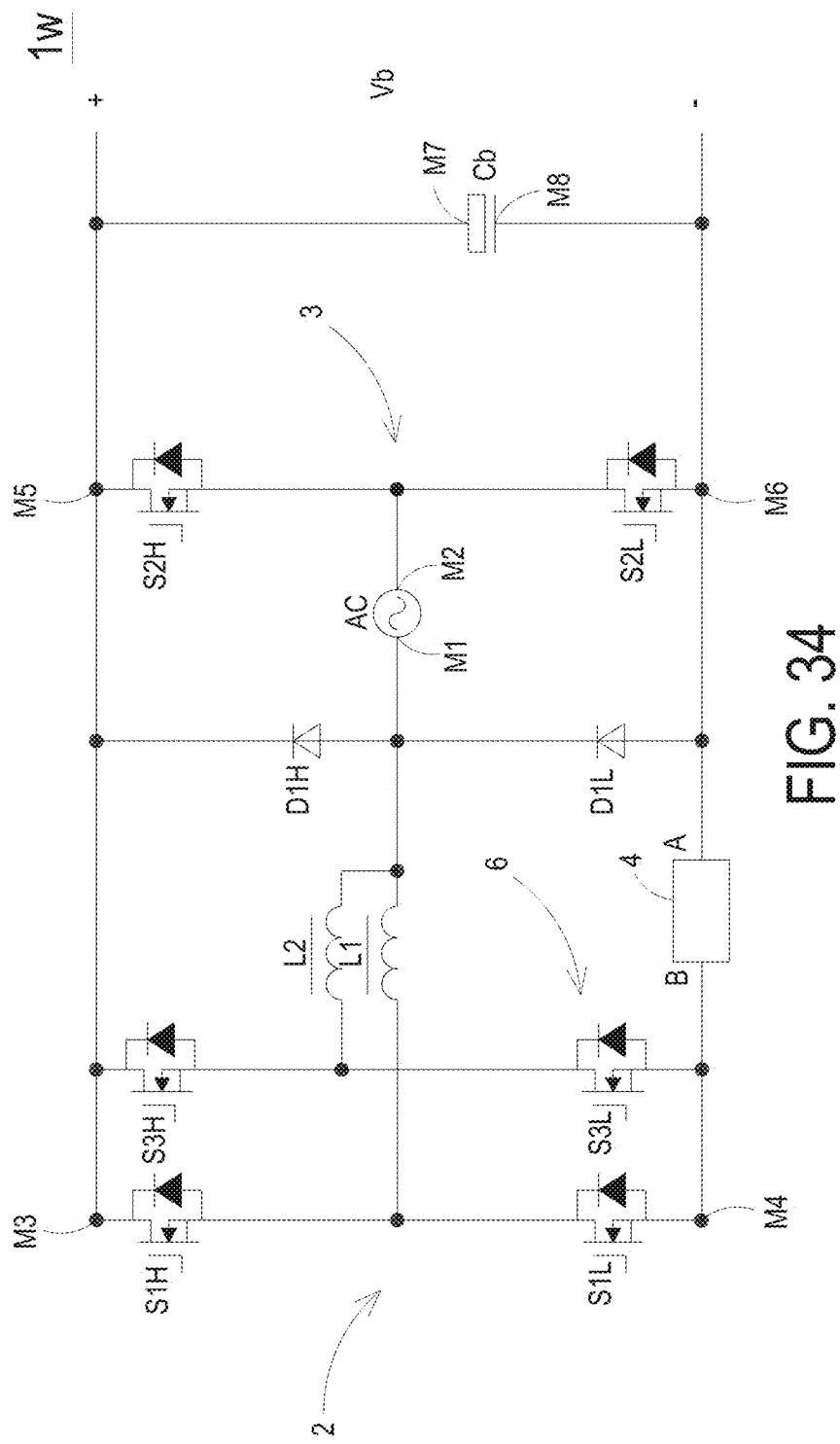
FIG. 34 is a schematic circuit diagram illustrating a power factor correction circuit according to a twenty-fourth embodiment of the present invention.

FIG. 34 is a schematic circuit diagram illustrating a power factor correction circuit according to a twenty-fourth embodiment of the present invention. In comparison with the embodiment of FIG. 32, the power factor correction circuit 1w of this embodiment further includes a first diode D1H and a second diode D1L, which are connected with each other in series. The cathode of the first diode D1H is electrically connected with the first terminal M7 of the output capacitor Cb, the third switch S2H of the second bridge arm 3, the first switch S1H of the first bridge arm 2 and the sixth switch S3H of the third bridge arm 6. The anode of the first diode D1H is electrically connected to the node between the first terminal M1 of the input power source AC, the first inductor L1 and the third inductor L2. The cathode of the second diode D1L is electrically connected with the anode of the first diode D1H. The anode of the second diode D1L is electrically connected with the second terminal M8 of the output capacitor Cb, the fourth switch S2L of the second bridge arm 3 and the first terminal A of the active clamp unit 4.

Figure 35:
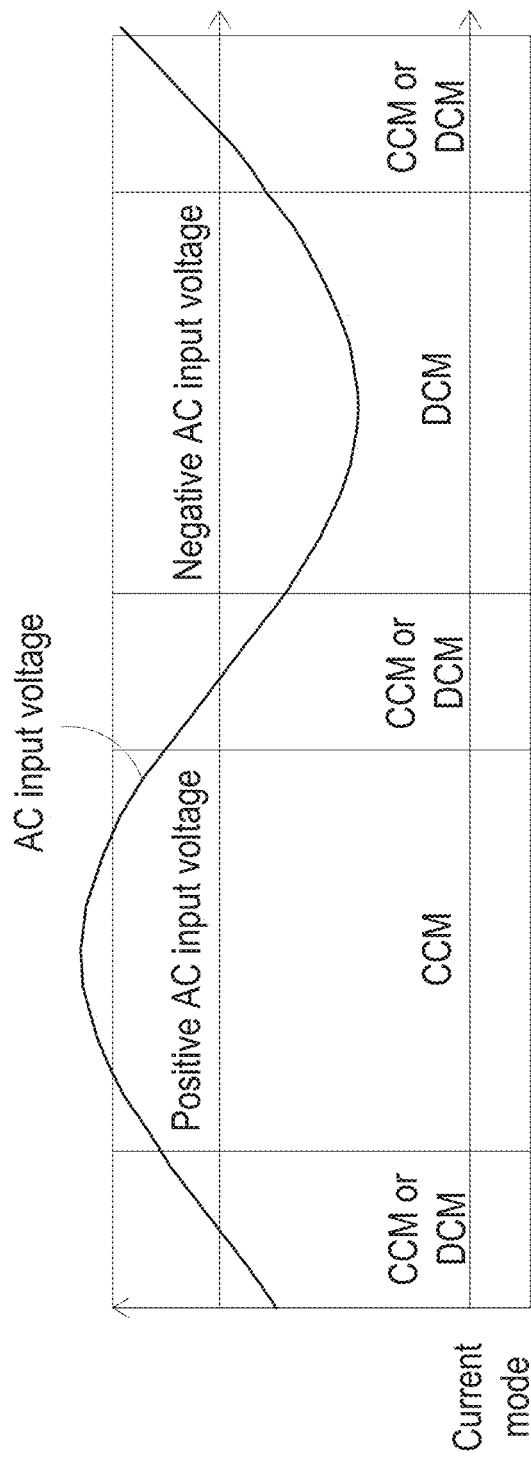
FIG. 35 is schematic timing waveform diagram illustrating the change of the AC input voltage for the power factor correction circuit of the present invention.

FIG. 35 is schematic timing waveform diagram illustrating the change of the AC input voltage for the power factor correction circuit of the present invention. If the input current received by the power factor correction circuit is small or the input current phase of the power factor correction circuit is approximately close to 0° or 180°, the power factor correction circuit can be operated in a discontinuous conduction mode (DCM) or a continuous conduction mode (CCM). For acquiring the optimal efficiency, the active clamp unit in the power factor correction circuit may be disabled by keeping the fifth switch of the active clamp unit being conduction state in the discontinuous conduction mode (DCM) or the partial time period of continuous conduction mode (CCM).

As described in FIG. 27, the second switch S1L (i.e., the main switch) and the first switch S1H (i.e., the auxiliary switch) have the same switching cycle. As described in FIG. 30, the first switch S1H (i.e., the main switch) and the second switch S1L (i.e., the auxiliary switch) have the same switching cycle. Moreover, during the switching cycle of the main switch, the control unit provides the third driving signal Vgs_Sa1 to the fifth switch Sa1.

Optionally, the first delay time Δt1 is a constant value, the second delay time Δt2 is a constant value, and the third delay time Δt3 is a constant value. Moreover, the first delay time Δt1, the second delay time Δt2 and the third delay time Δt3 may vary with at least one of the AC input voltage, the current from the output terminal of the power factor correction circuit and the power from the power factor correction circuit.

From the above descriptions, the present disclosure provides a control method for the power factor correction circuit. By use of the first delay time Δt1, the second delay time Δt2, and the third delay time Δt3, the ZVS function of at least one of the main switch, the auxiliary switch and the fifth switch is achievable, and the switching loss of each switch is reduced. Since the working frequency of the power factor correction circuit is increased, the power supply apparatus with the power factor correction circuit can be operated at higher power density and higher efficiency.

What is claimed is:

1. A power factor correction circuit, comprising:
an input power source;
a first bridge arm comprising a first switch and a second switch connected in series, wherein a common node of the first switch and the second switch is electrically connected with a first terminal of the input power source through a first inductor;
a second bridge arm, connected with the first bridge arm in parallel, comprising a third switch and a fourth switch connected in series, wherein a common node of the third switch and the fourth switch is electrically connected with a second terminal of the input power source;
an output capacitor; and
an active clamp unit comprising a second inductor, a clamp capacitor and a fifth switch, wherein a first terminal of the clamp capacitor is electrically connected with a first terminal of the second inductor, a second terminal of the clamp capacitor is electrically connected with a first terminal of the fifth switch, and a second terminal of the fifth switch is electrically connected with a second terminal of the second inductor,
wherein the active clamp unit is disposed according to the selection from one of the three circuit arrangements below:
positioned between a first terminal of the first bridge arm and a first terminal of the output capacitor;
positioned between a second terminal of the first bridge arm and a second terminal of the output capacitor;
positioned between the first switch and the second switch.

2. The power factor correction circuit according to claim 1, wherein the second inductor of the active clamp unit is electrically parallel to a serially-connected structure having the clamp capacitor and the fifth switch in series.

3. The power factor correction circuit according to claim 2, wherein the second inductor of the active clamp unit is connected between the first terminal of the first bridge arm and the first terminal of the output capacitor, or the second inductor of the active clamp unit is connected between the second terminal of the first bridge arm and the second terminal of the output capacitor, or the second inductor of the active clamp unit is connected between the first switch and the second switch.

4. The power factor correction circuit according to claim 1, wherein the second inductor is a planar magnetic element.

5. The power factor correction circuit according to claim 1, wherein at least one of the first switch, the second switch and the fifth switch is a wide bandgap semiconductor device.

6. The power factor correction circuit according to claim 1, wherein at least one of the third switch and the fourth switch is a wide bandgap semiconductor device or a silicon semiconductor device.

7. The power factor correction circuit according to claim 1, further comprising a first diode and a second diode connected in series, wherein the first diode is connected between the first terminal of the output capacitor and the first terminal of the input power source, and the second diode is connected between the second terminal of the output capacitor and the first terminal of the input power source.

8. The power factor correction circuit according to claim 1, wherein when the input power source works at a first polarity voltage, the second switch of the first bridge arm is a zero voltage switching switch, wherein when the input power source works at a second polarity voltage rather than the first polarity voltage, the first switch of the first bridge arm is the zero voltage switching switch.

9. The power factor correction circuit according to claim 1, wherein the active clamp unit is disabled in the discontinuous conduction mode or in the partial time period of the continuous conduction mode, when the input current phase of the power factor correction circuit is approximately close to 0° or 180°.

10. The power factor correction circuit according to claim 9, wherein the fifth switch always keeps in turning-on state when the active clamp unit is disabled.

11. A power factor correction circuit, comprising:
an input power source;
a first bridge arm comprising a first switch and a second switch connected in series, wherein a common node of the first switch and the second switch is electrically connected with a first terminal of the input power source through a first inductor;
a second bridge arm comprising a third switch and a fourth switch connected in series, wherein a common node of the third switch and the fourth switch is electrically connected with a second terminal of the input power source;
a third bridge arm connected with the first bridge arm and the second bridge arm in parallel, wherein the third bridge arm comprises a sixth switch and a seventh switch connected in series, wherein a common node of the sixth switch and the seventh switch is electrically connected with the first terminal of the input power source through a third inductor;
an output capacitor;
a first active clamp unit comprising a second inductor, a first clamp capacitor and a fifth switch, wherein a first terminal of the first clamp capacitor is electrically connected with a first terminal of the second inductor, a second terminal of the first clamp capacitor is electrically connected with a first terminal of the fifth switch, and a second terminal of the fifth switch is electrically connected with a second terminal of the second inductor; and
a second active clamp unit comprising a fourth inductor, a second clamp capacitor and an eighth switch, wherein a first terminal of the second clamp capacitor is electrically connected with a first terminal of the fourth inductor, a second terminal of the second clamp capacitor is electrically connected with a first terminal of the eighth switch, and a second terminal of the eighth switch is electrically connected with a second terminal of the fourth inductor,
wherein the first active clamp unit is arranged in the first bridge arm, the second active clamp unit is arranged in the third bridge arm, and a position of the first active clamp unit in the first bridge arm and a position of the second active clamp unit in the third bridge arm are identical.

12. The power factor correction circuit according to claim 11, wherein the second inductor of the first active clamp unit is electrically parallel to a serially-connected structure having the first clamp capacitor and the fifth switch in series.

13. The power factor correction circuit according to claim 11, wherein the fourth inductor of the second active clamp unit is electrically parallel to a serially-connected structure having the second clamp capacitor and the eighth switch in series.

14. The power factor correction circuit according to claim 11, wherein at least one of the first switch, the second switch, the fifth switch, the sixth switch, the seventh switch and the eighth switch is a wide bandgap semiconductor device.

15. The power factor correction circuit according to claim 11, wherein a second terminal of the first active clamp unit and a second terminal of the second active clamp unit are electrically connected with a first terminal of the output capacitor, a first terminal of the first active clamp unit is electrically connected with the first switch, and a first terminal of the second active clamp unit is electrically connected with the sixth switch.

16. The power factor correction circuit according to claim 11, wherein a first terminal of the first active clamp unit and a first terminal of the second active clamp unit are electrically connected with a second terminal of the output capacitor, a second terminal of the first active clamp unit is electrically connected with the second switch, and a second terminal of the second active clamp unit is electrically connected with the seventh switch.

17. The power factor correction circuit according to claim 11, wherein a first terminal of the first active clamp unit is electrically connected with the first inductor and the second switch, a second terminal of the first active clamp unit is electrically connected with the first switch, a first terminal of the second active clamp unit is electrically connected with the third inductor and the seventh switch, and a second terminal of the second active clamp unit is electrically connected with the sixth switch.

18. The power factor correction circuit according to claim 11, wherein a first terminal of the first active clamp unit is electrically connected with the second switch, a second terminal of the first active clamp unit is electrically connected with the first inductor and the first switch, a first terminal of the second active clamp unit is electrically connected with the seventh switch, and a second terminal of the second active clamp unit is electrically connected with the third inductor and the sixth switch.

19. The power factor correction circuit according to claim 11, further comprising a first diode and a second diode connected in series, wherein the first diode is connected between the first terminal of the output capacitor and the first terminal of the input power source, and the second diode is connected between the second terminal of the output capacitor and the first terminal of the input power source.

20. The power factor correction circuit according to claim 11, wherein the first bridge arm and the third bridge arm are operated in an interleaving manner.

21. A power factor correction circuit, comprising:
an AC power source;
a first bridge arm comprising a first switch and a second switch connected in series, wherein a common node of the first switch and the second switch is electrically connected with a first terminal of the AC power source through a first inductor;
a second bridge arm comprising a third switch and a fourth switch connected in series, wherein a common node of the third switch and the fourth switch is electrically connected with a second terminal of the AC power source;
a third bridge arm connected with the first bridge arm in parallel, wherein the third bridge arm comprises a sixth switch and a seventh switch connected in series, wherein a common node of the sixth switch and the seventh switch is electrically connected with the first terminal of the AC power source through a third inductor;
an output capacitor; and
an active clamp unit comprising a second inductor, a first clamp capacitor and a fifth switch, wherein the second inductor is electrically parallel to a serially-connected structure having the first clamp capacitor and the fifth switch in series;
wherein the first bridge arm and the third bridge arm are operated in an interleaving manner, the active clamp unit is connected between the second bridge arm and the third bridge arm, and the active clamp unit is shared by the first bridge arm and the third bridge arm.

22. The power factor correction circuit according to claim 21, wherein a first terminal of the active clamp unit is connected with the first switch and the sixth switch, and a second terminal of the active clamp unit is connected with the third switch.

23. The power factor correction circuit according to claim 21, wherein a first terminal of the active clamp unit is connected with the fourth switch, and a second terminal of the active clamp unit is connected with the second switch and the seventh switch.

24. The power factor correction circuit according to claim 21, further comprising a first diode and a second diode connected in series, wherein the first diode is connected between a first terminal of the output capacitor and the first terminal of the AC power source, the second diode is connected between a second terminal of the output capacitor and the first terminal of the AC power source, and an anode of the first diode and a cathode of the second diode are connected with the AC power source.

* * * * *